US012654196B2

(12) United States Patent
Li

(10) Patent No.: US 12,654,196 B2
(45) Date of Patent: Jun. 16, 2026

(54) GLUE GUN

(71) Applicant: HANGZHOU GREAT STAR INDUSTRIAL CO., LTD., Hangzhou City (CN)

(72) Inventor: Yueming Li, Hangzhou City (CN)

(73) Assignee: HANGZHOU GREAT STAR INDUSTRIAL CO., LTD., Hangzhou City (CN)

( * ) Notice: Subject to any disclaimer, the term of this patent is extended or adjusted under 35 U.S.C. 154(b) by 369 days.

(21) Appl. No.: 18/233,171

(22) Filed: Aug. 11, 2023

(65) Prior Publication Data

US 2024/0009699 A1 Jan. 11, 2024

Related U.S. Application Data

(63) Continuation-in-part of application No. 17/887,030, filed on Aug. 12, 2022, now Pat. No. 12,409,471, which is a continuation-in-part of application No. 17/843,646, filed on Jun. 17, 2022, now Pat. No. 12,280,392, application No. 18/233,171 is a continuation-in-part of application No. 17/843,646, (Continued)

(51) Int. Cl.
*B05C 17/01* (2006.01)

(52) U.S. Cl.
CPC ...... *B05C 17/0126* (2013.01); *B05C 17/0136* (2013.01)

(58) Field of Classification Search
CPC ........................ B05C 17/0126; B05C 17/0136
USPC .......................................................... 222/391
See application file for complete search history.

(56) References Cited

U.S. PATENT DOCUMENTS 4,339,058 A * 7/1982 Wendt ..................... B05C 17/01 222/326
5,197,635 A * 3/1993 Chang ............... B05C 17/00553 222/391

(Continued)

FOREIGN PATENT DOCUMENTS

CN 2824692 10/2006
CN 101099961 A 1/2008

(Continued)

OTHER PUBLICATIONS

Machine Translation of WO-2020140272-A1.*

(Continued)

*Primary Examiner* — Jeremy Carroll
(74) *Attorney, Agent, or Firm* — Fitch, Even, Tabin & Flannery LLP

(57) ABSTRACT

A glue gun, including: a main body, one end of the main body formed as an accommodation part for accommodating a glue cylinder; a first handle and a second handle, the first handle coupled to the second handle by a pivot pin shaft, one of the first handle and the second handle configured as a fixed handle, the other configured as a movable handle pivotable relative to the fixed handle, the fixed handle coupled to the other end of the main body, wherein the movable handle is provided with an actuating member, the actuating member configured to push a push member of the glue gun; at least one of the actuating member and the pivot pin shaft is configured to be adjustable in position to vary a distance between the actuating member and the pivot pin shaft, resulting in a switching between at least two gear positions.

18 Claims, 33 Drawing Sheets

Related U.S. Application Data filed on Jun. 17, 2022, now Pat. No. 12,280,392, which is a continuation-in-part of application No. 16/627,142, filed as application No. PCT/CN2019/070422 on Jan. 4, 2019, now Pat. No. 11,364,519.

(56) References Cited

U.S. PATENT DOCUMENTS

| | | | | |
|---|---|---|---|---|
| 6,056,156 | A | 5/2000 | Peng | |
| 6,640,998 | B1 * | 11/2003 | Kern | B05C 17/0126 222/391 |
| 11,364,519 | B2 | 6/2022 | Li | |
| 2002/0092871 | A1 * | 7/2002 | Rickard | A61B 17/8822 222/391 |
| 2009/0134187 | A1 * | 5/2009 | Hefele | B05C 17/0126 222/391 |
| 2012/0145749 | A1 * | 6/2012 | Hung | B05C 17/0123 222/391 |
| 2017/0348724 | A1 * | 12/2017 | Hung | B05C 17/0126 |
| 2019/0299244 | A1 * | 10/2019 | Xia | B05C 17/0123 |
| 2021/0331200 | A1 | 10/2021 | Li | |
| 2022/0314270 | A1 | 10/2022 | Li | |
| 2023/0028417 | A1 | 1/2023 | Li | |

FOREIGN PATENT DOCUMENTS

| | | | | |
|---|---|---|---|---|
| CN | 101444772 | | 6/2009 | |
| CN | 202062389 | | 12/2011 | |
| CN | 107116010 | A | 9/2017 | |
| CN | 207138230 | U | 3/2018 | |
| CN | 108580210 | A | 9/2018 | |
| CN | 210079978 | | 2/2020 | |
| CN | 217963341 | U | 12/2022 | |
| EP | 0736333 | A2 | 10/1996 | |
| KR | 20100030529 | | 3/2010 | |
| WO | WO-2020140272 | A1 * | 7/2020 | B05C 17/0126 |

OTHER PUBLICATIONS

CNIPA; Chinese Office Action from Chinese Application No. 202320373452.9; Jan. 19, 2024; In Chinese with English Machine Translation (4 pages).

* cited by examiner

GLUE GUN

RELATED APPLICATIONS

This application is a continuation-in-part (CIP) application of U.S. patent application Ser. No. 17/887,030, filed Aug. 12, 2022, which is a continuation-in-part (CIP) application of U.S. patent application Ser. No. 17/843,646, filed Jun. 17, 2022, which is a continuation-in-part (CIP) application of U.S. patent application Ser. No. 16/627,142, having a 371 date of Dec. 27, 2019, which is a national phase application of PCT/CN2019/070422, filed Jan. 4, 2019.

This application is also a continuation-in-part (CIP) application of U.S. patent application Ser. No. 17/843,646, filed Jun. 17, 2022, which is a continuation-in-part (CIP) application of U.S. patent application Ser. No. 16/627,142, having a 371 date of Dec. 27, 2019, which is a national phase application of PCT/CN2019/070422, filed Jan. 4, 2019.

The disclosures of the above-referenced applications are all incorporated by reference herein in their entirety.

FIELD OF THE INVENTION

The present invention relates to the field of hardware and, in particular, to a glue gun, and pertains to the field of tools for use in production, processing, manufacturing and construction industries.

DESCRIPTION OF THE PRIOR ART

During the use of a glue gun, glue is squeezed out by a reciprocating lever in a gun-like handle. Such a glue gun is provided at one end with a trigger mechanism suitable to be held and pressed by a user's hand, and when the user presses the trigger mechanism with his/her hand, a mechanical structure of the glue gun will be actuated to cause glue to be dispensed out from a glue cylinder in the glue gun through a glue outlet. A single glue gun is adapted to use with various types of glue with distinct properties and different levels of fluidity. As common glue guns own a fixed dispensing mechanism, uniform dispensing of glue is very difficult in the course of glue application. In specific application scenarios of glue guns, different glue dispensing speeds would be necessary for different sizes of target areas for glue application. However, as common glue guns have a fixed dispensing mechanism, control of the speed at which glue is dispensed from the glue cylinder has to rely on a pressing speed of the user's hand. In fact, it is extremely difficult for a user to control his/her hand's pressing speed while applying a force, in particular a large force, to the handle. When a glue gun is reused after it has been left unused for a long time, a large force is usually required at the beginning to actuate the glue gun due to partial drying and static viscosity of the glue and other problems, and after stable glue dispensing is attained, actuating of the glue gun would instead require a significantly reduced force. Common glue guns with a fixed dispensing mechanism could not overcome this problem and is generally further problematic in less pressing speed controllability at the beginning of using the glue gun due to a large force being exerted to enable glue dispensing and a waste of glue due to an excessive pressing force at the moment of attainment of glue dispensing.

Therefore, those skilled in the art are directing their effort toward developing glue gun, which allows a user to switch it, as actually required, between high-speed feeding and large-force feeding gears.

SUMMARY OF THE INVENTION

In view of the above-described drawbacks of the prior art, the problem sought to be solved by the present invention is to enable a glue gun to switch between different gear positions.

The above object is attained by a glue gun provided in the present invention, which includes a movable handle and a fixed handle. The movable handle is coupled to the fixed handle by a pivot pin shaft. The movable handle is provided thereon with an actuator having an actuating member in cooperation with a push member. The size of a spacing between the pivot pin shaft and the actuating member is configured to allow a switching between two or more gear positions, thereby varying the magnitude of a force applied by the actuator to the push member.

Further, the movable handle is provided with a slide slot defining two or more gear positions. The pivot pin shaft is configured to be able to slide in the slide slot to cause a switching between the gear positions.

Further, the fixed handle is provided with a slide slot defining two or more gear positions. The pivot pin shaft is configured to be able to slide in the slide slot to cause a switching between the gear positions.

Further, a resilient element is provided between the movable handle and the fixed handle. The resilient element is configured to apply a pretension to the movable handle to retain the pivot pin shaft at one of the gear positions.

Further, the pivot pin shaft is a stepped pin shaft having a press end. A resilient element is disposed over the press end. The stepped pin shaft has a first shaft-diameter section and a second shaft-diameter section. A shaft diameter of the first shaft-diameter section is greater than a width of the slide slot. A shaft diameter of the second shaft-diameter section is smaller than the width of the slide slot. The stepped pin shaft is configured so that, biased by the resilient element, the first shaft-diameter section is located at one of the gear positions. When the press end is pressed, axial movement of the stepped pin shaft occurs, bringing the second shaft-diameter section to the gear position. When the press end is released, opposite axial movement of the stepped pin shaft occurs due to resilience of the resilient element, bringing the first shaft-diameter section back to the gear position.

Further, the slide slot is an arc-shaped slot or a linear-shaped slot.

Further, the movable handle is provided with a slide slot defining two or more gear positions, and the actuating member is configured to slide within the slide slot, resulting in a switching between the gear positions.

Further, the actuator further includes a pivot shaft, and the actuating member of the actuator is configured to able to slide within the slide slot about the pivot shaft.

Further, the brake is disposed over the push rod. One end of the brake cooperates with a limiting groove in the main body. One end of the brake is movable between a first limiting end and a second limiting end of the limiting groove so that the push rod has an idle stroke during its pushed movement, which has a distance from the first limiting end to the second limiting end.

Further, the idle stroke is 3-5 mm.

The above object is also attained by another glue gun provided in the present invention, which includes:

- a first handle and a second handle, the first handle coupled to the second handle by a pivot pin shaft, one of the first handle and the second handle configured as a fixed handle, the other configured as a movable handle pivotable relative to the fixed handle.

The movable handle is provided with an actuator configured to push a push member of the glue gun.

At least one of the actuator and the pivot pin shaft is configured to be adjustable in position to switch between at least two gear positions, thereby varying a ratio of a spacing between the pivot pin shaft and a point of force application on the movable handle to a spacing between the pivot pin shaft and a stressed point for the actuator. In this way, different forces can be applied to the push member, and the push rod can be moved at different speeds.

Further, a spacing between center axes of the actuator and the pivot pin shaft is configured to be adjustable, enabling the pivot pin shaft or the actuator to switch between the at least two gear positions.

Further, one of the first handle and the second handle is provided with a slide slot provided with the at least two gear positions, and the pivot pin shaft is configured to be able to slide in the slide slot, resulting in a switching between the gear positions.

Further, a resilient element is provided between the first handle and the second handle. The resilient element is configured to apply a pretension to the first handle or the second handle, whichever is configured as the movable handle, thereby retaining the pivot pin shaft at one of the gear positions.

Further, the pivot pin shaft is a stepped pin shaft having a first shaft-diameter section and a second shaft-diameter section. The slide slot has a width at the gear positions, which is greater than its width at a communication portion of the slide slot bringing the gear positions into communication. A shaft diameter of the first shaft-diameter section has a shaft diameter greater than the width of the communication portion, and a shaft diameter of the second shaft-diameter section is smaller than the width of the communication portion. The stepped pin shaft is configured so that axial movement of the stepped pin shaft occurs under the action of an external force. Moreover, when the first shaft-diameter section is located at any of the gear positions, the stepped pin shaft is retained at this gear position. When the second shaft-diameter section is located at one of the gear positions, the stepped pin shaft is able to slide within the slide slot.

Further, the stepped pin shaft has a press end, and a resilient element is disposed over the press end. The stepped pin shaft is configured so that, biased by the resilient element, the first shaft-diameter section is located at one of the gear positions. When the press end is pressed, axial movement of the stepped pin shaft occurs, bringing the second shaft-diameter section to the gear position. When the press end is released, opposite axial movement of the stepped pin shaft occurs due to resilience of the resilient element, bringing the first shaft-diameter section back to the gear position.

Further, one end of the stepped pin shaft is coupled to a press member, and the press member is provided with at least one locating pin. An axial direction of the locating pin is parallel to an axial direction of the stepped pin shaft. The slide slot is provided in the first handle, and the second handle is provided with at least one locating slot, which is passed through the locating slot and configured to be able to slide therein. A resilient element is disposed over the locating pin. The stepped pin shaft and the locating pin are configured to follow the press member to move therewith. Biased by the resilient element, the first shaft-diameter section is located at one of the gear positions. When the press member is pressed, axial movement of the stepped pin shaft and the locating pin occurs, bringing the second shaft-diameter section to the gear position. When the press member is released, opposite axial movement of the locating pin and the stepped pin shaft occurs due to resilience of the resilient element, bringing the first shaft-diameter section back to the gear position.

Further, the glue gun further includes a stop plate provided on a side opposite the press member, and the other ends of the pivot pin shaft and the locating pin are coupled to the stop plate by fasteners. Further, the press member is provided with a first locating pin and a second locating pin, and the second handle is provided with a first locating slot corresponding to the first locating pin and a second locating slot corresponding to the second locating pin.

Further, the first locating pin, the second locating pin and the stepped pin shaft are located at vertices of a triangle.

Further, the first locating pin and the second locating pin at located on a single straight line.

Further, a raised block is provided on an external surface of the press member.

Further, the slide slot is an arc-shaped slot or a linear-shaped slot.

Further, the first handle is provided with a slide slot defining the at least two gear position, and the actuating member is configured to be able to slide in the slide slot to switch between the gear positions.

Further, the actuator further includes a pivot shaft, and the actuating member of the actuator is configured to be able to slide within the slide slot about the pivot shaft.

Further, the glue gun further includes:

- a brake sleeved over a push rod of the glue gun, the brake and the main body of the glue gun provided therebetween with a compression spring, the brake configured to be urged by the compression spring to retain the push rod so that the push rod can move only in a direction in which glue flows out.

Further, the main body is provided with a limiting groove, and one end of the brake is located in the limiting groove. The limiting groove has a first limiting end and a second limiting end. The brake is configured to move between the first limiting end and the second limiting end so that the push rod has an idle stroke during its pushed movement, which has a distance from the first limiting end to the second limiting end.

Further, the idle stroke is 3-5 mm.

The above object is also attained by another glue gun provided in the present invention, which includes:

- a trigger device, the trigger device including a movable handle and a fixed handle, which are coupled together by a pivot pin shaft;
- a main body, one end of the main body formed as an accommodation part for accommodating glue, the other end of the main body coupled to the fixed handle;
- a push rod, one end of the push rod provided with a push body located in the accommodation part, the push body configured to reciprocate with the push rod, the other end of the push rod provided with a push member;
- an actuator, the actuator provided on the movable handle and configured to push the push member;
- a brake disposed over the push rod, the brake and the main body disposed therebetween with a compression spring, the brake configured to be urged by the compression spring to retain the push rod so that the push rod can move only in a direction in which the glue flows out, wherein a spacing between the actuator and the pivot pin shaft is configured to be adjustable, enabling a switching of the glue gun between the at least two gear positions.

In this way, a ratio of a spacing between the pivot pin shaft and a point of force application on the movable handle to a spacing between the pivot pin shaft and a stressed point for the actuator can be varied, allowing different forces to be applied to the push member and enabling the push rod to move at different speeds.

Further, the movable handle has a slide slot defining a first gear position and a second gear position, and the actuator is configured to slide in the slide slot to switch between the first gear position and the second gear position. Alternatively, the pivot pin shaft is configured to slide in the slide slot to switch between the first gear position and the second gear position.

The above object is also attained by another glue gun switchable between different gear positions provided in the present invention, which includes:

- a main body, one end of the main body formed as an accommodation part for accommodating a glue cylinder;
- a first handle and a second handle, the first handle coupled to the second handle by a pivot pin shaft, one of the first handle and the second handle configured as a fixed handle, the other configured as a movable handle pivotable relative to the fixed handle, the fixed handle coupled to the other end of the main body,
- wherein the movable handle is provided with an actuating member, the actuating member configured to push a push member of the glue gun;
- at least one of the actuating member and the pivot pin shaft is configured to be adjustable in position to vary a distance between the actuating member and the pivot pin shaft, resulting in a switching between at least two gear positions.

Further, the glue gun further includes a manipulation component coupled to the actuating member and configured to move under the drive of an external force to drive one of the actuating member and the pivot pin shaft to move to switch between the at least two gear positions.

Further, the movable handle is provided with a slide slot provided with the at least two gear positions, and the actuating member is configured to slide within the slide slot under a drive of the manipulation component to switch between the gear positions.

Further, one end of the manipulation component is pivotally coupled to the main body, and the other end of the manipulation component is provided with the manipulation element.

Further, the manipulation component includes a toggle pivotably coupled to the main body by a pivot shaft, and one end of the actuating member is coupled to the toggle.

Further, the manipulation component includes a first actuating plate, a first end portion of the first actuating plate pivotably coupled to the main body by a pivot shaft, a second end portion of the first actuating plate provided with the manipulation element.

Further, the first actuating plate is provided with a first slot, and one end of the actuating member is accommodated in the first slot. Additionally, the actuating member is configured to slide in the first slot during a switching of the gear positions.

Further, the first actuating plate is provided with a second slot, and the main body is provided with a first indication block located within the second slot. Additionally, the first actuating plate is configured so that, when it is pivoting, the second slot slides relative to the first indication block.

Further, the main body is provided with a guide slot, and the first actuating plate has a third end portion provided thereat with a guide post, which is located in the guide slot and configured to slide in the guide slot.

Further, the manipulation component further includes a second actuating plate provided on a side of the main body opposite the first actuating plate, and the pivot shaft, after running through the main body, is coupled to the second actuating plate.

Further, the second actuating plate has the same shape as the first actuating plate.

Further, the second end portion of the first actuating plate extends to an outer side of the main body. Additionally, one end of the manipulation element is coupled to the second end portion, and the other end is coupled to the second actuating plate.

Further, the manipulation element includes a screw, one end of which is coupled to the first actuating plate, and the other end of which engages with the second actuating plate. Additionally, the screw is sleeved thereover with a cylindrical member located between the first actuating plate and the second actuating plate.

Further, the second actuating plate is provided with a third slot, and the main body is provided with a second indication block located in the third slot. Additionally, the second actuating plate is configured so that, when it is pivoting, the third slot slides relative to the second indication block.

Further, the movable handle is provided with a slide slot provided with the at least two gear positions, and the pivot pin shaft is configured to slide in the slide slot under a drive of the manipulation component to switch between the gear positions.

Further, the glue gun further includes:

- a brake sleeved over a push rod of the glue gun, the brake and the main body of the glue gun provided therebetween with a compression spring, the brake configured to be urged by the compression spring to retain the push rod so that the push rod can move only in a direction in which glue flows out.

Further, the main body is provided with a limiting groove having a first limiting end and a second limiting end. Additionally, one end of the brake is located in the limiting groove, and the brake is configured to move between the first limiting end and the second limiting end so that the push rod has an idle stroke during its pushed movement, which has a distance from the first limiting end to the second limiting end.

Further, the idle stroke is 3-5 mm.

The above object is also attained by another glue gun provided in the present invention, which includes:

- a trigger device comprising a movable handle and a fixed handle, which are coupled together by a pivot pin shaft;
- a main body, one end of the main body formed as an accommodation part for accommodating glue, the other end of the main body coupled to the fixed handle;
- a push rod, one end of the push rod provided with a push body located in the accommodation part, the push body configured to reciprocate with the push rod, the other end of the push rod provided with a push member;
- an actuating member provided on the movable handle and configured to push the push member;
- a brake disposed over the push rod, the brake and the main body disposed therebetween with a compression spring, the brake configured to be urged by the compression spring to retain the push rod so that the push rod can move only in a direction in which the glue flows out, wherein at least one of the actuating member and the pivot pin shaft is configured to be adjustable in position to vary a distance between the actuating member and the pivot pin shaft, resulting in a switching between at least two gear positions.

Further, the movable handle has a slide slot defining a first gear position and a second gear position, and the actuating member is configured to slide in the slide slot to switch between the first gear position and the second gear position. Alternatively, the pivot pin shaft is configured to slide in the slide slot to switch between the first gear position and the second gear position.

Compared with the prior art, the present invention provides the following benefits: 1) when the pivot pin shaft is located closer to the actuating member, the actuating member exerts a stronger force on the push member, which is suitable for glue with poor fluidity, and when the pivot pin shaft is located farther away from the actuating member, the actuating member exerts a weaker force on the push member, which is suitable for glue with good fluidity; 2) the resilient element provided between the movable handle and the fixed handle is able to fix the pivot pin shaft at one of the gear positions and prevent it from spontaneously jumping to another gear position in response to a gripping force being applied to the movable handle; 3) the biasing function of the resilient element allows a switching between multiple gear positions to be easily achieved simply by pressing the stepped pin shaft; 4) the gear positions enable a user to switch between high-speed feeding and large-force feeding as actually required; 5) through providing the idle stroke, internal stress within the glue in the glue cylinder can be released, avoiding the glue from flowing out through the glue outlet; 6) the manipulation component facilitates a switching between the gear positions and can provide an indication of the current gear position; the actuating plates can not only facilitate manipulation, but can also protect the internal structures.

The present invention also provides another glue gun capable of switching between a first configuration with a continuous drip of glue from a glue cylinder following handle release and a second configuration without a drip of glue following handle release.

To this end, the present invention provides a glue gun, including:

a main body, one end of the main body formed as an accommodation part for accommodating a glue cylinder;

a fixed handle coupled to the other end of the main body;

a movable handle pivotally coupled to the fixed handle;

a push rod, one end of which is located in the accommodation part;

a brake disposed over the push rod; and a movable member provided on the main body, the movable member configured to be able to lock the brake so that a continuous force is applied to glue in the glue cylinder to maintain internal stress within the glue and to release the brake to release the force applied to the glue in the glue cylinder and hence the internal stress within the glue.

Further, the main body is provided with a limiting groove having a first limiting end and a second limiting end. Additionally, one end of the brake is located in the limiting groove, and the brake is configured to move between the first limiting end and the second limiting end.

Further, the movable member is configured to be movable to a first position and a second position. At the first position, the movable member locks the brake so that, after the movable handle is released, internal stress within the glue remains, causing a continuous drip of the glue from the glue cylinder. At the second position, the movable member unlocks the brake so that, after the movable handle is released, internal stress within the glue is released and there is no drip of the glue.

Further, the movable member is pivotally coupled to the main body and has an end portion facing the brake. When the movable member is at the first position, the end portion locks the brake. When the movable member is at the second position, the brake is released from the end portion.

Further, a raised plate is provided on the top of the main body, and the limiting groove is formed in the raised plate. The movable member is pivotally coupled to the raised plate.

Further, the raised plate is provided with a pin shaft, and the movable member is provided with a first through hole fitted over the pin shaft.

Further, the first through hole is located in a central region of the movable member.

Further, the movable member is provided with a second through hole, and the raised plate is provided with a locating stud. When the movable member is at the first position, the locating stud is partially fitted in the second through hole.

Further, the locating stud is a truncated trapezoidal pyramid having beveled side surfaces. A top size of the truncated trapezoidal pyramid is smaller than a bottom size thereof.

Further, the movable member is provided with a corner facing the main body. When the movable member is located at the second position, the corner contacts the main body and thereby blocks the movable member.

Further, the movable member is provided with an arc-shaped portion, which is located on the same side of the movable member as the corner. The arc-shaped portion always remains in contact with the main body.

Further, the movable member includes identical first and second sections, which are arranged in symmetry. Between the first section and the second section, there is a gap, in which the raised plate is inserted. The first section and the second section are coupled together by a coupling member.

Further, the coupling member defines a proximal end and a distal end. The movable member is configured so that, when the proximal end is pressed, the movable member moves toward the first position, and that when the distal end is pressed, the movable member moves toward the second position.

Further, a rotating shaft of the movable member is provided at an end thereof away from the brake.

Further, the movable member is configured so that, when an end of the movable member opposing the rotating shaft is pressed, the movable member moves toward the first position.

Further, the movable member is provided on a side surface of the raised plate, and the rotating shaft of the movable member is provided at the end thereof away from the brake.

Further, the rotating shaft of the movable member includes a screw passed through the raised plate and a nut disposed at one end of the screw. The movable member is provided with a sleeve disposed over the nut.

Further, the movable member is provided with a blind hole arranged on the same side of the movable member as the sleeve, and the raised plate is provided a protrusion. A resilient element is coupled to both the protrusion and the blind hole.

Further, the movable member is provided with a recess, and the raised plate is provided with a blocking member projecting therefrom. When the movable member is at the second position, the blocking member is received in the recess.

Below, the concept, structural details and resulting technical effects of the present application will be further described with reference to the accompanying drawings to provide a full understanding of the objects, features and effects of the invention.

DETAILED DESCRIPTION OF THE PREFERRED EMBODIMENTS

Figure 1:
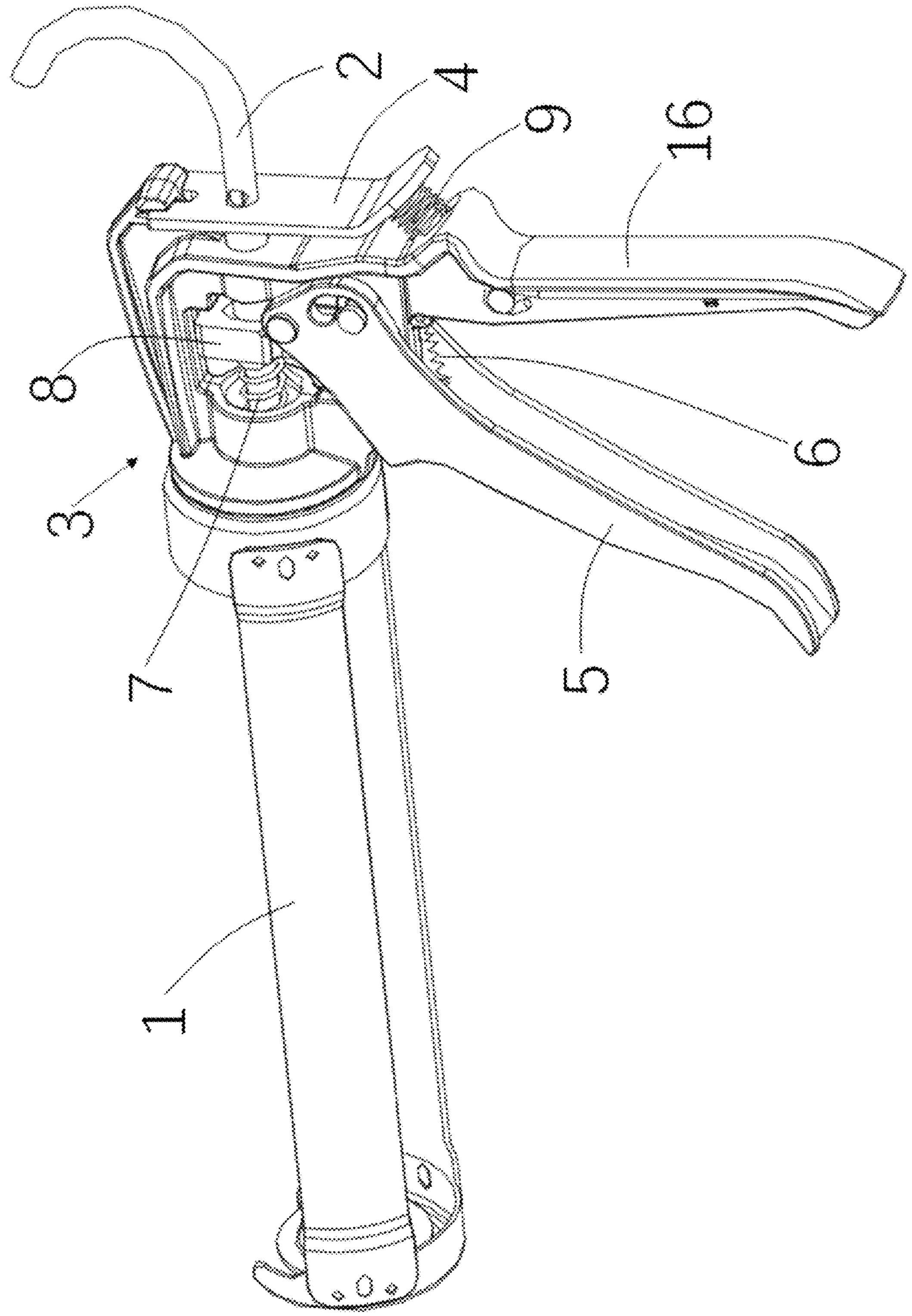
FIG. 1 is a schematic diagram showing the structure of a glue gun according to a first embodiment of the present invention.

Below, the accompanying drawings of this specification are referenced to introduce many preferred embodiments of the present invention so that the techniques thereof become more apparent and readily understood. This invention may be embodied in many different forms of embodiment, and the protection scope thereof is not limited only to the embodiments mentioned herein.

Throughout the accompanying drawings, structurally identical parts are indicated with identical reference numerals, and structurally or functionally similar components are indicated with similar reference numerals. The size and thickness of each component in the drawings are arbitrarily depicted, and the present invention is not limited to any size or thickness of each component. For greater clarity of illustration, the thicknesses of some parts are exaggerated as appropriate somewhere in the drawings.

Embodiment 1

Figure 2:
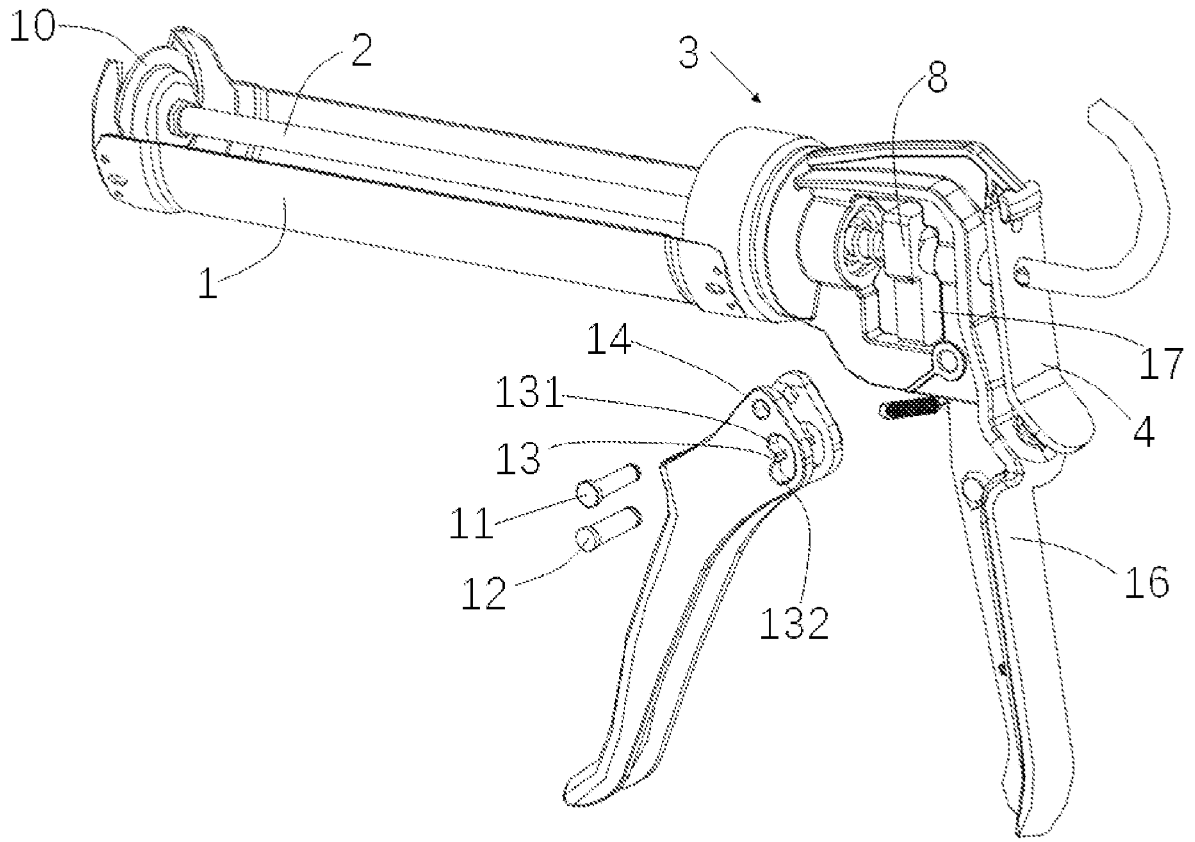
FIG. 2 is an exploded schematic view of part of the glue gun of FIG. 1.

FIGS. 1 to 4 show a preferred embodiment of the present invention. As shown in FIGS. 1 and 2, a glue gun according to this embodiment includes a push device, a main body 3 and a trigger device. One end of the main body 3 is formed as an accommodation part 1 in the shape of a cylinder for accommodating a glue cylinder. The other end of the main body 3 is articulated by a fastener or integrally formed with the trigger device, thus together forming a gun-like fixed handle 16.

The push device includes a push member 8, a push rod 2 and a push body 10. A first end of the push rod 2 is positioned within the accommodation part 1. One end of the accommodation part 1 is coupled to the main body 3, and the other end is provided with an outlet opening for passage of a glue nozzle of the glue cylinder therethrough. The push body 10 is secured to an end portion of the push rod 2 at the first end and able to reciprocate along with the push rod 2. The push member 8 is disposed over a second end of the push rod 2, and a return spring 7 is provided between the push member 8 and the main body 3. As a result of the trigger device pushing the push member 8, the push rod 2 and the push body 10 will move together toward the outlet opening of the accommodation part 1, and the return spring 7 will return the push member 8 to its original position. The push rod 2 is provided with a brake 4, and a compression spring 9 is disposed between the brake 4 and the main body 3. Urged by the compression spring 9, the brake 4 will restrain the push rod 2 so that the push rod 2 can move only toward the accommodation part 1. In order to install the glue cylinder, the brake 4 is pressed to release the push rod 2, allowing the push rod 2 to be changed in position. The brake 4 cooperates with a limiting groove 31 of the main body 3. One end of the brake 4 is movable between a first limiting end 32 and a second limiting end 33 of the limiting groove 31. When at the second limiting end 33, the brake 4 is biased by the compression spring 9 to restrain the push rod 2. In order to enable glue dispensing, the push member 8 is pushed toward the outlet opening of the accommodation part 1, causing the push rod 2 and the brake 4 to together. As a result, the brake 4 moves from the second limiting end 33 toward the first limiting end 32, without relative displacement between the push rod 2 and the brake 4. That is, the brake 4 has an idle stroke. When the brake 4 reaches the first limiting end 32, it will be stopped by the first limiting end 32 and not move any more. Moreover, at this time, the brake 4 will not restrain the push rod 2 and allow it to further move toward the accommodation part 1, resulting in relative displacement between the push rod 2 and the brake 4. The idle stroke is the distance between the first limiting end 32 and the second limiting end 33. Preferably, the idle stroke is 3-5 mm. When a movable handle 5 is released after the glue dispensing is finished, urged by the return spring 7, the push member 8 will move away from the accommodation part 1, causing the push rod 2 to move therewith. When the push rod 2 reaches the aforementioned location at which it is restrained by the brake 4, the brake 4 will also move with the push rod 2 from the first limiting end 32 toward the second limiting end 33, thereby releasing the force on the glue in the glue cylinder. As a result, internal stress within the glue in the glue cylinder is released, avoiding the glue from flowing out through the glue outlet. When reaching the second limiting end 33, the brake 4 is urged by the compression spring 9 to lock the push rod 2, with the push member 8 further moving away from the push rod 2 until the movable handle 5 is returned to the original position. The glue can be continuously dispensed by repeating the above actions.

The trigger device includes the movable handle 5 and the fixed handle 16. The movable handle 5 is coupled to the fixed handle 16 by a pivot pin shaft 12. The movable handle 5 is provided with an actuator 11, which passes through a hole 14 in the movable handle 5 and comes into contact with the push member 8. The movable handle 5 is provided with a slide slot 13, which is an arc-shaped structure defining two gear positions, i.e., a first gear position 131 and a second gear position 132. The first gear position 131 and the second gear position 132 may be defined respectively at two end portions of the slide slot 13. The slide slot 13 has a width at the first gear position 131 and the second gear position 132 that is greater than its width at its remaining portion. The pivot pin shaft 12 can slide within the slide slot 13. When the pivot pin shaft 12 slides to the first gear position 131 of the slide slot 13. A tension spring 6 is provided between the movable handle 5 and the fixed handle 16. One end of the tension spring 6 is coupled to a tension spring slot 15 in the movable handle 5, and the other end is coupled to the fixed handle 16. The tension spring 6 applies a pretension to the movable handle 5 to retain the pivot pin shaft 12 at one of the gear positions. When a gripping force is applied to the movable handle 5, the pivot pin shaft 11 urges a thrust surface 17 of the push member 8, causing movement of the push rod 2. When the force is removed, the push rod 2 is locked by the brake 4, and the push member 8 slides under the action of the return spring 7 back to its original position relative to the main body 3, getting ready for the next cycle.

Figure 3:
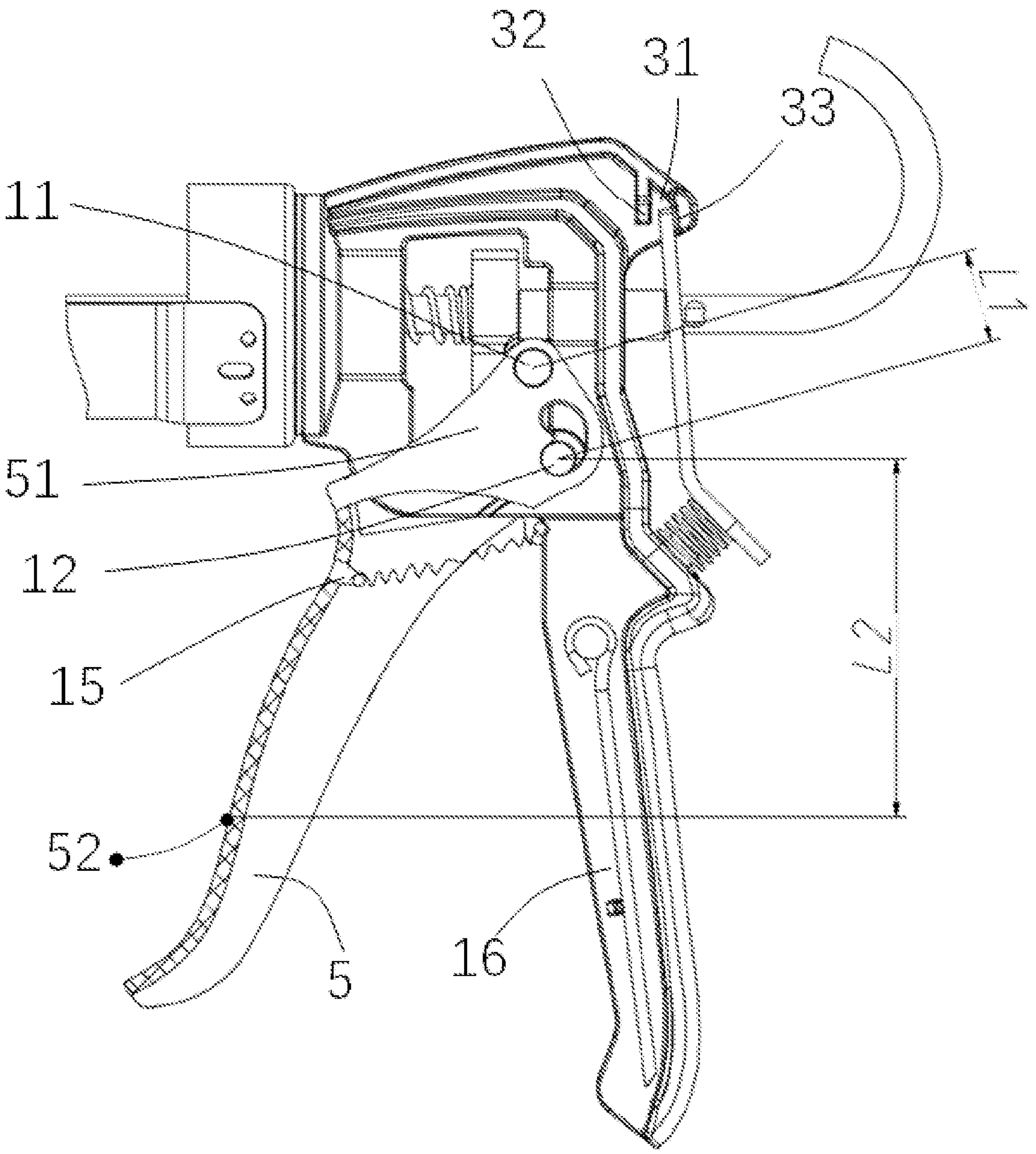
FIG. 3 is a schematic illustration of a first gear position of FIG. 1.
Figure 4:
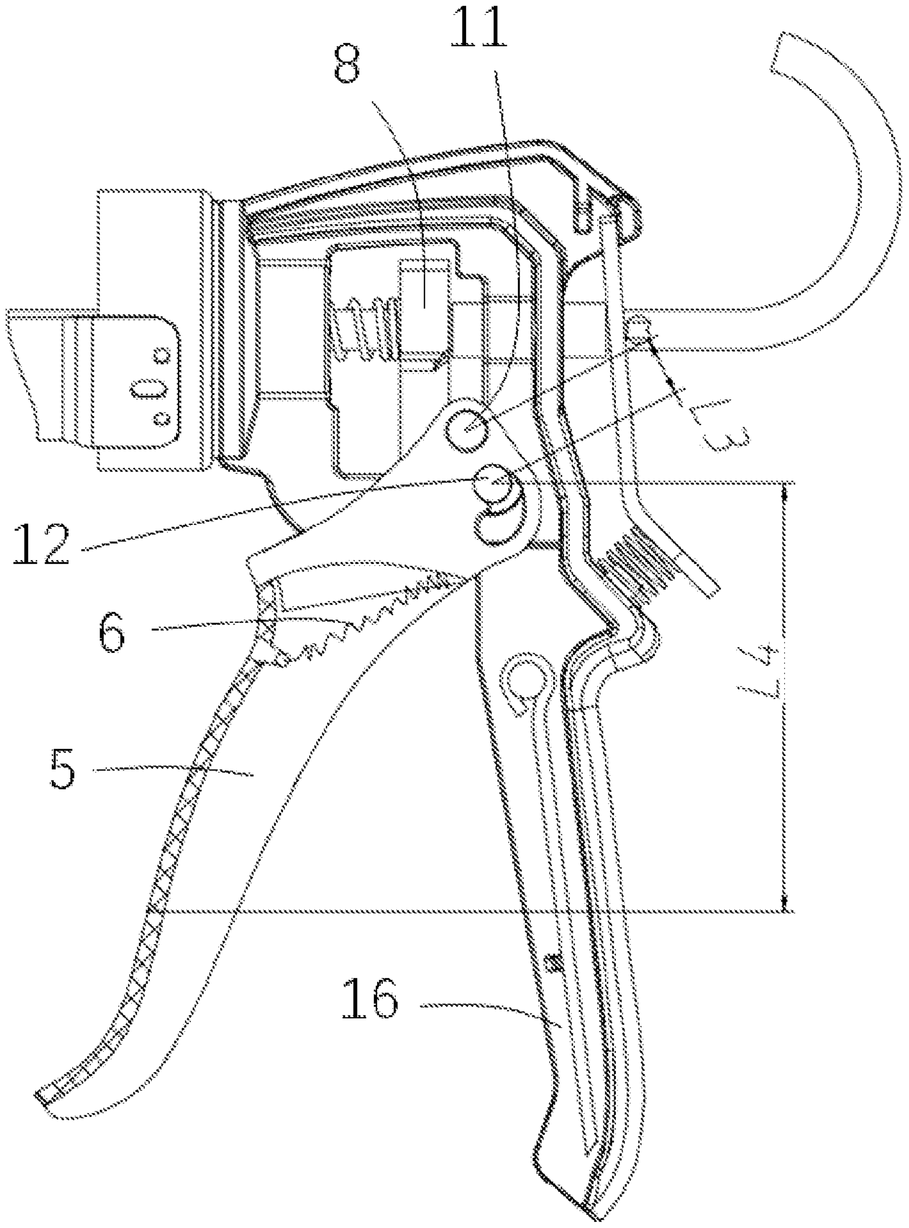
FIG. 4 is a schematic illustration of a second gear position of FIG. 1.
Figure 5:
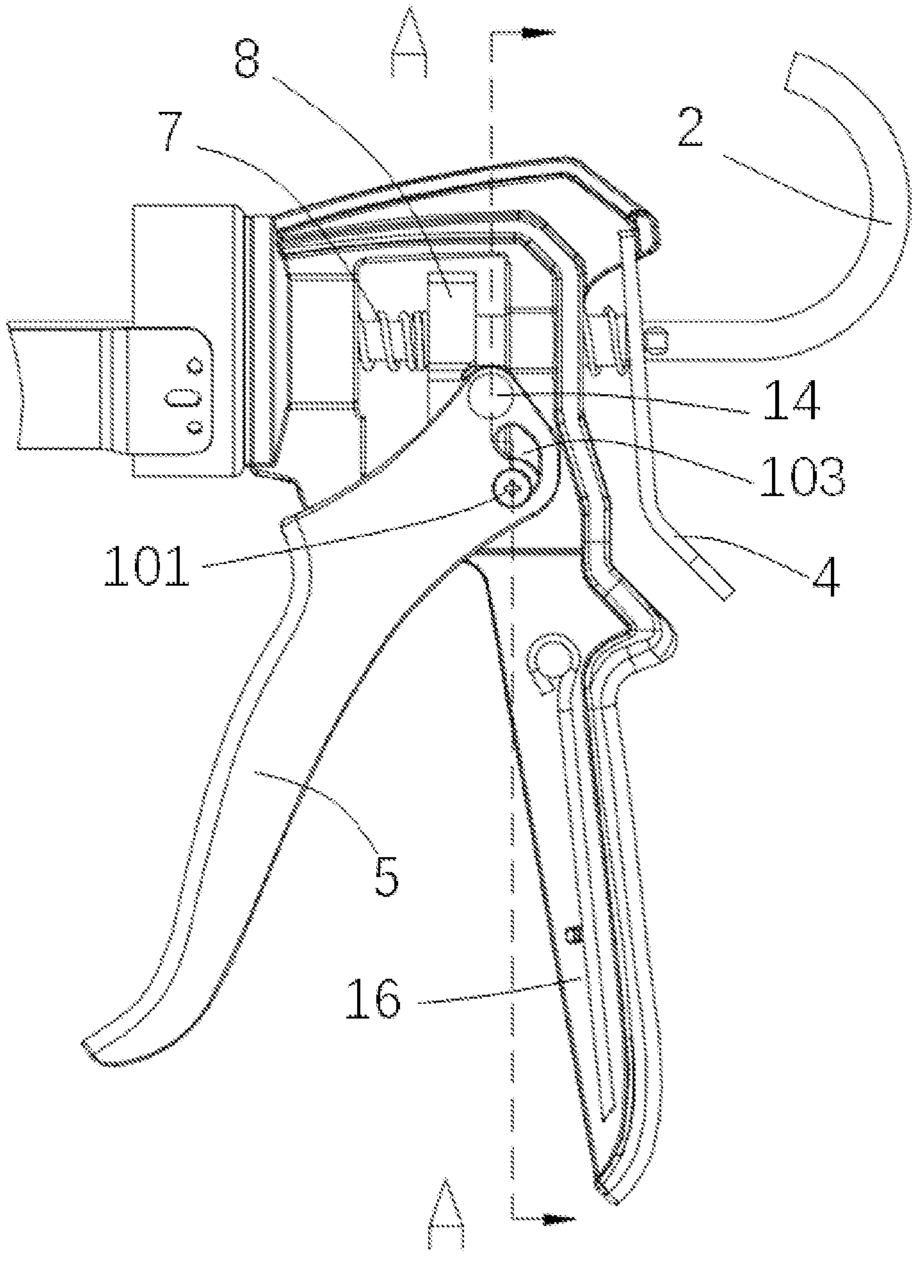
FIG. 5 is a schematic diagram showing the structure of a glue gun according to a second embodiment of the present invention.
Figure 6:
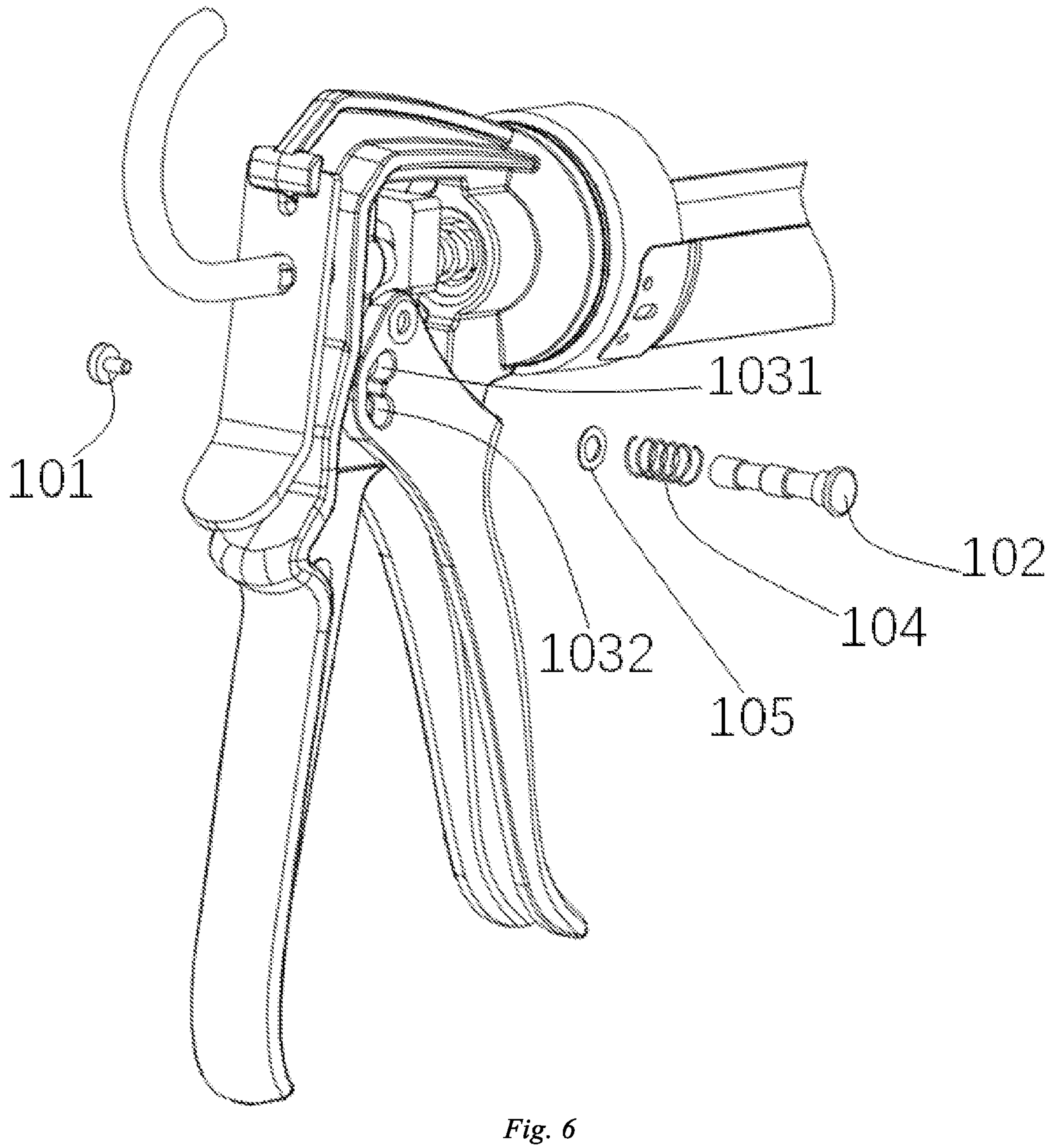
FIG. 6 is an exploded schematic view of part of the glue gun of FIG. 5.
Figure 7:
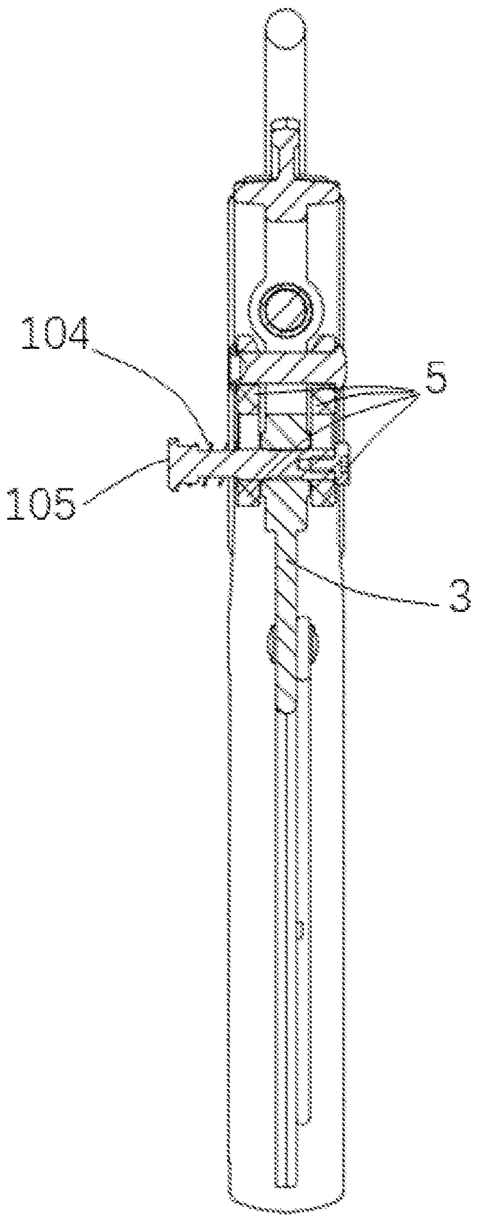
FIG. 7 is a schematic cross-sectional view of the glue gun of FIG. 5 along the A-A direction.
Figure 8:
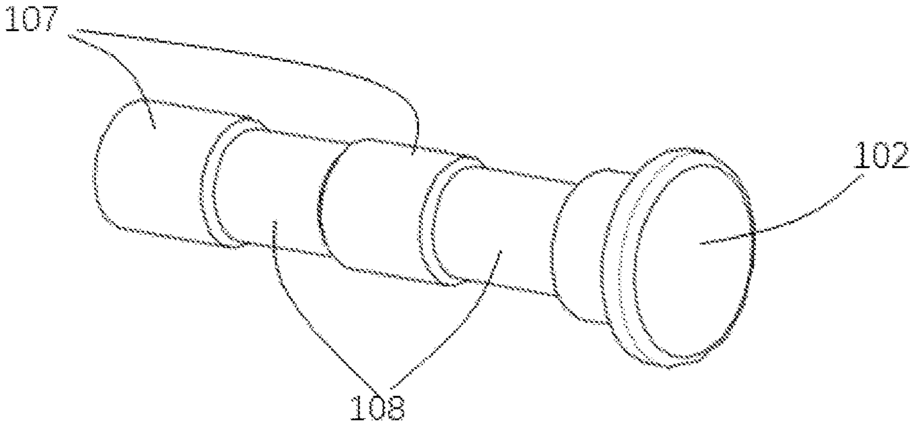
FIG. 8 is a schematic diagram showing the structure of a stepped pin shaft of FIG. 5.

FIGS. 3 and 4 show a spacing change between the pivot pin shaft 12 and the actuator 11 when the pivot pin shaft 12 shifts from one of the gear positions to the other. The spacing between the pivot pin shaft 12 and the actuator 11 when the pivot pin shaft 12 is located at the first gear position 131 is denoted as L3. Here, the spacing refers to the distance between center axes of the pivot pin shaft 12 and the actuator 11 (in FIGS. 3 and 4, the center axes of the pivot pin shaft 12 and the actuator 11 both extend perpendicular to the figure plane, and the spacing is measured as the distance between the centers of the circles representing the pivot pin shaft 12 and the actuator 11, which are drawn on a side surface 51 of the movable handle 5 facing the reader). A vertical spacing between the pivot pin shaft 12 and a force applied to the movable handle 5 is denoted as L4. This vertical spacing refers to a distance between the center axis of the pivot pin shaft 12 and a point of force application 52 on the movable handle 5 in a vertical direction Y. When the pivot pin shaft 12 is located at the second gear position 132, the spacing between the pivot pin shaft 12 and the actuator 11 is denoted as L1 and a vertical spacing between the pivot pin shaft 12 and a force applied to the movable handle 5 as L2. Since the pivot pin shaft 12 will experience a position change relative to the actuator 11 when it shifts from one of the gear positions to the other, L1>L3. Moreover, as the pivot pin shaft 12 is fixed in position regardless of which of the gear positions it is located at, L2=L4. When the pivot pin shaft 12 is located at the second gear position 132, if a force F is applied to the movable handle 5 and the actuator 11 applies a force F1 to the push member 8, then F*L2=F1*L1. When the pivot pin shaft 12 is located at the first gear position 131, if the same force F is applied to the movable handle 5 and the actuator 11 applies a force F2 to the push member 8, then F*L4=F2*L3. Thus, as a result of the same force F applied to the movable handle, since L1>L3, F1<F2. That is, a pushing force resulting from a force applied to the movable handle 5 when the pivot pin shaft 12 is at the first gear position 131 is greater than a pushing force resulting from the same force applied to the movable handle 5 when the pivot pin shaft 12 is at the second gear position 132. When the pivot pin shaft 12 is located at the second gear position 132, as a result of the movable handle 5 pivoting about the pivot pin shaft 12, the actuator 11 will move along an arc having a radius as long as L1, pushing the push member 8 to move forward. When the pivot pin shaft 12 is located at the second gear position 131, as a result of the movable handle 5 pivoting about the pivot pin shaft 12, the actuator 11 will move along an arc having a radius as long as L3, pushing the push member 8 to move forward. Since L1>L3, as a result of the same force F applied to the movable handle, the push member 8 is advanced farther when the pivot pin shaft 12 is located at the gear position 132. Therefore, the gear position 132 is suitable for use with glue with low viscosity because a sufficiently large stroke can be achieved with a relatively small pushing force. Through shifting the pivot pin shaft 12 from one of the gear positions to the other, the spacing between the pivot pin shaft 12 and the actuator 11 can be varied, causing the actuator 11 to exert a different pushing force on the push member 8. As a result, the stroke of the push rod 2 is changed, making it suitable for use with a fluid with a different level of fluidity. In other words, in this embodiment, the adjustability of the ratio of the spacing between the pivot pin shaft 12 and the point of force application 52 to the spacing between the pivot pin shaft 12 and the stressed point (i.e., the point where the actuator 11 comes into contact with the push member) enables switching between different forces on the push member and between different power transmission speeds (i.e., speeds at which the push rod is pushed).

In other embodiments, the slide slot 13 may be provided in the fixed handle 5 and may define two or more gear positions. The pivot pin shaft 12 is configured to slide within the slide slot 13 so as to switch between the gear positions 131, 132.

Embodiment 2

Figure 9:
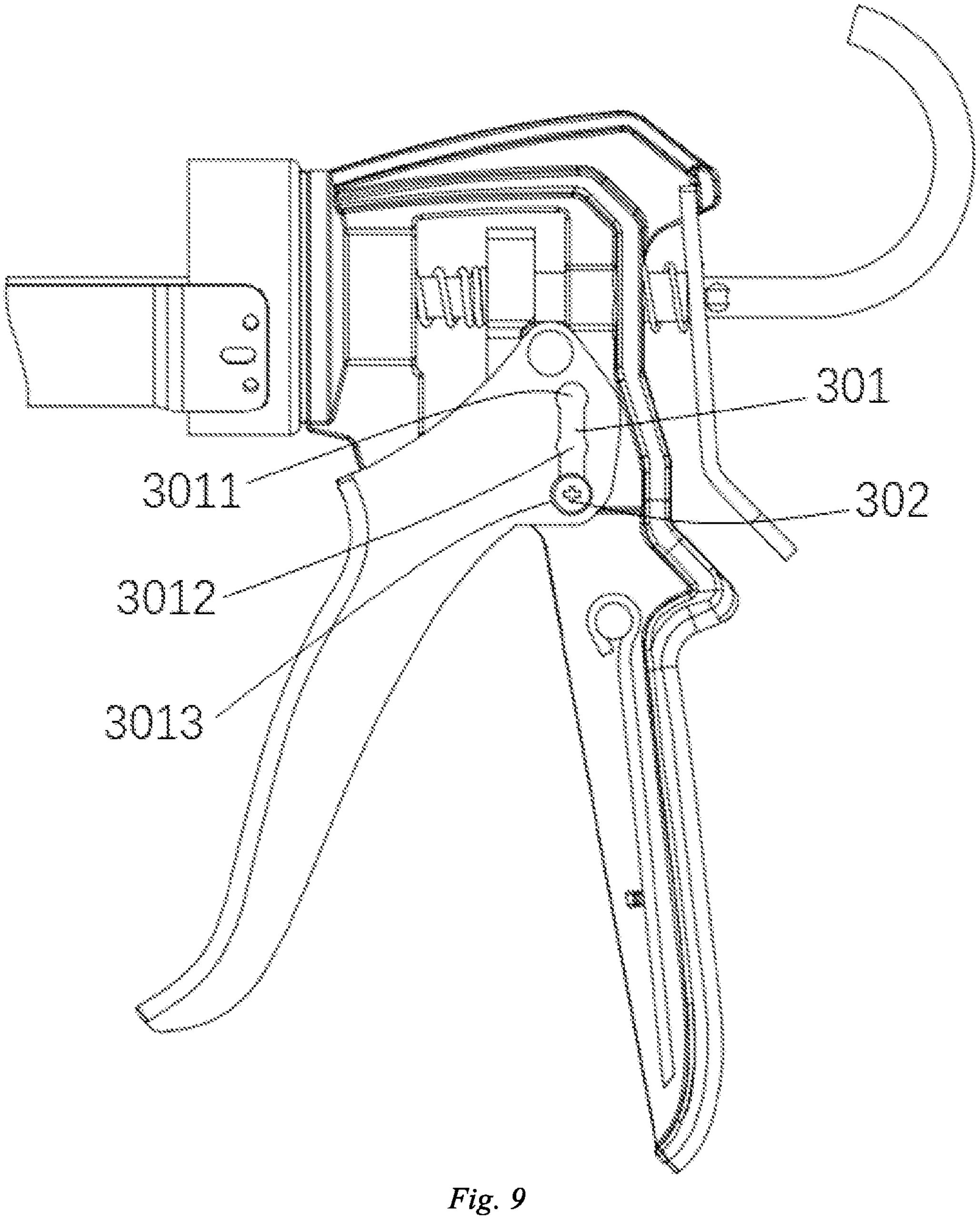
FIG. 9 is a schematic diagram showing the structure of a linear-shaped slide slot of FIG. 5.

In another embodiment, as shown in FIGS. 5 to 9, the tension spring 6 between the movable handle 5 and the fixed handle 16 is omitted, and the pivot pin shaft 12 is configured as a stepped pin shaft 102 having a press end and another end secured with a screw 101. A spring 104 and a washer 105 are disposed over the press end. The stepped pin shaft 102 has a first shaft-diameter section 107 and a second shaft-diameter section 108 (see FIG. 8). The slide slot 103 defines a first gear position 1031 and a second gear position 1032. The first gear position 1031 and the second gear position 1032 may be defined respectively at two end portions of the slide slot 103. The slide slot 103 has a width at the first gear position 131 and the second gear position 132 that is greater than its width at its remaining portion (i.e., a middle portion connecting the first gear position 1031 and the second gear position 1032). The stepped pin shaft 102 can slide within the slide slot 103 so as to move to the first gear position 1031, or to the second gear position 1032. A shaft diameter of the first shaft-diameter section 107 is greater than a width of the middle portion of the slide slot 103, while a shaft diameter of the second shaft-diameter section 108 is smaller than the width of the slide slot 103. Biased by the spring 104, the first shaft-diameter section 107 is retained at the gear position 1031 or 1032. When the press end is pressed, the stepped pin shaft 102 moves axially, bringing the second shaft-diameter section 1032 at the gear position 1031 or 1032. Since the shaft diameter of the second shaft-diameter section 1032 is smaller than the width of the slide slot 103, the stepped pin shaft 102 become movable and can be slid within the slide slot 103 from the gear position to the other gear position, accomplishing a gear position shift. When the press end is released, the stepped pin shaft 102 is axially moved in the opposite direction under the action of resilience of the spring 104, bringing the first shaft-diameter section 107 back at the current gear position. Since the shaft diameter of the first shaft-diameter section 107 is greater than the width of the slide slot 103, the stepped pin shaft 102 is fixed at the current location in the slide slot 103. As such, the stepped pin shaft 102 is fixed at the current gear position. Preferably, as shown in FIG. 9, the slide slot 301 is linear-shaped and defines multiple gear positions 3011, 3012 and 3013. The slide slot 301 has a width at the gear positions that is greater than its width at its remaining portions (i.e., the portions between adjacent gear positions). The stepped pin shaft 302 slides in the slide slot 301 to shift from one gear position to another. In this embodiment, through displacing the stepped pin shaft in the slide slot, the stepped pin shaft can be shifted between different gear positions, thus varying the spacing between the stepped pin shaft and the actuator 11 and hence the vertical spacing between the stepped pin shaft and the point of force application on the movable handle 5. As a result, the actuator 11 can exert different pushing forces on the push member 8, imparting different strokes to the push rod 2, which are suitable for fluids with different levels of fluidity. In other words, in this embodiment, the ratio of the spacing between the stepped pin shaft and the point of force application to the spacing between the stepped pin shaft and the stressed point (i.e., the point where the actuator 11 comes into contact with the push member) is adjustable, enabling switching between different forces on the push member and between different power transmission speeds (i.e., speeds at which the push rod is pushed).

Embodiment 3

Figure 10:
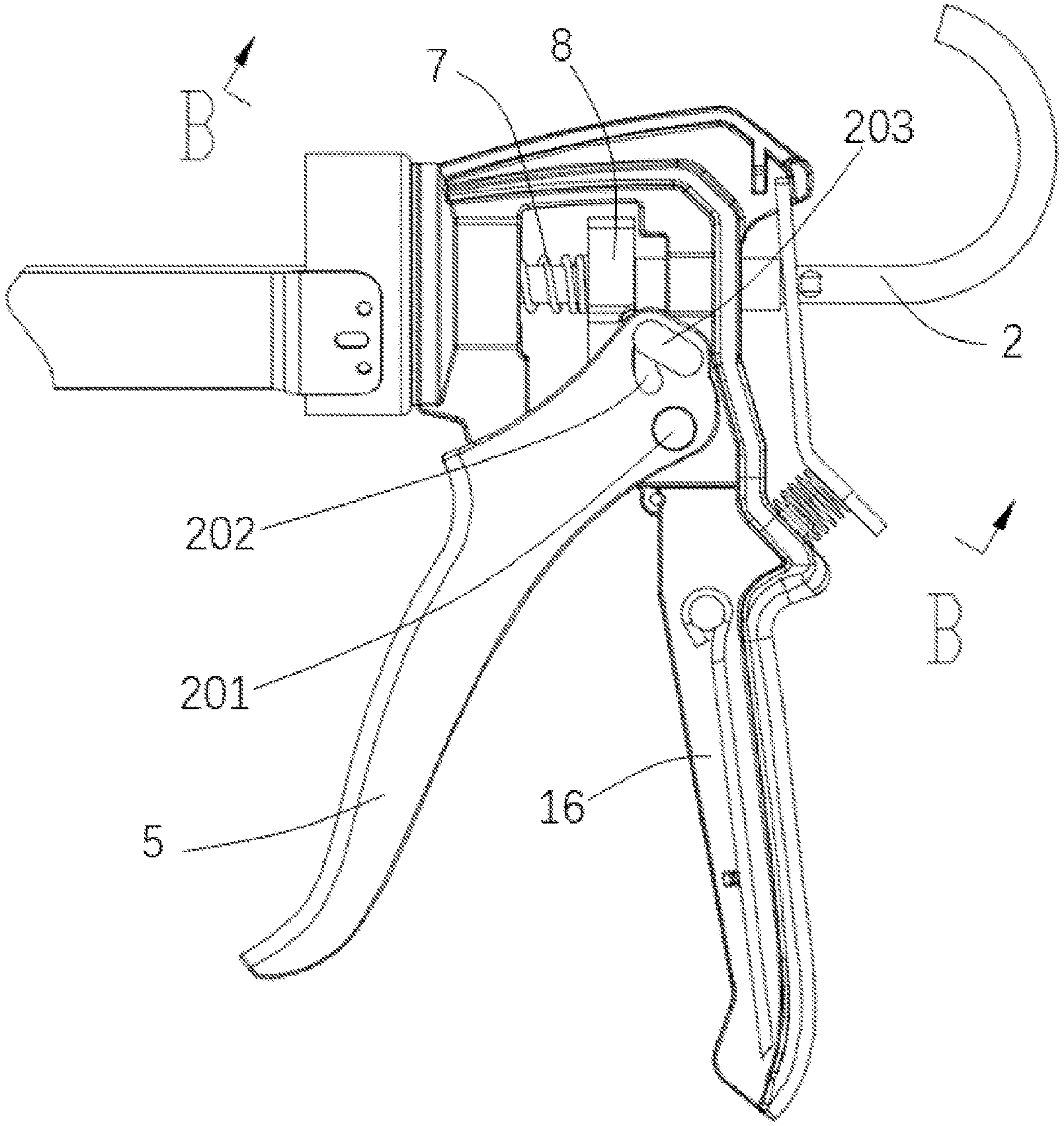
FIG. 10 is a schematic diagram showing the structure of a glue gun according to a third embodiment of the present invention.
Figure 11:
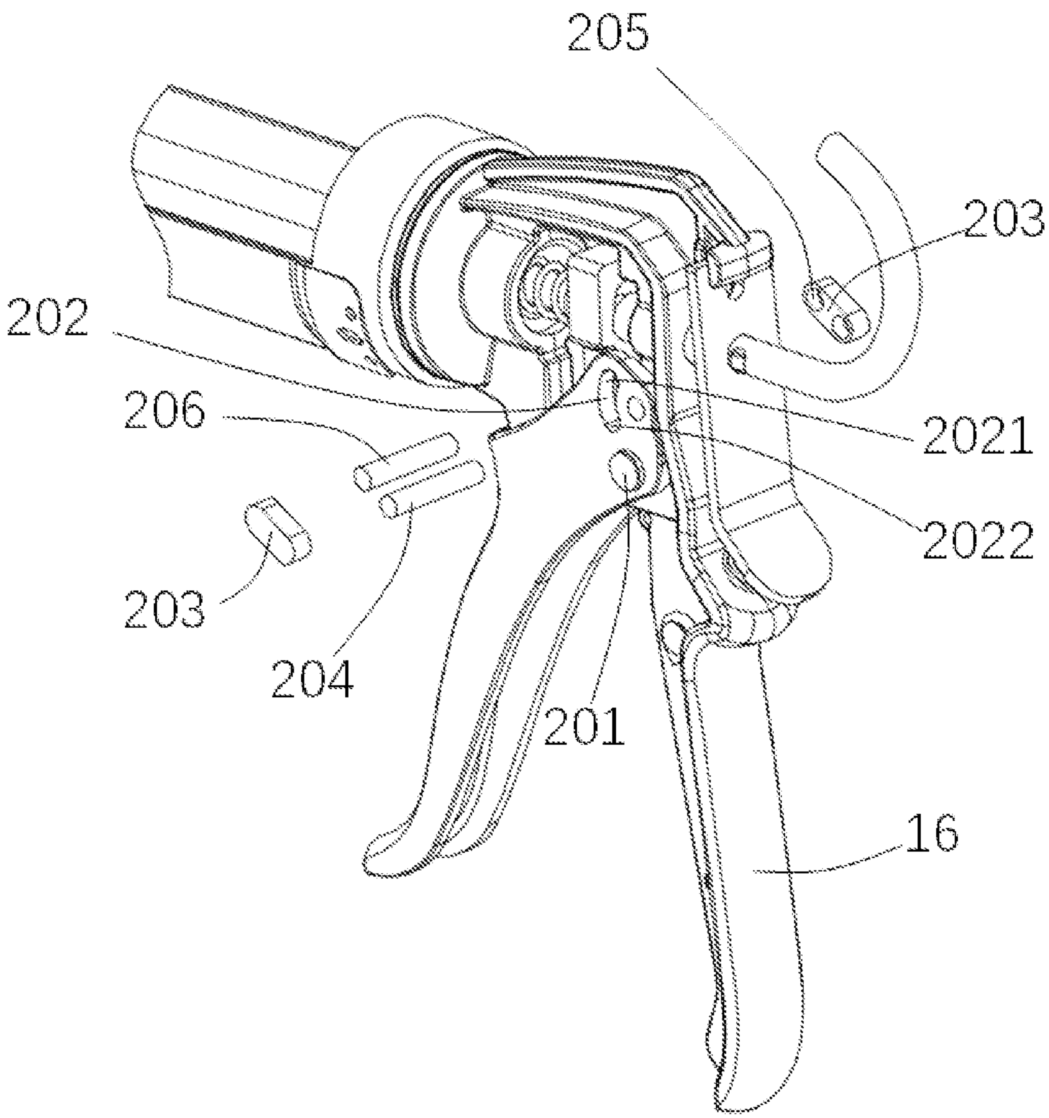
FIG. 11 is a schematic partial view of the structure of FIG. 10.
Figure 12:
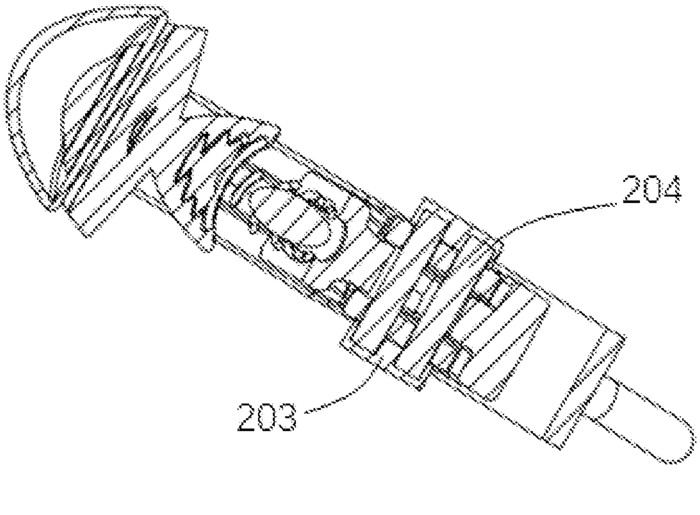
FIG. 12 is a schematic cross-sectional view of an actuator of FIG. 10.

FIGS. 10 to 12 show another preferred embodiment of the present invention. The movable handle 5 is articulated with the fixed handle 16 by the pivot pin shaft 201. The movable handle 5 is further provided with a slide slot 202. The actuator further includes a pivot shaft 204 and an actuating member 206 in contact with the push member 8. The actuating member 206 is configured to be able to slide within the slide slot 202 about the pivot shaft 204. The slide slot 202 defines a first gear position 2021 and a second gear position 2022. The first gear position 2021 and the second gear position 2022 may be defined respectively at two end portions of the slide slot 202. A toggle 203 is coupled to the pivot shaft 204 and the actuating member 206. By means of the toggle 203, the actuating member 206 can be caused to slide between the two ends of the slide slot 202, where the actuating member 206 comes into different locations of the push member 8, thus enabling switching between the gear positions 2021 and 2022. A spacing between the actuating member 206 and the pivot pin shaft 201, as well as a vertical spacing between the pivot pin shaft 201 and a point of force application on the movable handle varies at the different gear positions. As a result, the actuating member 206 can exert different pushing forces on the push member 8, imparting different strokes to the push rod 2, which are suitable for fluids with different levels of fluidity. In Embodiments 1 and 2, the spacing between the pivot pin shaft and the actuator is varied by switching the pivot pin shaft between different gear positions. In contrast, in this embodiment, the spacing between the actuating member and the pivot pin shaft is varied by switching the actuating member 206 between different gear positions. In other words, in this embodiment, the ratio of the spacing between the pivot pin shaft 201 and the point of force application to the spacing between the pivot pin shaft 201 and the stressed point (i.e., the point where the actuating member 206 comes into contact with the push member 8) is adjustable, enabling switching between different forces on the push member and between different power transmission speeds (i.e., speeds at which the push rod is pushed).

Embodiment 4

Figure 13:
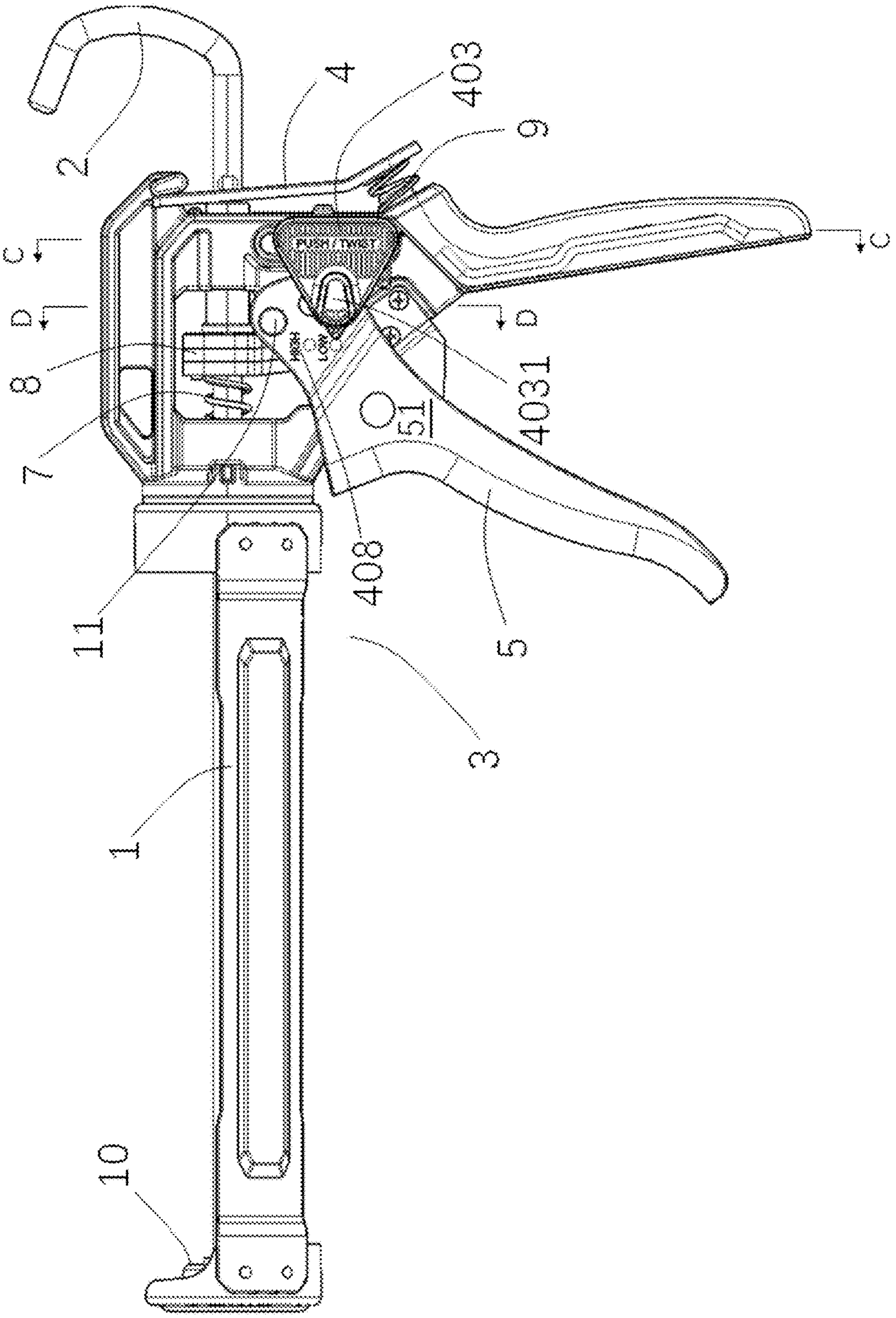
FIG. 13 is a schematic diagram showing the structure of a glue gun according to a fourth embodiment of the present invention.
Figure 14:
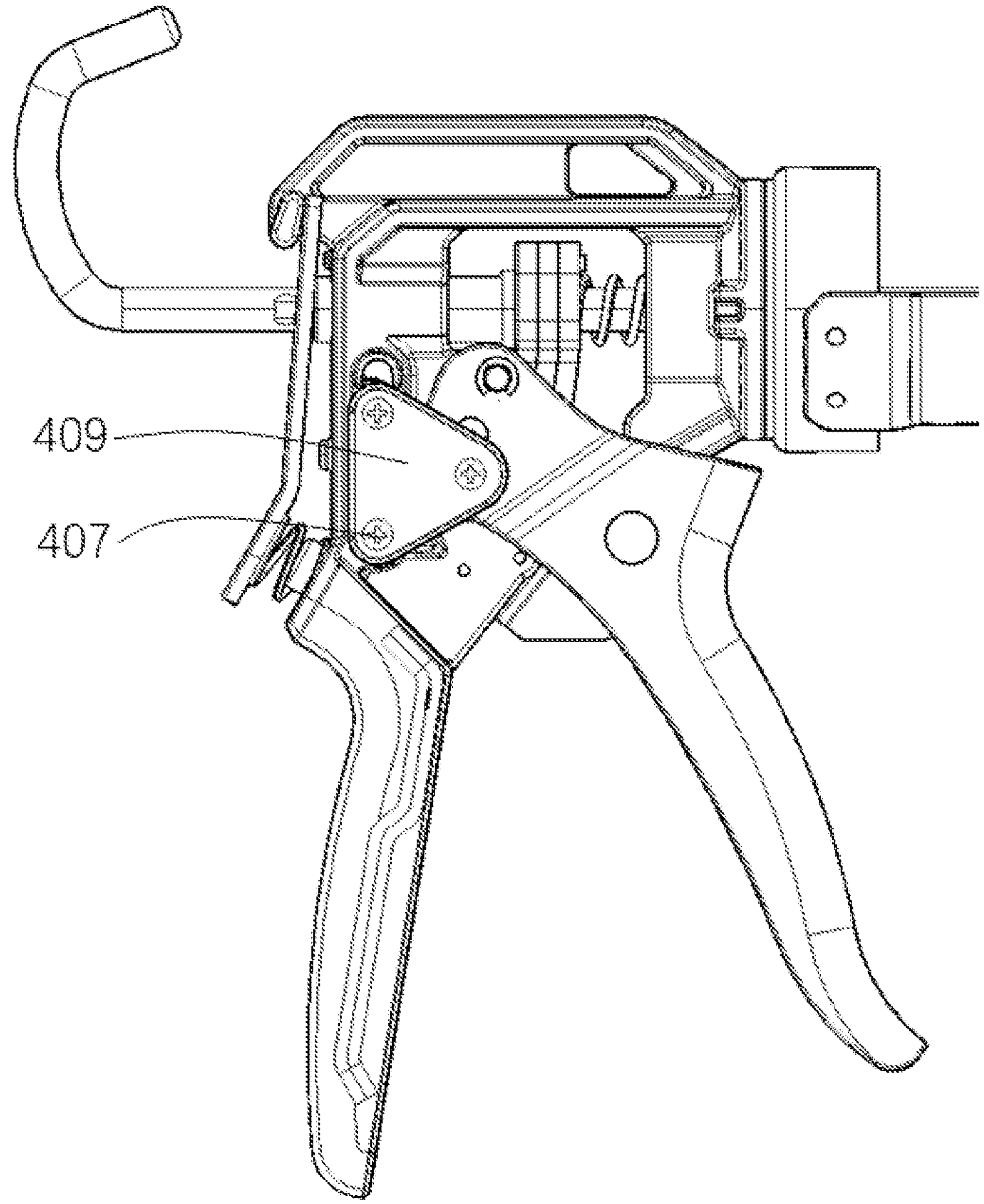
FIG. 14 is a partial rear view of FIG. 13.

FIGS. 13 to 19 show another preferred embodiment of the present invention. Referring to FIG. 13, this embodiment has most of the features of Embodiment 1, such as the push member 8, the push rod 2, the push body 10, the main body 3, the accommodation part 1, the brake 4, the movable handle 5, the return spring 7, the compression spring 9, the actuator 11, the fixed handle 16 and other components and the coupling methods of them, and a repeated description thereof is unnecessary. This embodiment differs from Embodiment 1 in that switching of the pivot pin shaft between the gear positions is effectuated in a different way.

Figure 15:
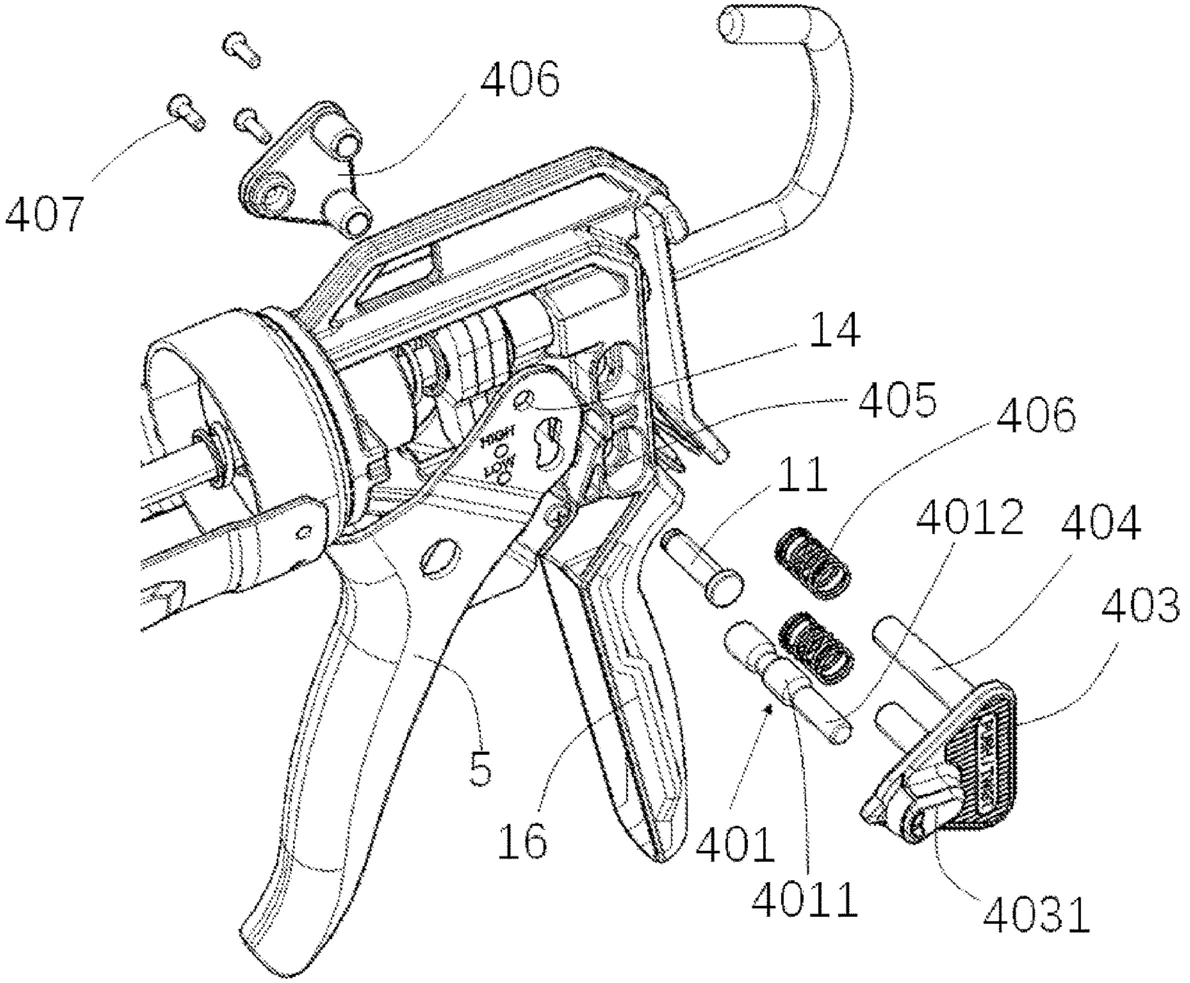
FIG. 15 is an exploded schematic view of FIG. 13.
Figure 16:
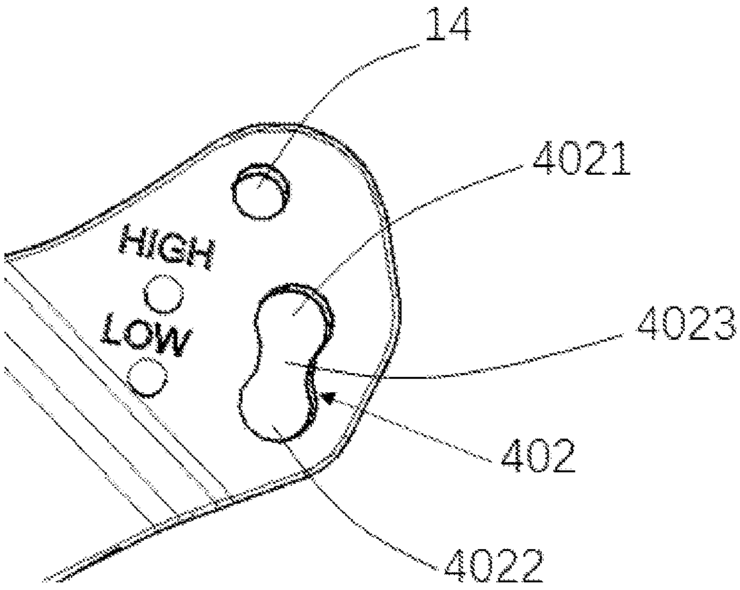
FIG. 16 is an enlarged partial view of FIG. 13.
Figure 17:
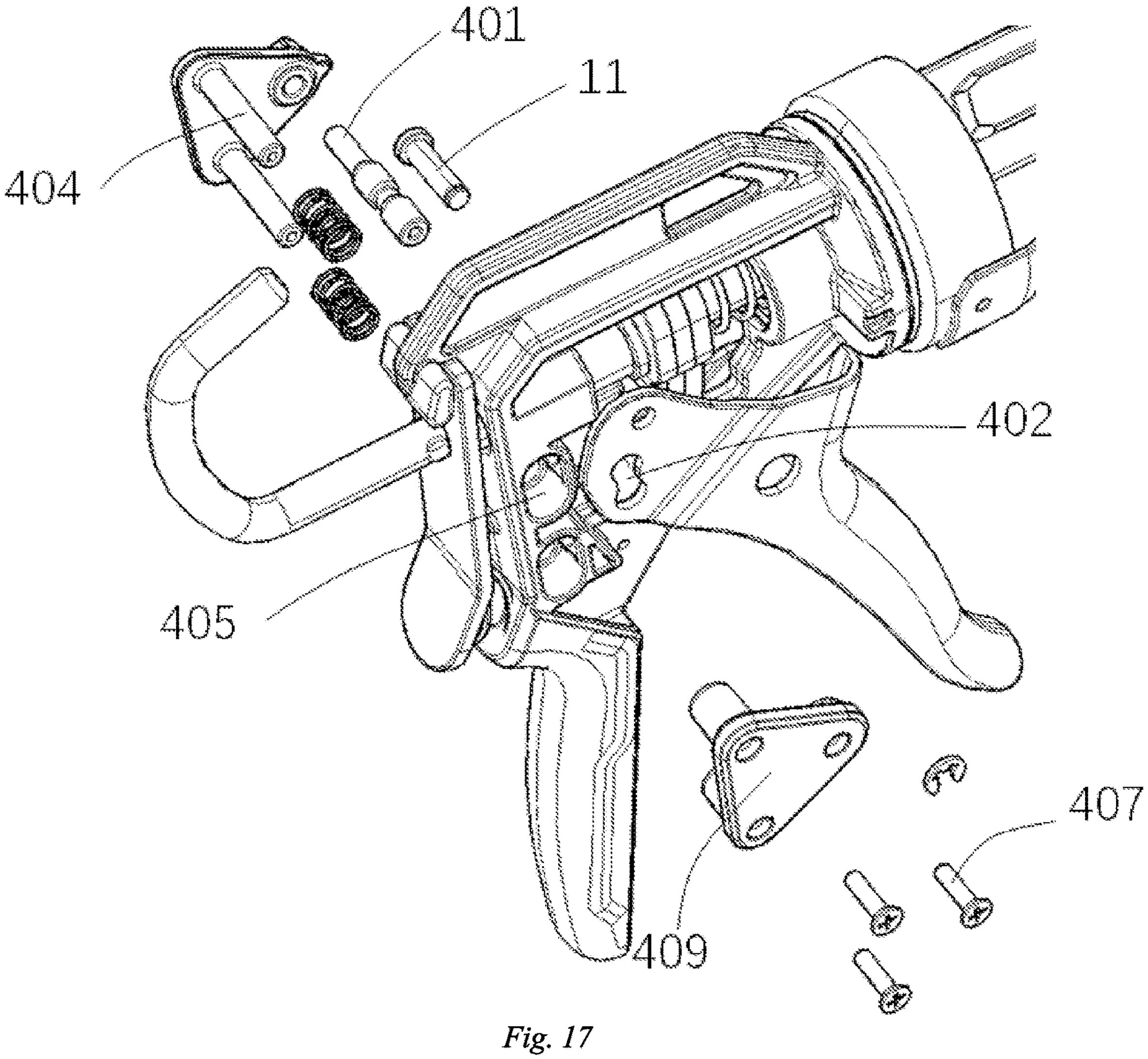
FIG. 17 is a schematic illustration of FIG. 15 at a different perspective.
Figure 18:
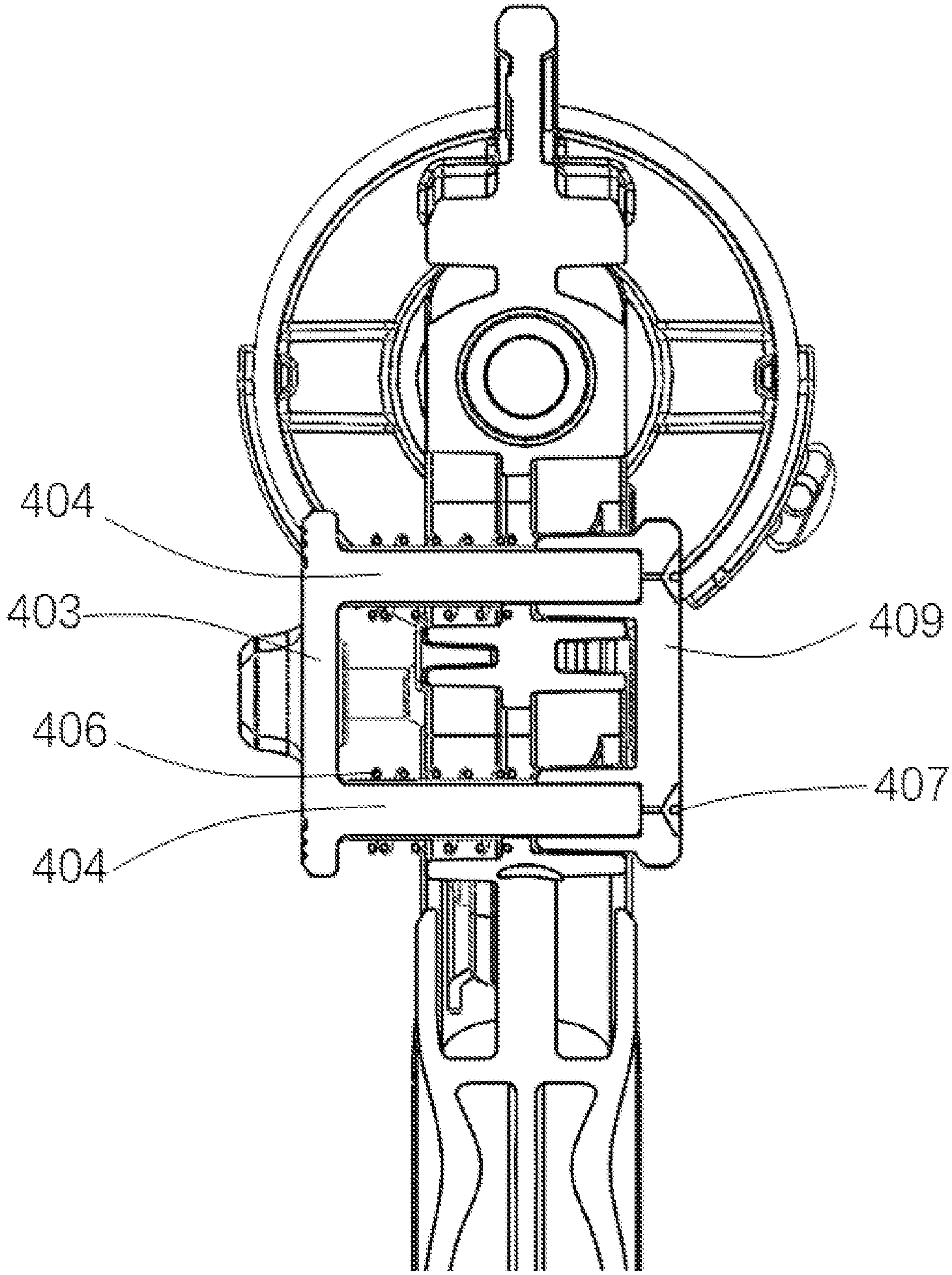
FIG. 18 is a schematic cross-sectional view of FIG. 15 along the C-C direction.
Figure 19:
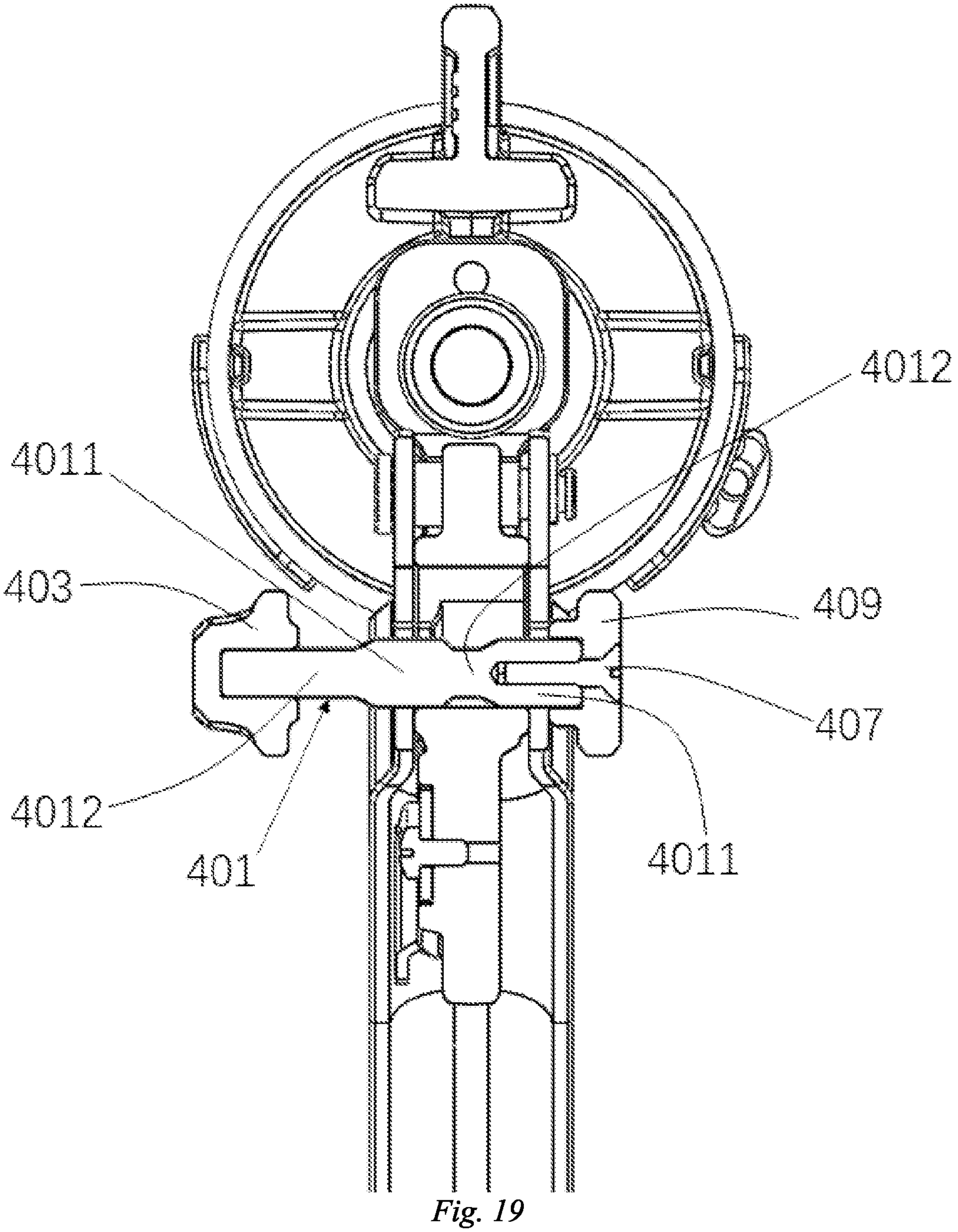
FIG. 19 is a schematic cross-sectional view of FIG. 15 along the D-D direction.

Referring to FIG. 15, in this embodiment, the actuator 11 passes through a hole 14 in the movable handle 5 and comes into contact with the push member 8. Thus, it can drive the push member 8 to cause the push rod 2 to move. The movable handle 5 is coupled to the fixed handle 16 via a pivot pin shaft 401. As a result of a force applied to the movable handle 5, the movable handle 5 can pivot about the pivot pin shaft 401. The movable handle 5 is provided with a slide slot 402. Referring to FIG. 16, the slide slot 402 defines a first gear position 4021 and a second gear position 4022. The first gear position 4021 and the second gear position 4022 may be defined respectively at two ends of the slide slot 202. That is, holes are formed respectively at the two ends of the slide slot 402 to provide the first gear position 4021 and the second gear position 4022. The two holes are brought into communication by a communication portion 4023, thereby together forming the slide slot 402. A diameter of the holes is greater than a width of the communication portion 4023. The pivot pin shaft 401 may slide within the slide slot 402 to the first gear position 4021, or to the second gear position 4022. Referring to FIGS. 15 and 19, the pivot pin shaft 401 is configured as a stepped pin shaft including a first shaft-diameter section 4011 and a second shaft-diameter section 4012. A shaft diameter of the first shaft-diameter section 4011 is greater than the width of the communication portion 4023 of the slide slot 402, whilst a shaft diameter of the second shaft-diameter section 4012 is smaller than the width of the communication portion 4023 of the slide slot 402. When the first shaft-diameter section 4011 is located at the first gear position 4021 or the second gear position 4022 of the slide slot 402, the pivot pin shaft 401 cannot slide within the slide slot 402, thus retaining the pivot pin shaft 401 at the current gear position. When the second shaft-diameter section 4012 is located within the slide slot 402, since the shaft diameter of the second shaft-diameter section 4012 is smaller than the width of the slide slot 402, the pivot pin shaft 401 is released and can slide within the slide slot 402 under the action of an external force to achieve gear position switching.

Referring to FIGS. 15 and 17 to 19, one end of the pivot pin shaft 401 is coupled to a press member 403, and at least one locating pin 404 is provided on the press member 403. An axial direction of the locating pin 404 is parallel to an axial direction of the pivot pin shaft 401. The fixed handle 16 is provided with at least one locating slot 405. Each locating pin 404 passes through one of the locating slot(s) 405 so as to be able to move therein substantially in the same direction as the sliding of the pivot pin shaft 401 within the slide slot 402. A spring 406 is disposed over the locating pin 404. When the press member 403 is pressed down, both the pivot pin shaft 401 and the locating pin 404 move respectively in their axial directions. When the second shaft-diameter section 4012 of the pivot pin shaft 401 moves into the slide slot 402, the spring 406 over the locating pin 404 is compressed. The press member 403 is then driven to move in a lengthwise direction of the slide slot 402, causing the pivot pin shaft 401 to slide within the slide slot 402 and causing the locating pin 404 to slide within the locating slot 405. After the pivot pin shaft 401 reaches a predetermined one of the gear positions, the press member 403 is released and biased by the spring 406 to return to its original position, and the pivot pin shaft 401 and the locating pin 404 both move with the press member 403. As a result, the first shaft-diameter section 4011 of the pivot pin shaft 401 moves to the gear position 4021 or 4022 of the slide slot 402, retaining the pivot pin shaft 401 at the gear position.

Preferably, there are two locating pins 404, and two locating slots 405 corresponding to the respective locating pins 404 are provided in the movable handle 16. Each of the locating pins 404 is sleeved thereover with a spring 406. The two locating pins 404 may define a triangle together with the pivot pin shaft 401. The two locating pins 404 may be located on the same straight line, which may extend in the lengthwise direction of the locating slots 405. The press member 403 may have a substantially triangular shape.

A stop plate 409 is provided on a side opposite the press member 403, and the other ends of the pivot pin shaft 401 and the locating pin 404 are coupled to the stop plate 409 by fasteners 407 such as screws.

The movable handle 5 is provided thereon with marks 408 indicating the respective gear positions for the pivot pin shaft 401. A raised block 4031 is provided on an external surface of the press member 403 in order to facilitate a user's manipulation of the press member 403 for pressing down or pushing the press member 403.

Similar to Embodiments 1-3, according to this embodiment, the spacing between the pivot pin shaft 401 and the actuator 11 (i.e., the distance between the center axes of the pivot pin shaft 401 and the actuator 11 measured on the side surface 51 of the movable handle 5), as well as the vertical spacing between the pivot pin shaft 401 and the point of force application 52 on the movable handle 5, varies when the pivot pin shaft 401 moves within the slide slot 402 from one gear position to the other. As a result, the actuator 11 comes into contact with the push member 8 at different locations and exerts different forces thereon, imparting different strokes to the push rod 2, which are suitable for fluids with different levels of fluidity. In other words, in this embodiment, the ratio of the spacing between the pivot pin shaft 201 and the point of force application to the spacing between the pivot pin shaft 201 and the stressed point (i.e., the point where the actuator 11 comes into contact with the push member) is adjustable, enabling switching between different forces on the push member and between different power transmission speeds (i.e., speeds at which the push rod is pushed).

Embodiment 5

Figure 20:
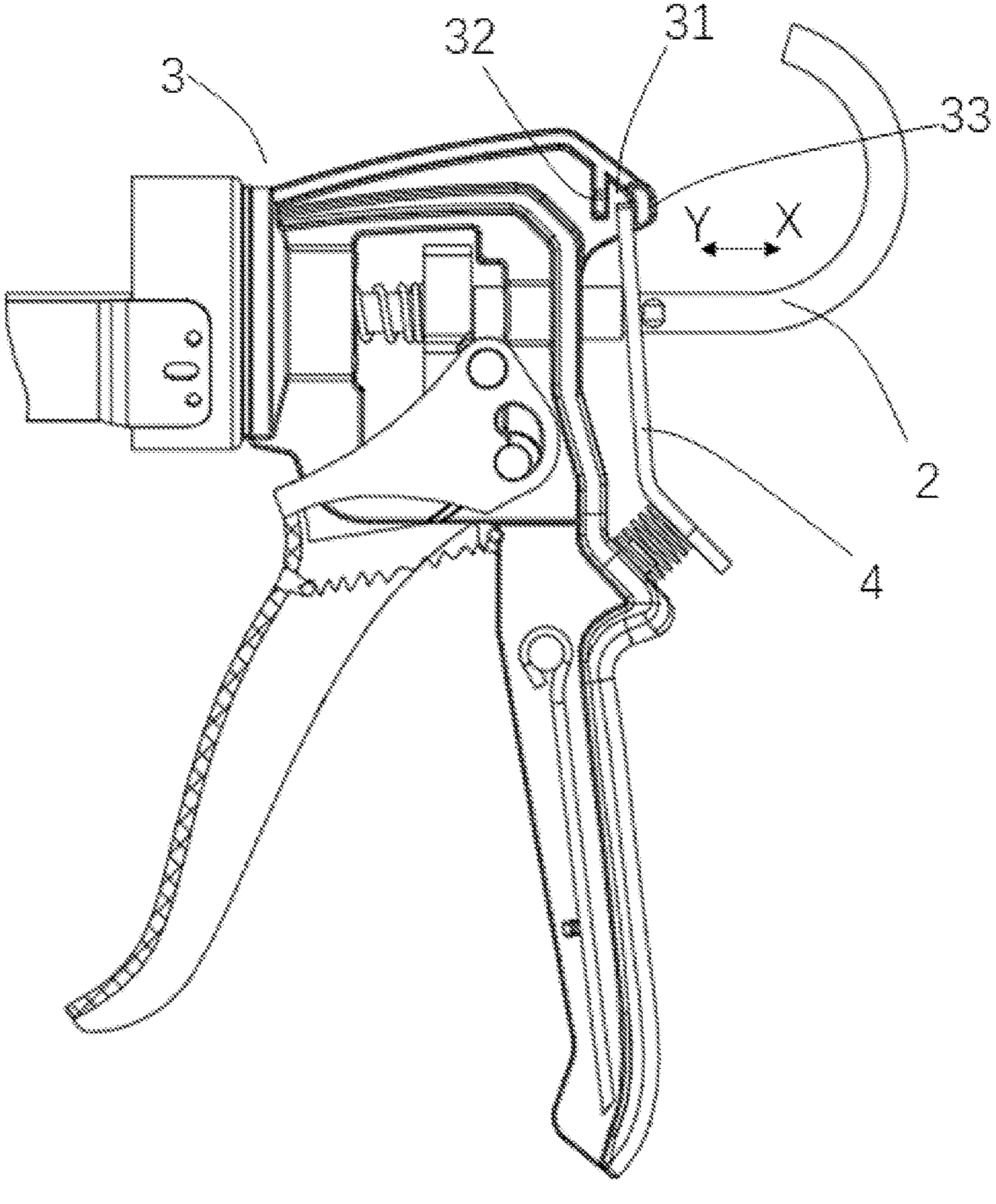
FIG. 20 schematically illustrates how a brake is coupled to a main body in the first to fourth embodiments.
Figure 21:
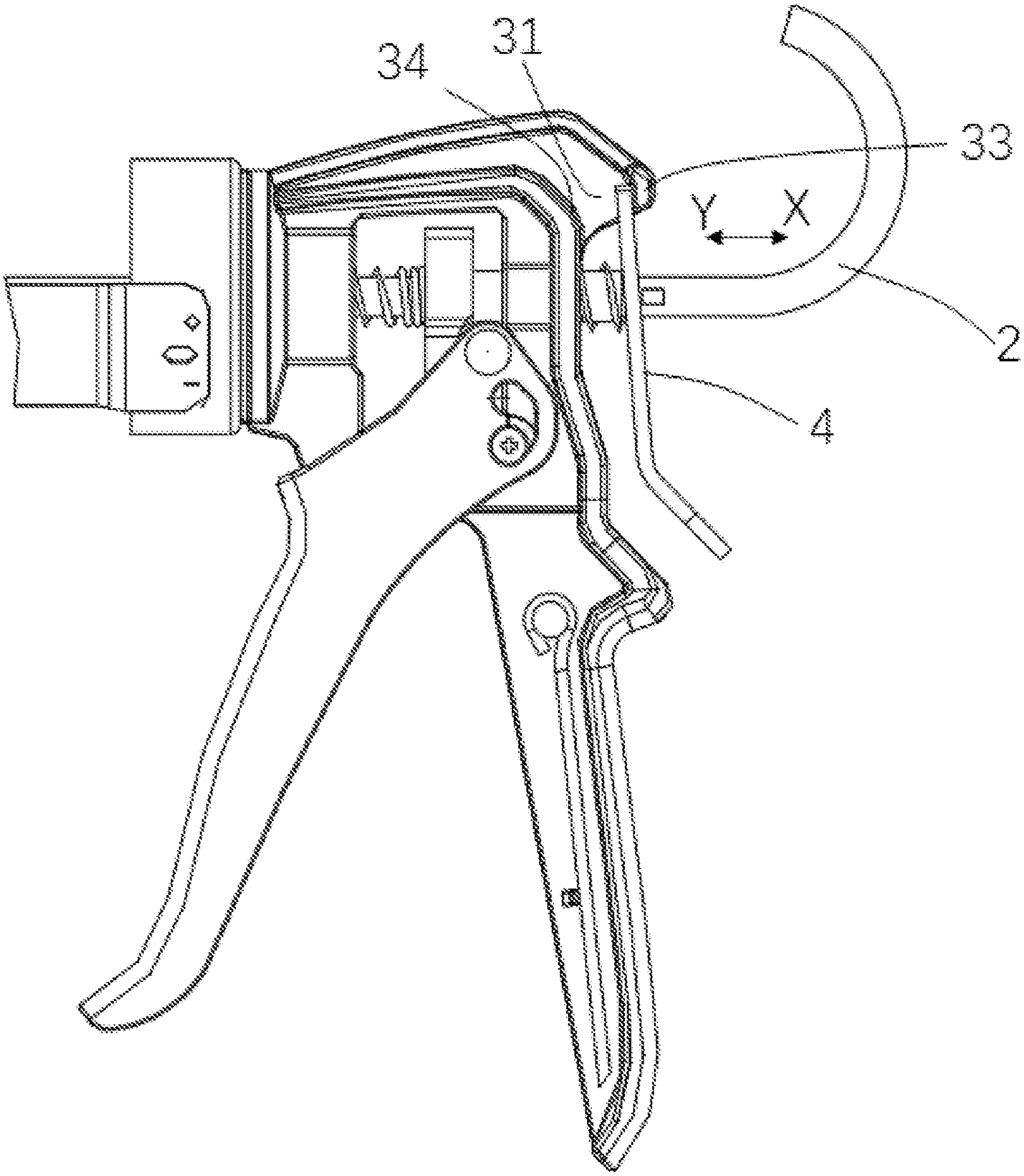
FIG. 21 schematically illustrates how the brake is coupled to the main body in a different manner in the first to fourth embodiments.

In Embodiments 1-4, referring to FIG. 20, the limiting groove 31 is defined in an upper portion of the main body 3 proximate the brake 4, and one end (upper end 41) of the brake 4 is movable in the limiting groove 31. Constrained by the first limiting end 32 and the second limiting end 33 of the limiting groove 31, during glue dispensing, the brake 4 moves from the second limiting end 33 toward the first limiting end 32. After glue dispensing is finished, the handle is released, and the brake 4 moves from the first limiting end 32 toward the second limiting end 33. Of course, the first limiting end 32 may be omitted, and an end portion 34 of the main body 3 facing the brake 4 may instead serve as this limiting end (see FIG. 21). In both these options, the brake 4 has an idle stroke during its movement. That is, in the course of glue dispensing, the actuator 4 will move with the push rod 2, without relative displacement occurring therebetween. When the glue gun is out of operation, after the handle is released, the brake 4 will move backward (in the X direction shown in FIG. 20) together with the push rod 2, thereby releasing any force acting on the glue. As a result, internal stress within the glue is released, avoiding the glue from dripping from the glue cylinder.

However, in some application scenarios, it is desired that, after the handle is released, a force is still continuously applied to the glue in the glue cylinder, causing a continuous drip of the glue. In these cases, in order to attain such a continuous drip of the glue, it is necessary to lock the brake 4 after the handle is released, thereby preventing it from moving with the release of the handle and maintaining it in a state of applying a force.

Moreover, a user is allowed to choose whether to lock the brake 4 as desired. That is, the brake 4 is configured to switch between a locked configuration and a movable configuration. To this end, this embodiment is modified on the basis of Embodiments 1-4 as detailed below.

Figure 22:
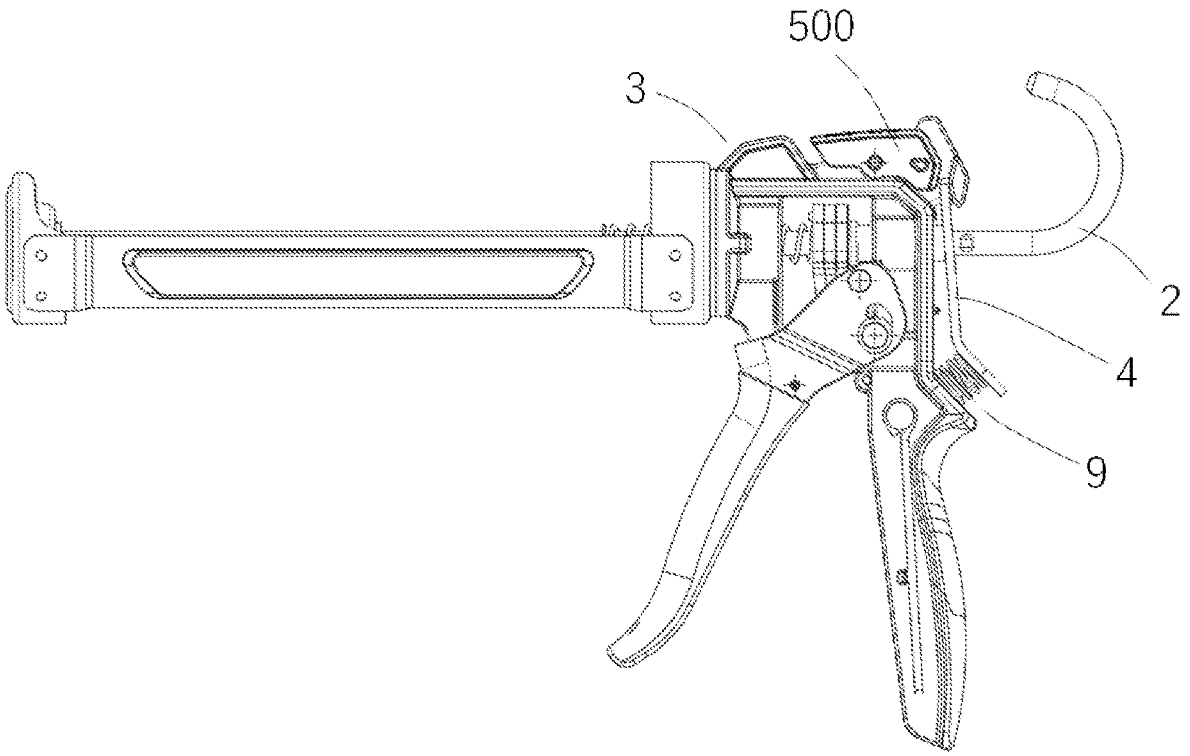
FIG. 22 is a schematic diagram showing the structure of a glue gun according to a fifth embodiment in a first configuration.
Figure 23:
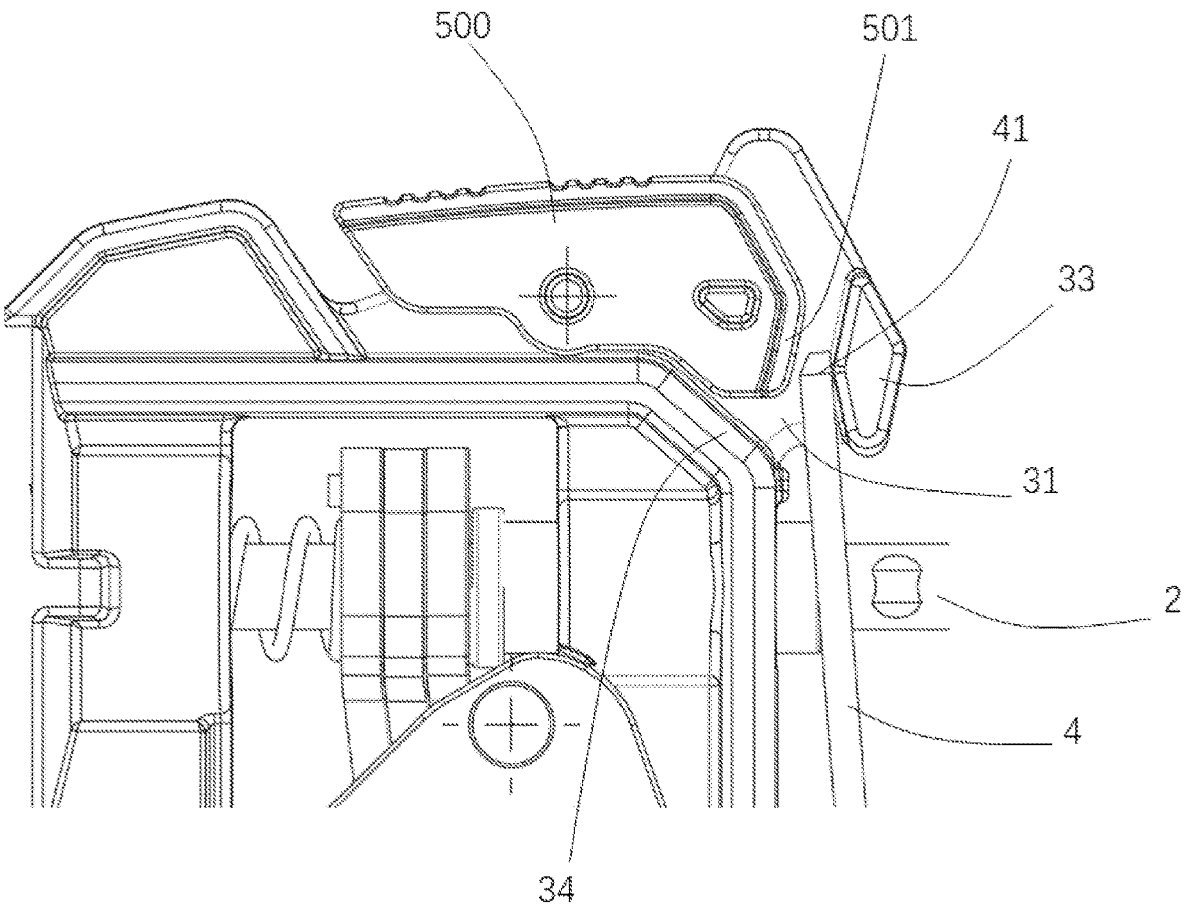
FIG. 23 is an enlarged partial view of FIG. 22.

Referring to FIGS. 22 to 25, the brake 4 is arranged in the same manner as in Embodiments 1-4. That is, the brake 4 is disposed on the push rod 2, with the compression spring 9 being arranged between the brake 4 and the main body 3. The upper end of the brake 4 cooperates with the limiting groove 31 in the main body 3 so as to be able to move forward (in the Y direction) and backward (in the X direction) within the limiting groove 31. Referring to FIGS. 22 to 23, a movable member 500 is disposed on the top of the main body 3, and an end portion 501 of the movable member 500 facing the brake 4 is movable under the action of an external force. When the end portion 501 moves to a location where it contacts the upper end 41 of the brake 4 (or there is only a very small gap between the end portion 501 and the upper end 41) (first position), the end portion 501 and the second limiting end 33 work together to lock the brake 4, preventing it from moving within the limiting groove 31. In turn, the brake 4 retains the push rod 2 and prevents its movement. At this time, the glue gun is in a first configuration, where following the release of the handle, the resilience of the return spring 7 is insufficient to overcome a force that the brake 4 applies to the push rod 2, maintaining the brake 4 in a state where it retains the push rod 2 and prevents its movement. As such, it continues applying a force on the glue, and internal stress in the glue is not released, causing a continuous drip of the glue.

Figure 24:
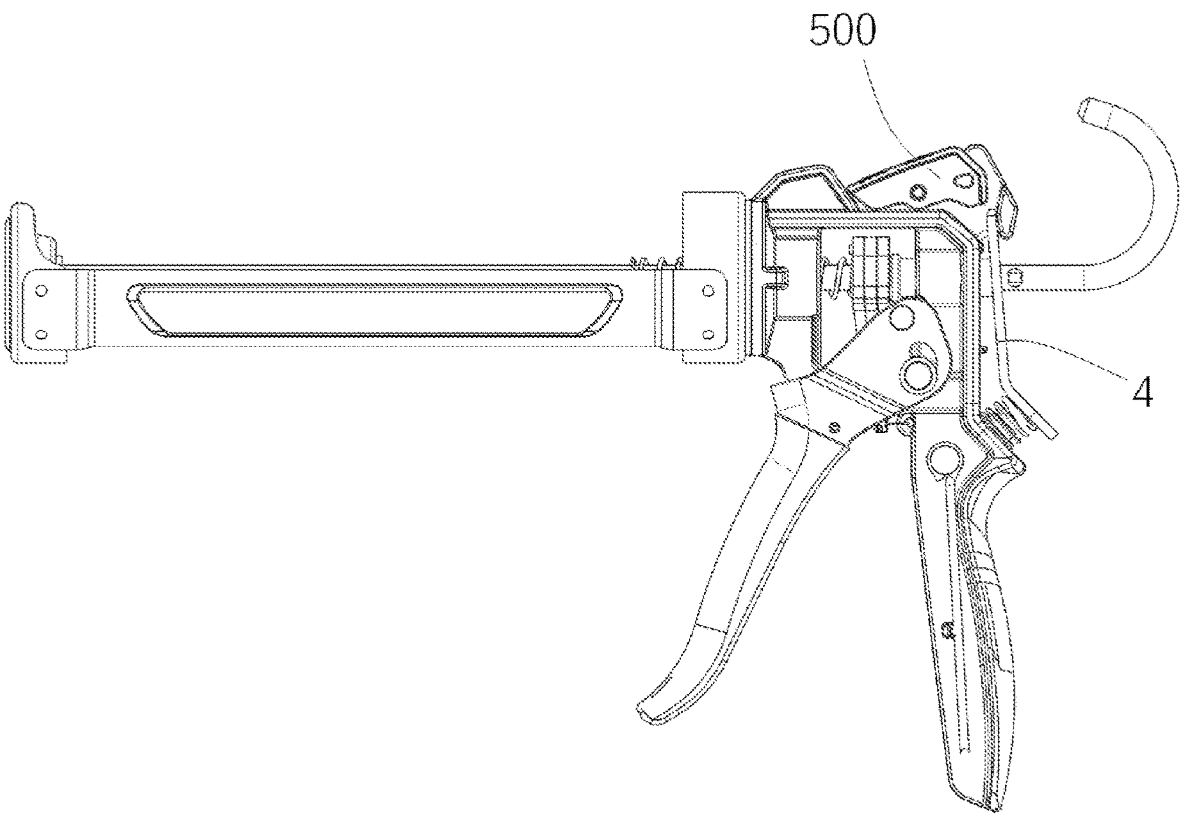
FIG. 24 is a schematic diagram showing the structure of the glue gun according to the fifth embodiment in a second configuration.
Figure 25:
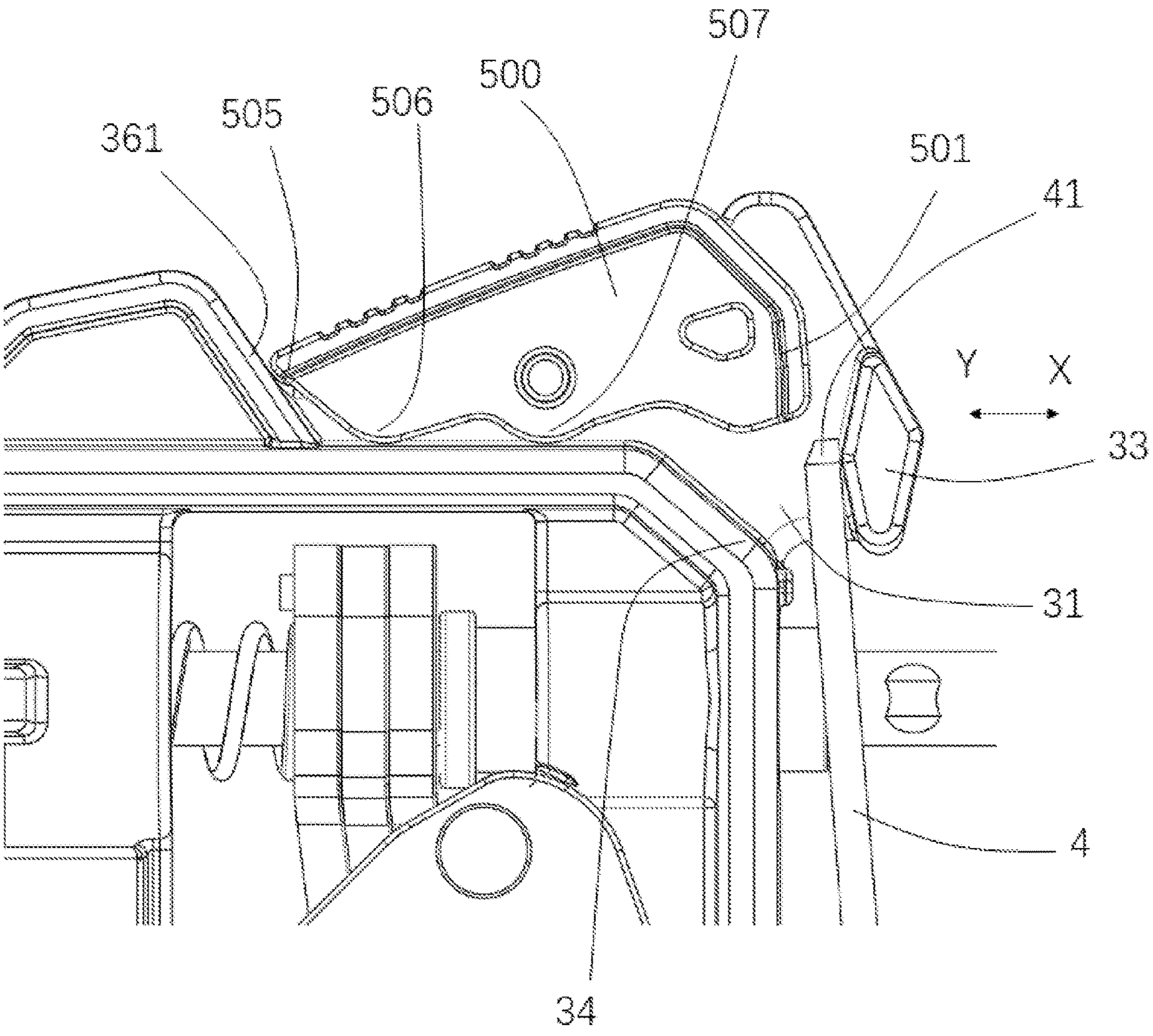
FIG. 25 is an enlarged partial view of FIG. 24.

As shown in FIGS. 24 to 25, when the end portion 501 of the movable member 500 moves to a location away from the brake 4 (second position) as a result of an external force applied to the movable member 500 by a user, the end portion 501 of the movable member 500 will not contact the upper end of the brake 4 anymore, and throughout the movement of the brake 4, the end portion 501 of the movable member 500 will never come into contact with the brake 4. In other words, the movable member 500 does not interfere with the movement of the brake 4 within the limiting groove 31, and the upper end 41 of the brake 4 can move forth and back within the limiting groove 31. That is, the upper end 41 of the brake 4 can move between the end portion 34 of the main body 3 and the second limiting end 33. When at the second limiting end 33, the brake 4 retains the push rod 2. In order to enable glue dispensing, the push member 8 is urged to move toward the accommodation part 1, and the push rod 2 and the brake 4 move therewith.

The brake 4 moves from the second limiting end 33 toward the end portion 34, without relative displacement occurring between the push rod 2 and the brake 4. That is, the brake 4 has an idle stroke. When reaching the end portion 34, the brake 4 will be blocked by the end portion 34 and not move any more. At this point, the brake 4 does not retain the push rod 2, and the push rod 2 can further move toward the accommodation part 1, thus resulting in relative displacement between the push rod 2 and the brake 4. When the movable member 500 is at the second position, the glue gun is in a second configuration, where under the effect of the return spring 7, the push member 8 moves away from the accommodation part, driving the push rod 2 to move therewith. When the push rod 2 reaches the location where it is retained by the brake 4, the brake 4 will also move with the push rod 2 from the end portion 34 toward the second limiting end 33, thereby releasing the force acting on the glue in the glue cylinder. As a result, internal stress within the glue in the glue cylinder is released, preventing the glue from flowing out through the glue outlet. That is, there is no drip of the glue any more.

The movable member 500 may adopt any suitable structure, as long as it enables the end portion of the movable member to move to the first position (where it is in contact with the upper end 41 of the brake 4 and locks the brake 4) and to the second position (where it is no longer in contact with the upper end 41 of the brake 4 and does not interfere with the movement of the brake 4). Any movable member that satisfies this requirement can be suitably used in this embodiment.

As shown in FIGS. 22 to 29, a preferred implementation of this embodiment is as follows.

Figure 26:
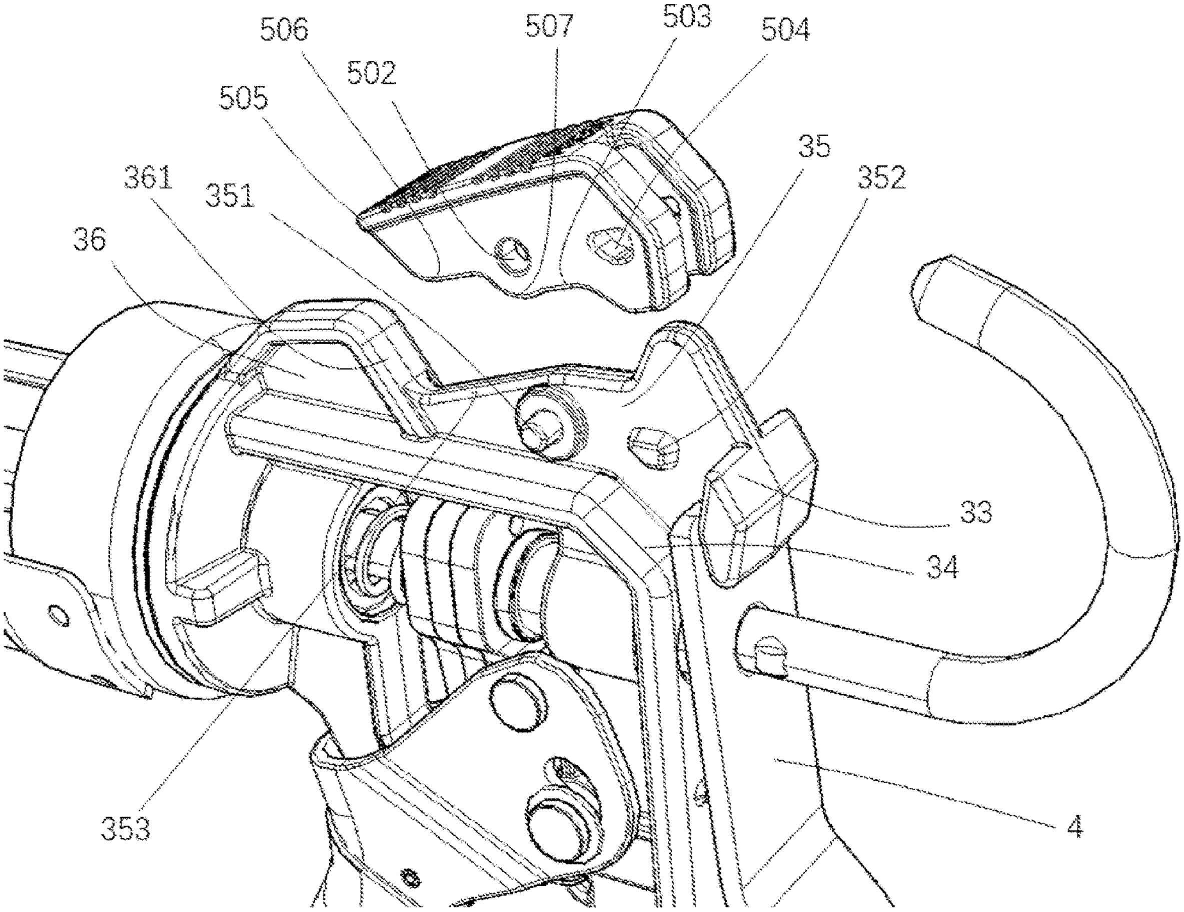
FIG. 26 is an exploded schematic view of part of the glue gun according to the fifth embodiment.

Referring to FIG. 26, a raised plate 35 is provided on the top of the main body 3. The raised plate 35 extends both upward from the top of the main body 3 and obliquely afterward. An end portion of the raised plate 35 away from the main body 3 provides the second limiting end 33. The second limiting end 33 and the end portion 34 of the main body 3 facing the brake 4 delimits the limiting groove 31, in which the upper end 41 of the brake 4 can move forth and back. The movable member 500 is pivotably coupled to the raised plate 35. Specifically, the raised plate 35 is provided with a pin shaft 351, and the movable member 500 is provided with a first through hole 502. The first through hole 502 is fitted over the pin shaft 351 so that the movable member 500 is able to pivot about the pin shaft 351. When the movable member 500 pivots to the first position, the end portion 501 of the movable member 500 comes into contact with the upper end 41 of the brake 4 (or is spaced from the upper end 41 of the brake 4 by a very small gap), thereby locking the brake 4. When the movable member 500 pivots to the second position, the end portion 501 of the movable member is located away from the brake 4, thus allowing the brake 4 to move within the limiting groove 31. A stroke of the movement is defined by the end portion 34 of the main body 3 and the second limiting end 33.

Preferably, the first through hole 502 is provided in a central portion of the movable member 500.

An end face 503 of the movable member 500 facing the main body 3 matches in shape the main body 3. In this way, when the movable member 500 moves to the first position, the end face 503 of the movable member 500 can move into closer contact with the main body 3 because they match in shape (see FIG. 23). With this arrangement, the main body 3 can better limit movement of the movable member 500 and enables the movable member 500 to accurately move to the first position. For example, the end portion 34 of the main body 3 proximate the brake 4 may define a bevel (which delimits the limiting groove 31 together with the second limiting end 33), and the end face 503 of the movable member 500 may be configured as a bevel matching said bevel.

Figure 27:
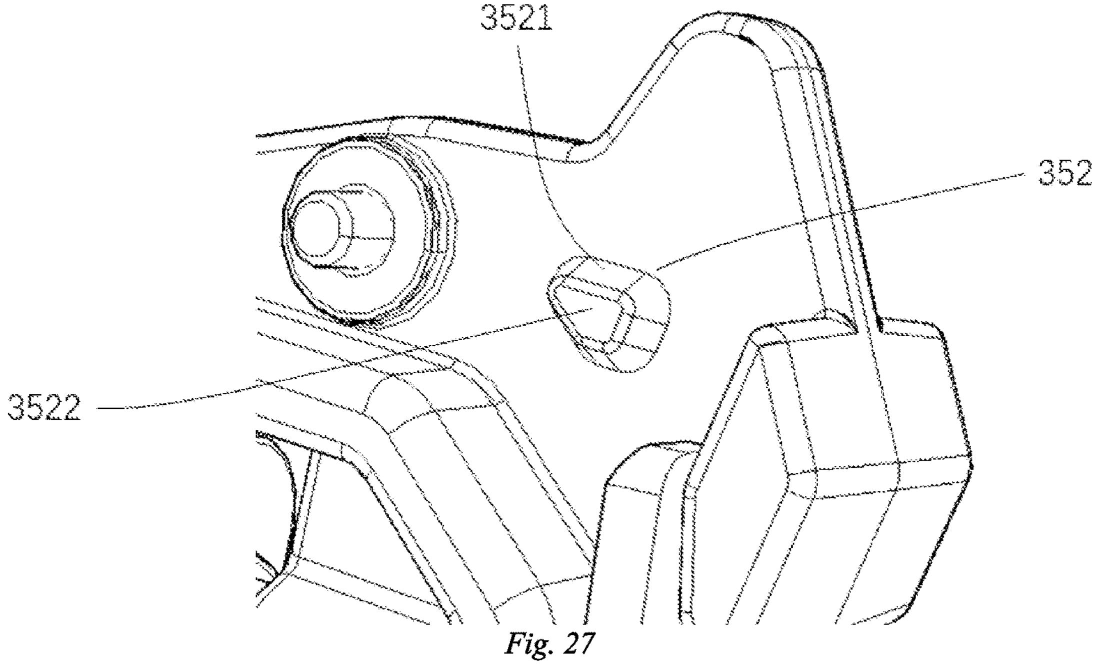
FIG. 27 is a schematic diagram showing the structure of a locating stud in the glue gun according to the fifth embodiment.
Figure 28:
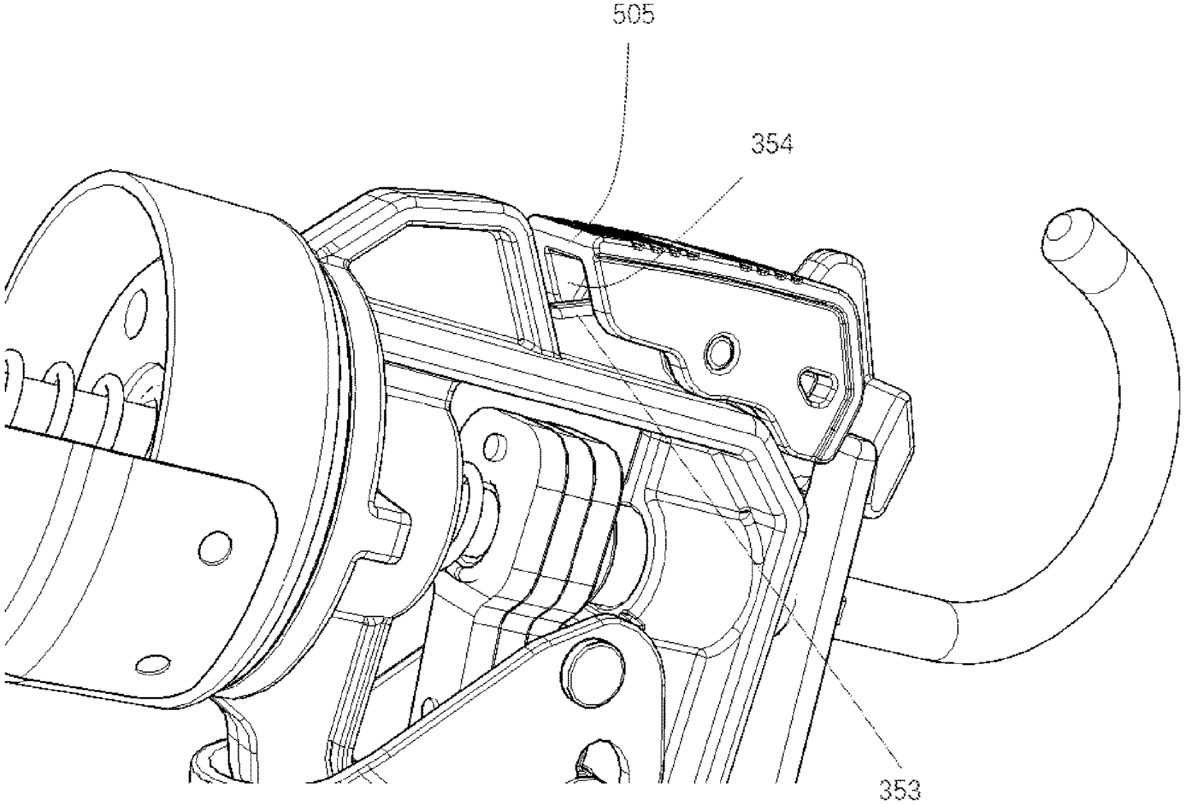
FIG. 28 is an enlarged partial view of the glue gun according to the fifth embodiment in the second configuration.

In order to better locate the movable member 500 at the first position, the movable member 500 is also provided with a second through hole 504. Correspondingly, the raised plate 35 is provided with a locating stud 352. When the movable member 500 moves to the first position, the second through hole 504 is aligned with the locating stud 352, and part of the locating stud 352 can be fitted in the second through hole 504. In this way, the movable member 500 can be accurately located and maintained at the first position. Referring to FIG. 27, the locating stud 352 projects outwardly from a side surface of the raised plate 35 and has a bottom size greater than a top size thereof. Thus, the locating stud 352 has inclined side surfaces 3521, which enable easier and smoother mating of the locating stud 352 with the second through hole 504. The locating stud 352 has a shape in a cross-sectional plane parallel to the side surface of the raised plate where it is located, which may be configured to be substantially trapezoidal. That is, the locating stud 352 has both a substantially trapezoidal top surface 3522 and a substantially trapezoidal base. The locating stud 352 is a truncated trapezoidal pyramid. The corresponding second through hole 504 has a cross-sectional shape matching that of the locating stud 352.

Referring to FIGS. 25 and 26, in order to better locate the movable member 500 at the second position, the main body 3 is provided with a blocking member 36. The blocking member 36 is located on an end of the raised plate 35 away from the brake 4, and a side surface of the blocking member 36 facing the raised plate 35 is configured as a bevel. When the movable member 500 pivots to the second position, an end portion 505 of the movable member 500 away from the brake 4 comes into contact with the bevel of the blocking member 36, thereby accurately locating the movable member 500 at the second position. In another implementation, the movable member 500 defines a corner 506, and when the movable member 500 moves to the second position, the corner 506 comes into contact with the top of the main body 3 and serves a barrier, thereby accurately locating the movable member 500 at the second position. Preferably, the movable member 500 is provided on the end face facing the main body 3 with an arc-shaped portion 507. The arc-shaped portion 507 is located under the first through hole 502. The corner 506 is provided on the side of the arc-shaped portion 507 away from the brake 4. The arc-shaped portion 507 matches the main body 3 in shape on the side proximate the brake 4. The arc-shaped portion 507 always remains in contact with the top of the main body 3. Thus, the arc-shaped portion 507 functions like a fulcrum. In another implementation, referring to FIG. 28, the raised plate 35 defines a bevel at the top. In this way, when the movable member 500 is located at the first position, there is a gap 354 between the end portion 505 of the movable member 500 away from the brake 4 and the top of the raised plate 35. During movement of the movable member 500 toward the second position, the end portion 505 of the movable member 500 away from the brake 4 will come into contact with the top of the raised plate 35 and serve as a barrier, thereby accurately locating the movable member 500 at the second position.

Figure 29:
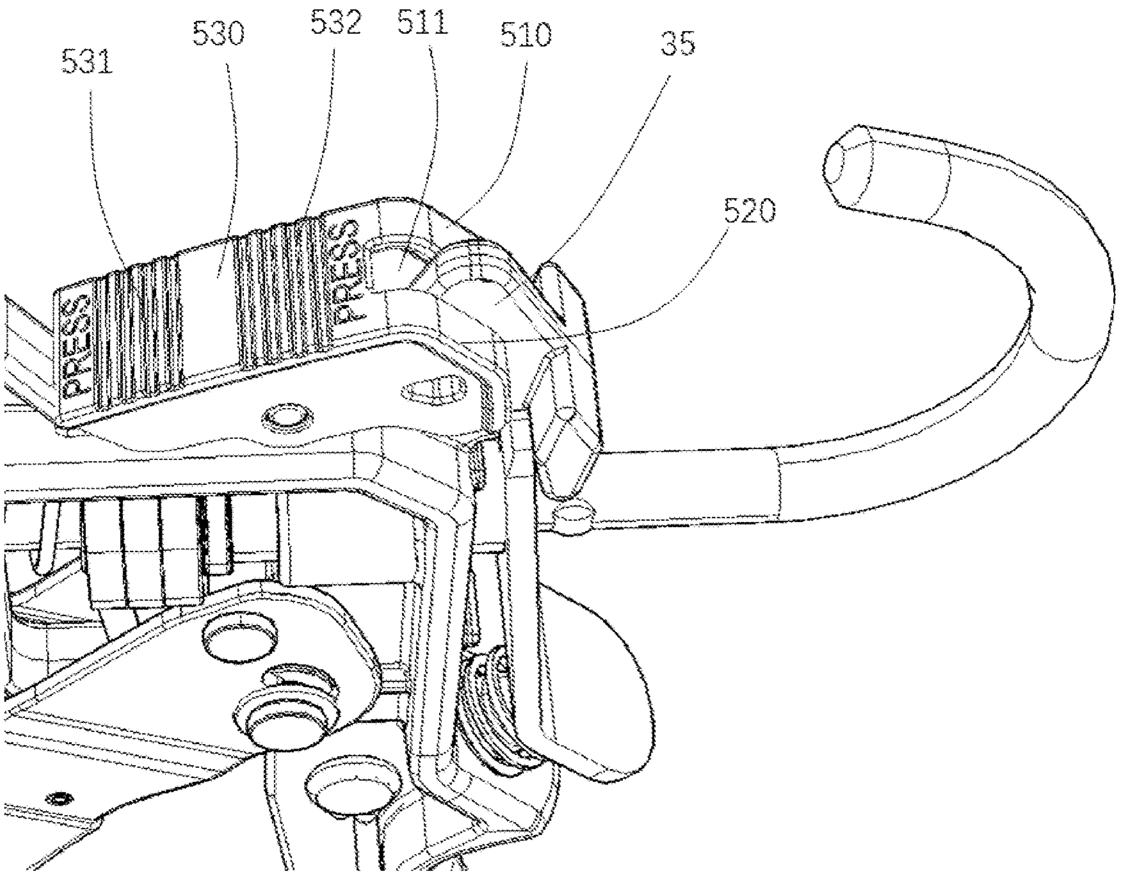
FIG. 29 is a schematic diagram showing the structure of the glue gun according to the fifth embodiment at a different perspective.

It is possible to provide either one movable member 500 on one side surface of the raised plate 35 or movable members 500 on opposing sides of the raised plate 35. As shown in FIG. 29, the raised plate 35 is in the shape of a sheet, and the movable member 500 includes symmetrical first 510 and second 520 sections. The first section 510 and the second section 520 are exactly identical in shape. That is, the first section 510 has the first through hole 502, the second through hole 504, the corner 506, the arc-shaped portion 507 and the like, and the second section 520 has the same arrangement. The first section 510 is provided on one side surface of the raised plate 35, and the second section 520 is provided on the other side surface of the raised plate 35. Between the first section 510 and the second section 520, there is a gap 511, into which the raised plate 35 can be inserted. Both the first section 510 and the second section 520 are provided with first through holes 504. Correspondingly, pin shafts 351 are provided on both side surfaces of the raised plate 35. The two pin shafts 351 are inserted respectively in the first through hole 504 in the first section 510 and the first through hole 504 in the second section 520. The first section 510 and the second section 520 are coupled together by a coupling member 530 so that the movable member 500 can be considered as a single component. In this design, when an end of the coupling member 530 facing the brake 4 (proximal end 532) is pressed, the movable member 500 pivots toward the first position, and when an end of the coupling member 530 away from the brake 4 (distal end 531) is pressed, the movable member 500 pivots toward the second position.

Embodiment 6

Figure 30:
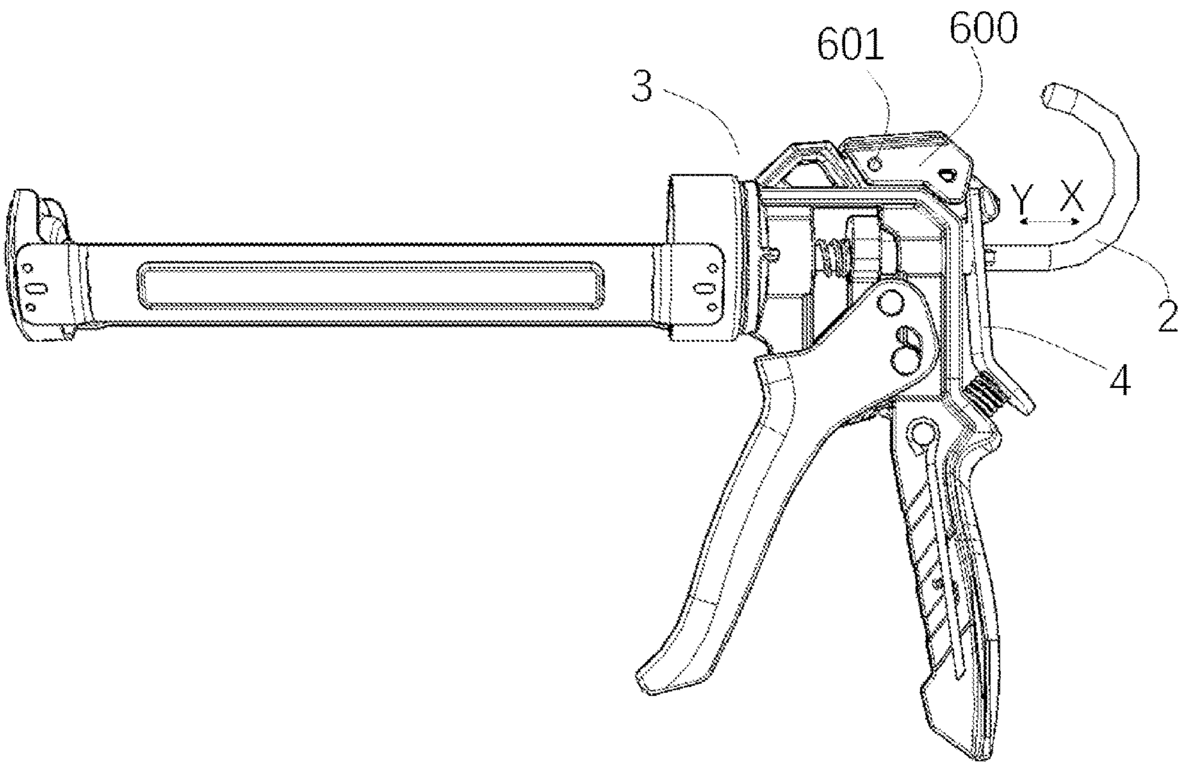
FIG. 30 is a schematic diagram showing the structure of a glue gun according to a sixth embodiment in a first configuration.
Figure 31:
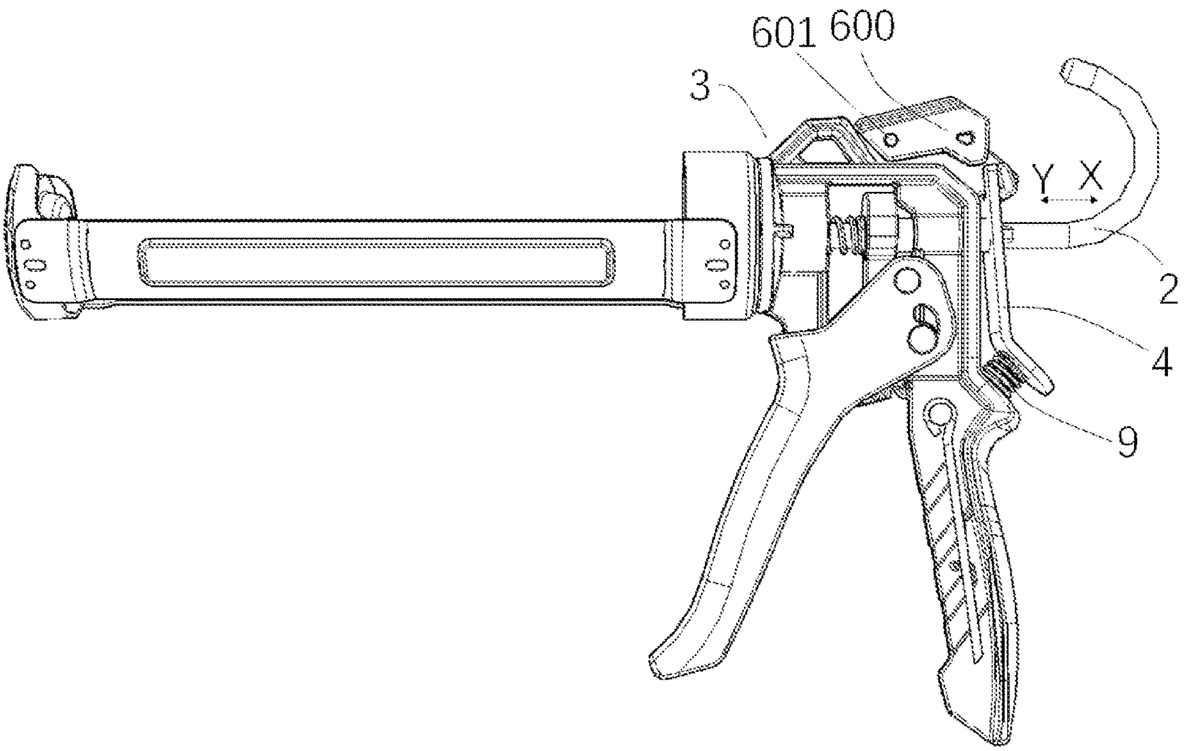
FIG. 31 is a schematic diagram showing the structure of the glue gun according to the sixth embodiment in a second configuration.

As shown in FIGS. 30 and 31, this embodiment is substantially the same in structure as Embodiment 5, except that, in this embodiment, a rotating shaft 601 of the movable member 600 (i.e., the pin shaft provided on the raised plate) is disposed on the end of the movable member away from the brake 4. In this embodiment, the movable member can be manipulated by pressing the end opposing the rotating shaft 601 to cause the movable member 600 to move to the first position. Reverse manipulation can cause the movable member 600 to move to the second position.

Embodiment 7

As shown in FIGS. 32 to 37, the embodiment differs from Embodiment 5 in the structure of the movable member 700.

Figure 32:
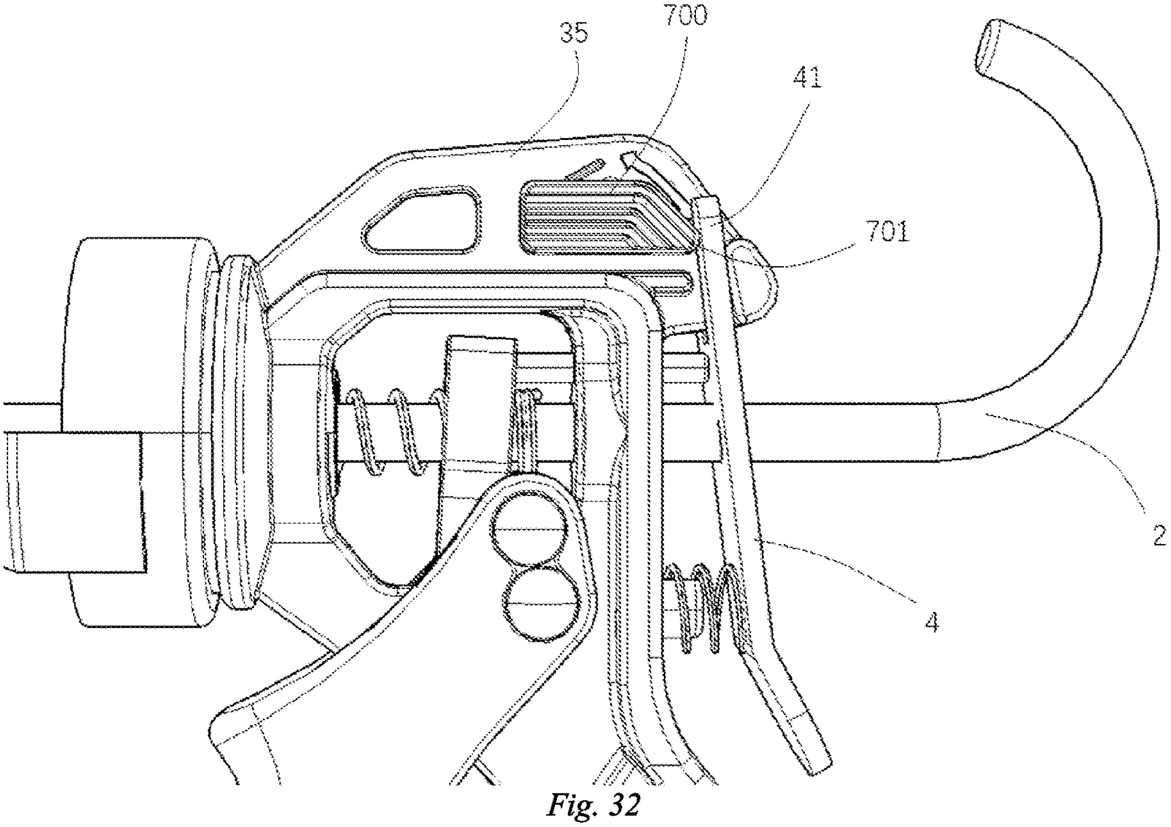
FIG. 32 is an enlarged partial view of a glue gun according to a seventh embodiment in a first configuration.
Figure 33:
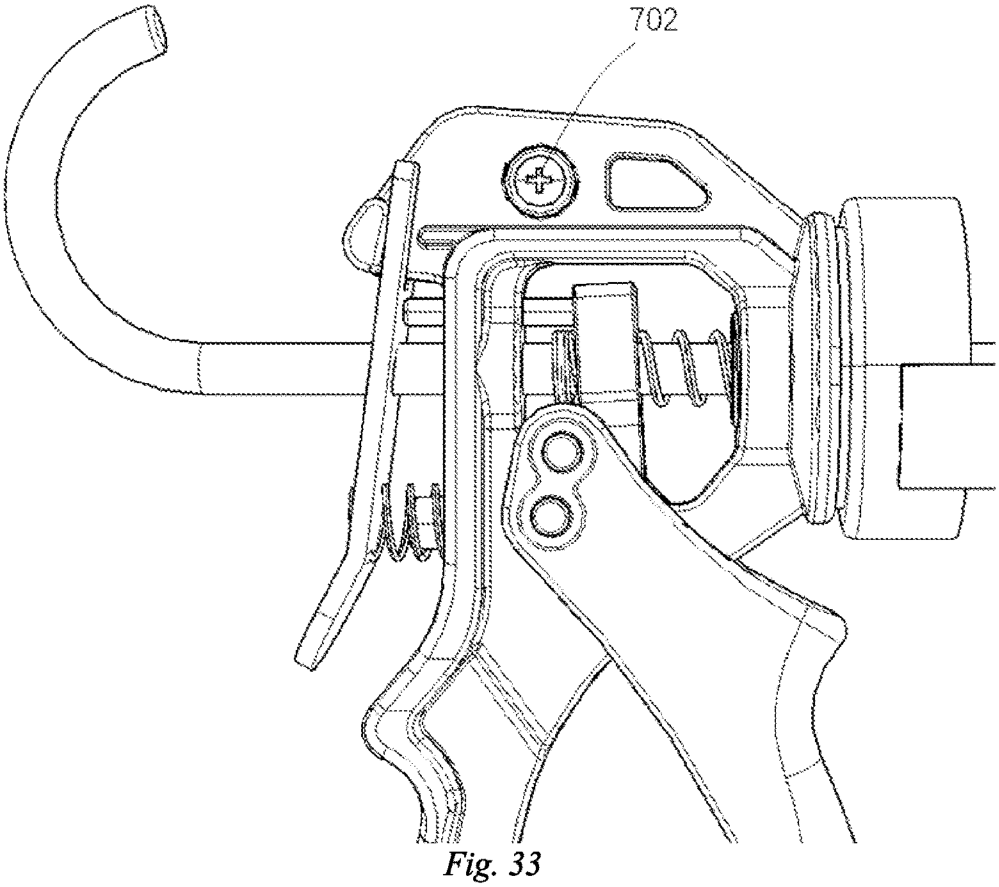
FIG. 33 is a schematic diagram showing the structure of FIG. 32 from the opposite side.
Figure 34:
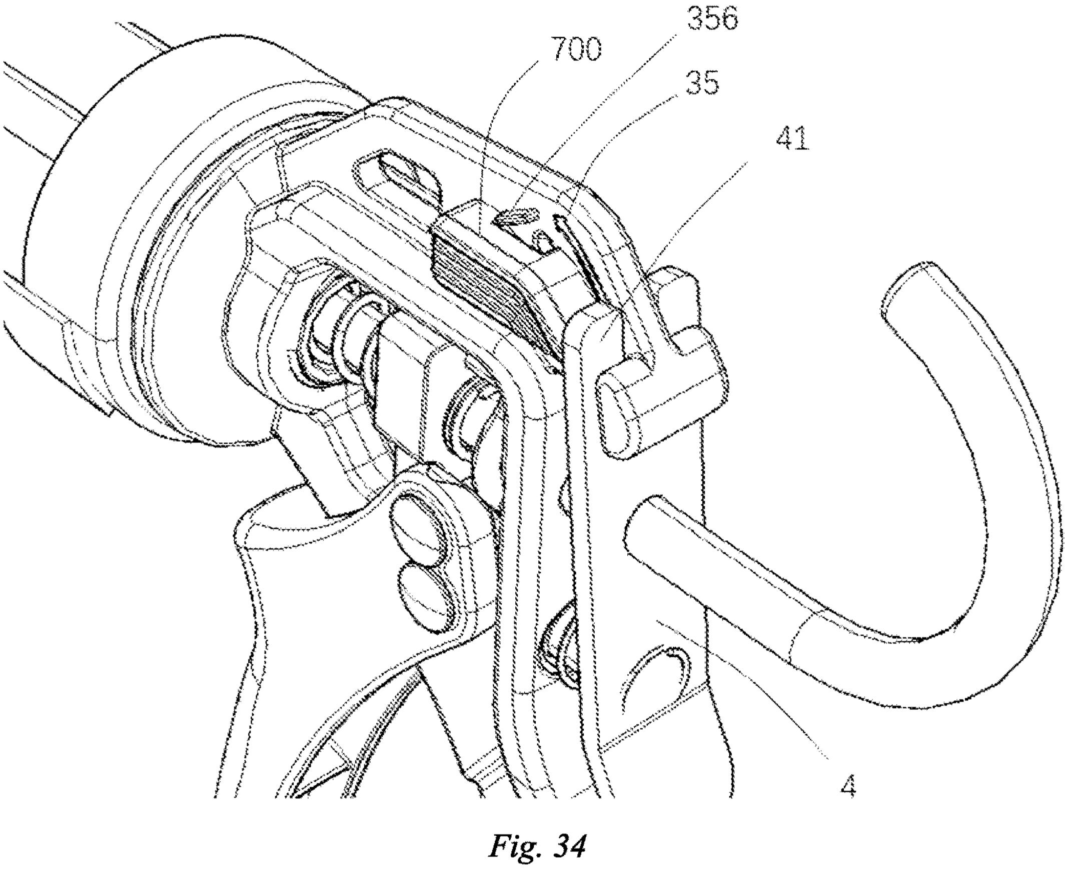
FIG. 34 is a schematic axonometric view of FIG. 32.
Figure 35:
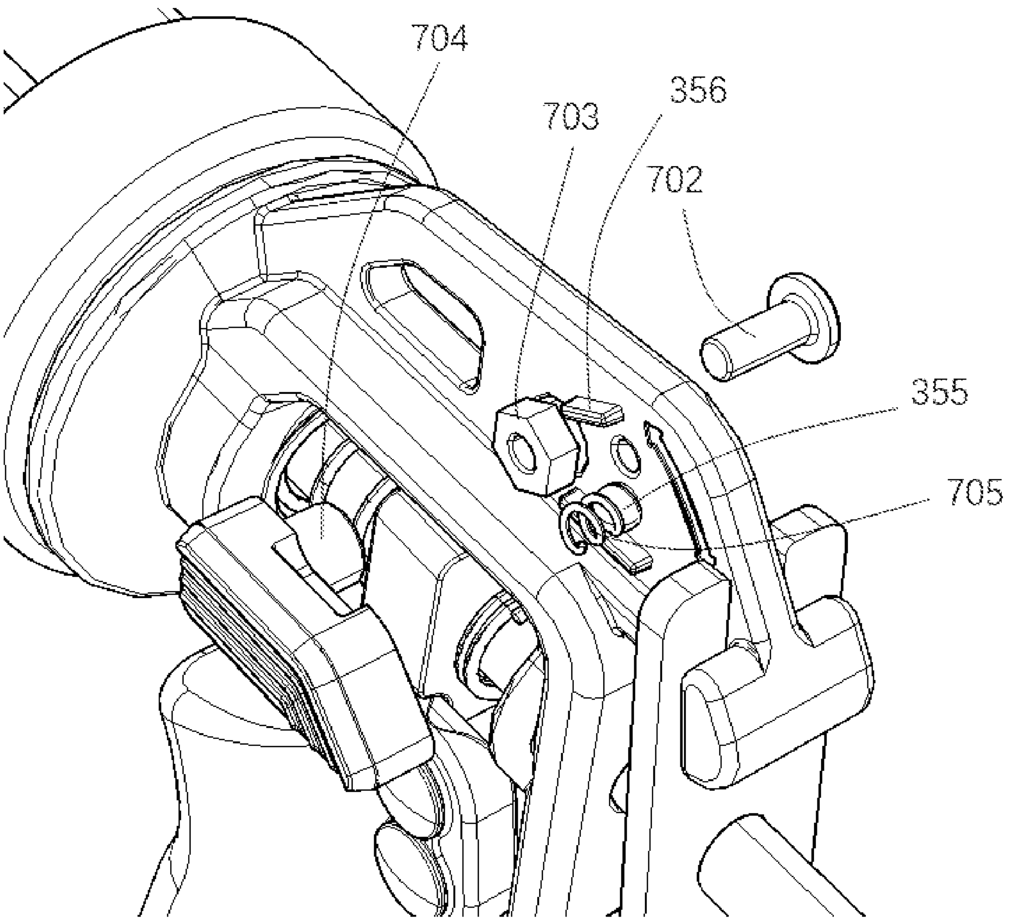
FIG. 35 is an exploded schematic view of FIG. 32.
Figure 36:
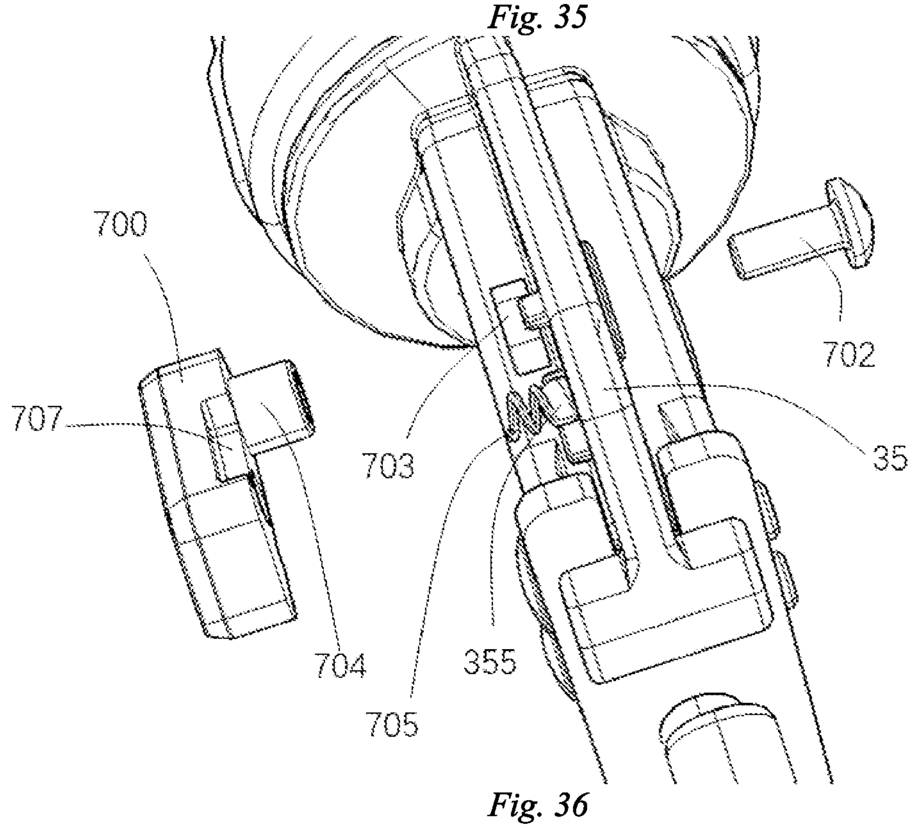
FIG. 36 is a schematic illustration of FIG. 35 at a different perspective.
Figure 37:
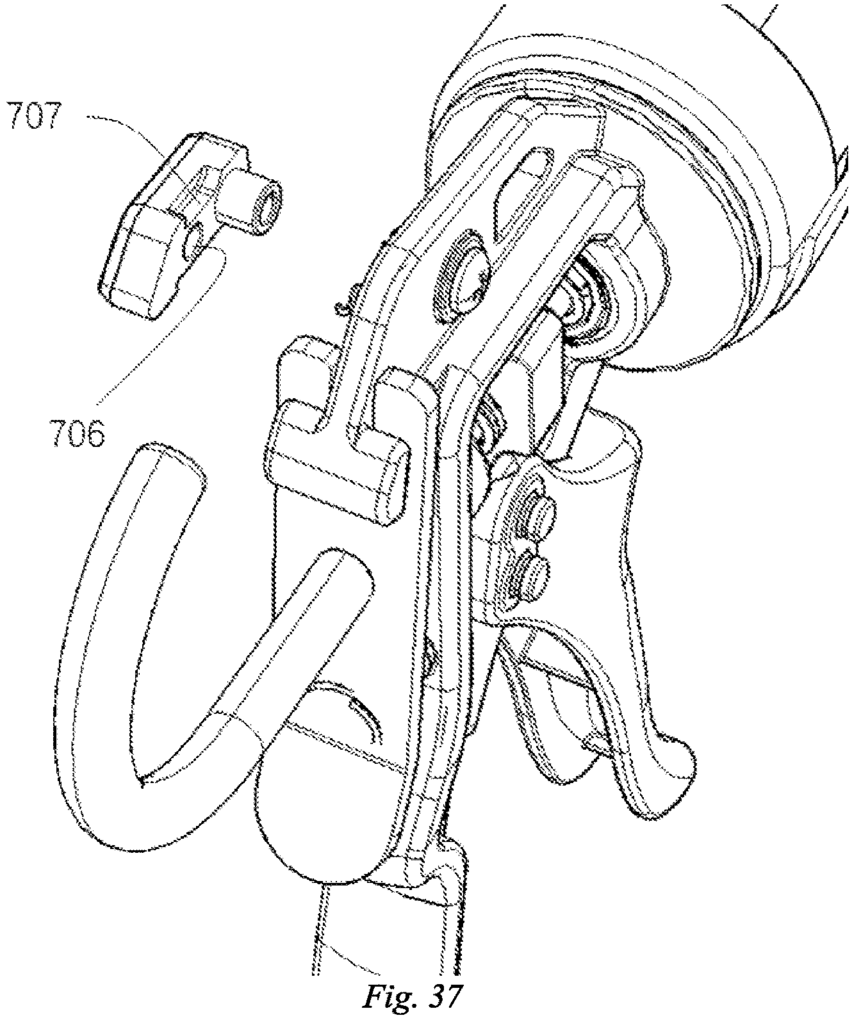
FIG. 37 is a schematic illustration of FIG. 35 at a different perspective.

Referring to FIG. 32, the movable member 700 is provided on one side surface of the raised plate 35, and a rotating shaft is provided at the end of the movable member 700 away from the brake 4. The movable member 700 can be pivoted by manipulating its end portion 701 proximate the brake 4. When the movable member 700 is at the first position, the end portion 701 is in contact with the brake 4 and thereby locks the brake 4. When the movable member 700 is at the second position, the end portion 701 is located away from the brake 4 and does not hinder movement of the brake 4 anymore.

Referring to FIGS. 34 to 37, the rotating shaft includes a screw 702 and a nut 703 at one end of the screw 702. The screw 702 passes through the raised plate 35, and the nut 703 is disposed over the screw 702. The movable member 700 is provided on the side facing the raised plate 35 with a sleeve 704, which is disposed over the nut 703. When the movable member 700 is pivoted, the sleeve 704 and the nut 703 will pivot therewith about the screw 702. The screw 702 and the nut 703 can cooperate to maintain the movable member 700 at the current position.

The movable member 700 is provided on the side facing the raised plate 35 with a blind hole 706. Correspondingly, a protrusion 355 is provided on the raised plate 35. A spring 705 is disposed over the protrusion 355, and the other end of the spring 705 is inserted in the blind hole 706. In this way, the spring 705 can apply a biasing force to the movable member 700. When the movable member 700 is pressed toward the raised plate 35 to overcome the biasing force from the spring 705, the movable member 700 can be pivoted. When released, the movable member 700 will move away from the raised plate 35 under the action of the biasing force and thereby lock the movable member 700 at the current position.

A recess 707 is provided in an upper portion of the movable member 700, and the raised plate 35 is provided thereon with a blocking member 356, which can mate with the recess 707. The blocking member 356 is inclined. When the movable member 700 pivots toward the second position, the blocking member 356 will enter the recess 707, and the movable member 700 will be thus blocked. In this way, the movable member 700 can be accurately located at the second position.

Embodiment 8

In Embodiments 1 and 2, switching between different gear positions is achieved by shifting the pivot pin shaft 12 between different positions in the slide slot 13 or 103. In Embodiment 3, switching between different gear positions is realized by shifting the actuating member 206 between different positions in the slide slot 202. In Embodiments 1 to 3, switching between different gear positions is all intended to alter the spacing between the actuating member and the pivot pin shaft, thereby achieving adjustability of a force applied to the push member and switching between different power transmission speeds.

FIGS. 38 to 46 show Embodiment 8 of the present invention. Embodiment 8 adds a new manipulation component to Embodiment 1, 2 or 3, which can be pulled to effect switching between gear positions. The manipulation component may be used in Embodiment 1. In this case, the manipulation component can be pulled to drive the pivot pin shaft 12 to shift between different positions within the slide slot 13, thereby achieving a switching between gear positions. Alternatively, the manipulation component may be used in Embodiment 3. In this case, the manipulation component replaces the toggle 203 and the pivot shaft 204 in Embodiment. Moreover, the actuating member 206 is coupled to the manipulation component. The manipulation component can be pulled to drive the actuating member 206 to slide in the slide slot 202, to alter a location where the actuating member 206 comes into contact with the push member 8, thereby achieving switching between different gear positions.

The use of the manipulation component in Embodiment 3 is described in detail below as an example.

Figure 38:
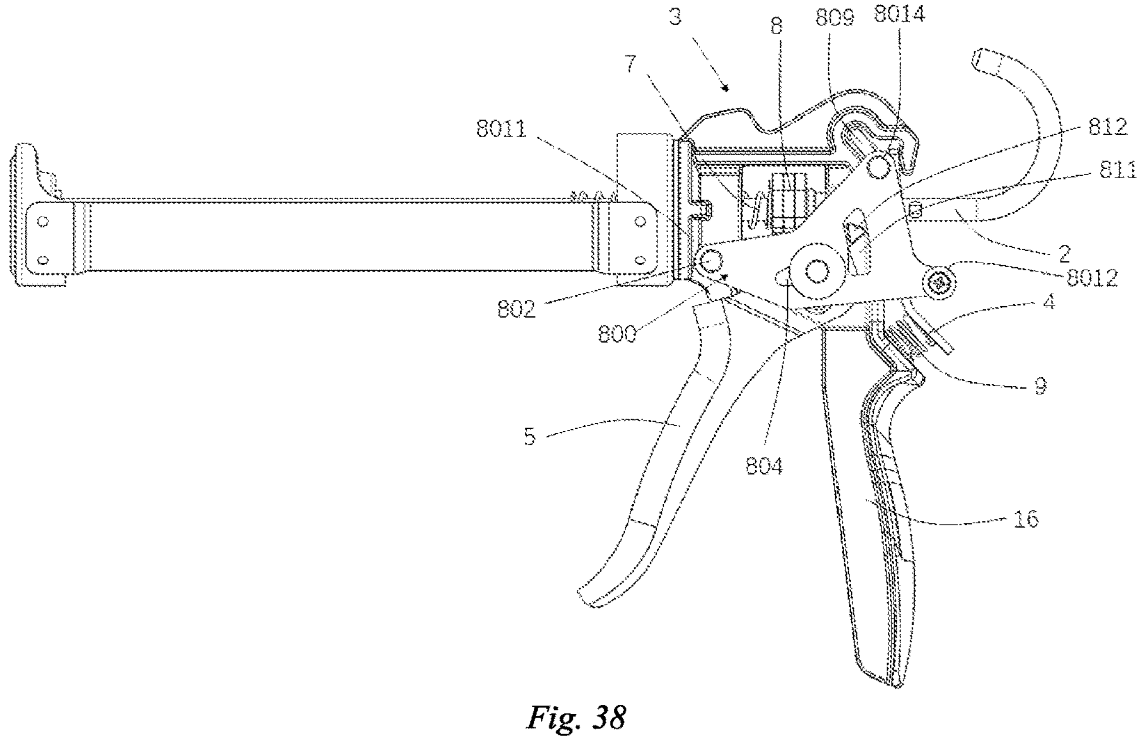
FIG. 38 is a front view of a glue gun according to an eighth embodiment.
Figure 39:
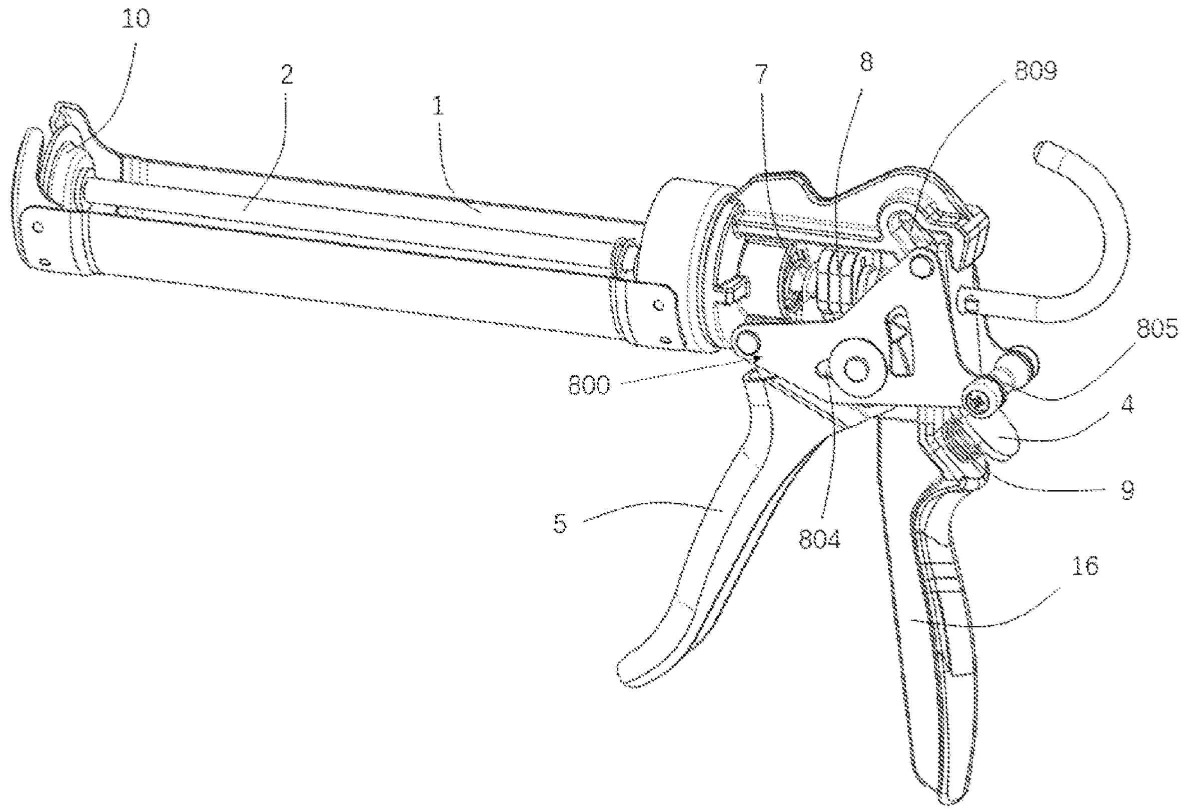
FIG. 39 is a schematic axonometric view of FIG. 38.

Referring to FIGS. 38 and 39, the glue gun of this embodiment includes a push device, a main body 3 and a trigger device.

One end of the main body 3 is formed as an accommodation part 1 in the shape of a cylinder for accommodating a glue cylinder. The other end of the main body 3 is articulated by a fastener or integrally formed with the trigger device, thus together forming a gun-like fixed handle 16.

The push device includes a push member 8, a push rod 2 and a push body 10. A first end of the push rod 2 is positioned within the accommodation part 1. One end of the accommodation part 1 is coupled to the main body 3, and the other end is provided with an outlet opening for passage of a glue nozzle of the glue cylinder therethrough. The push body 10 is secured to an end portion of the push rod 2 at the first end and able to reciprocate along with the push rod 2. The push member 8 is disposed over a second end of the push rod 2, and a return spring 7 is provided between the push member 8 and the main body 3. As a result of the trigger device pushing the push member 8, the push rod 2 and the push body 10 will move together toward the outlet opening of the accommodation part 1, and the return spring 7 will return the push member 8 to its original position. The push rod 2 is provided with a brake 4, and a compression spring 9 is disposed between the brake 4 and the main body 3. Urged by the compression spring 9, the brake 4 will restrain the push rod 2 so that the push rod 2 can move only toward the accommodation part 1. In order to install the glue cylinder, the brake 4 is pressed to release the push rod 2, allowing the push rod 2 to be changed in position. The push device is structured in the same way as that in Embodiments 1, 2 and 3.

Figure 40:
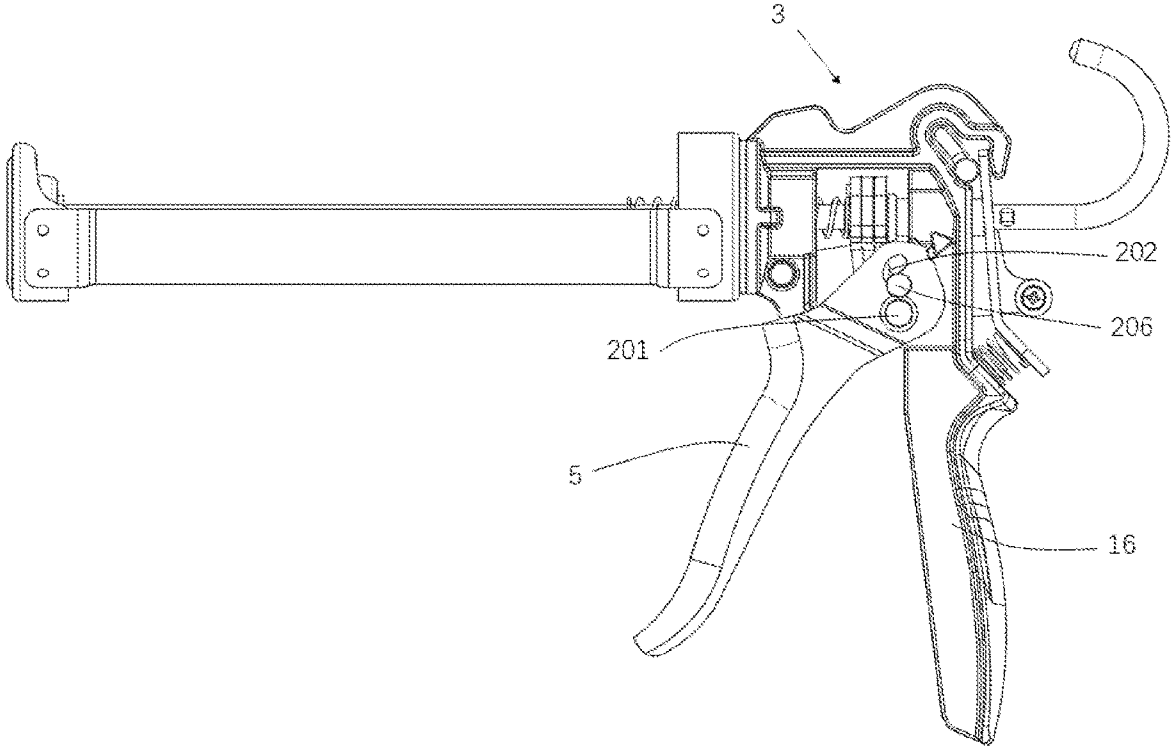
FIG. 40 is a schematic illustration of the eighth embodiment after a first actuating plate is removed.
Figure 41:
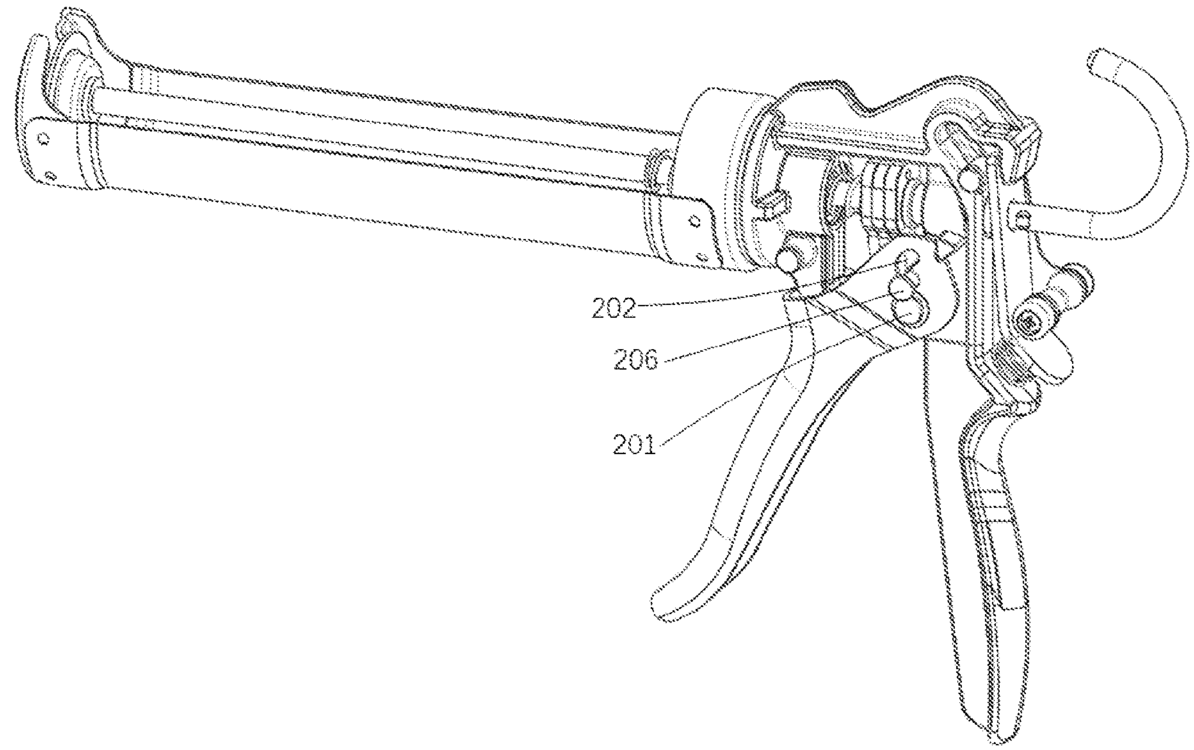
FIG. 41 is a schematic axonometric view of FIG. 40.
Figure 42:
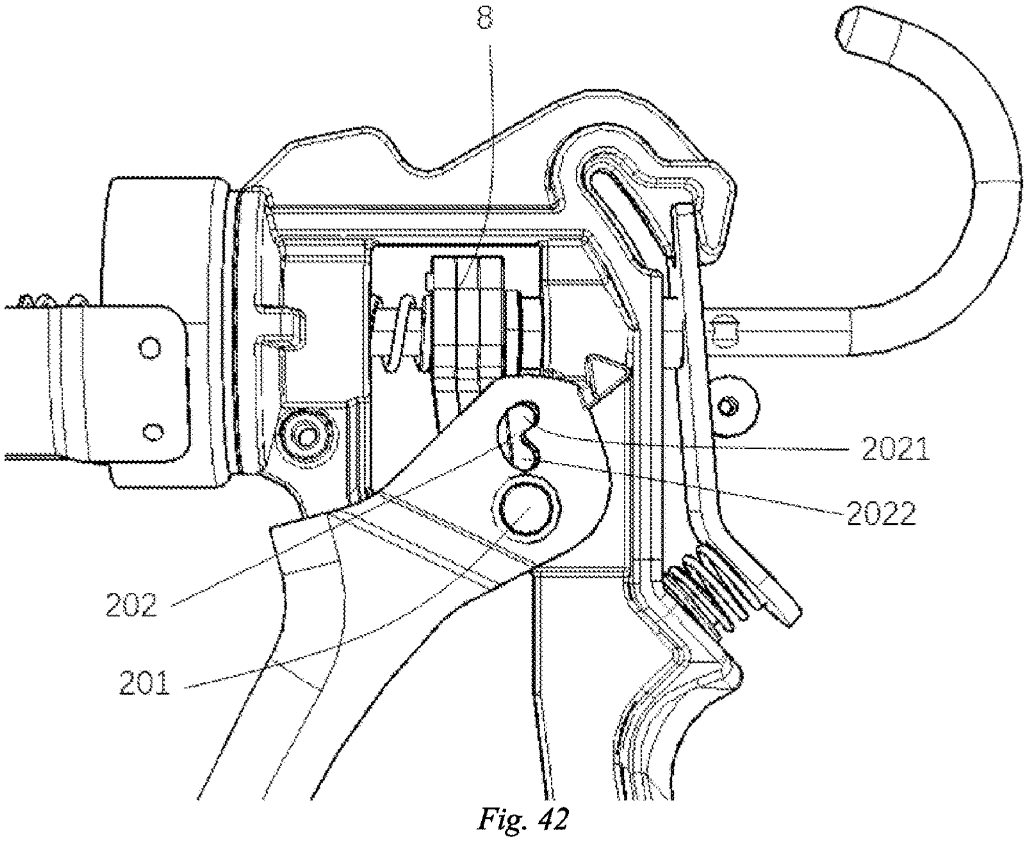
FIG. 42 is a schematic illustration of gear positions in the eighth embodiment.
Figure 43:
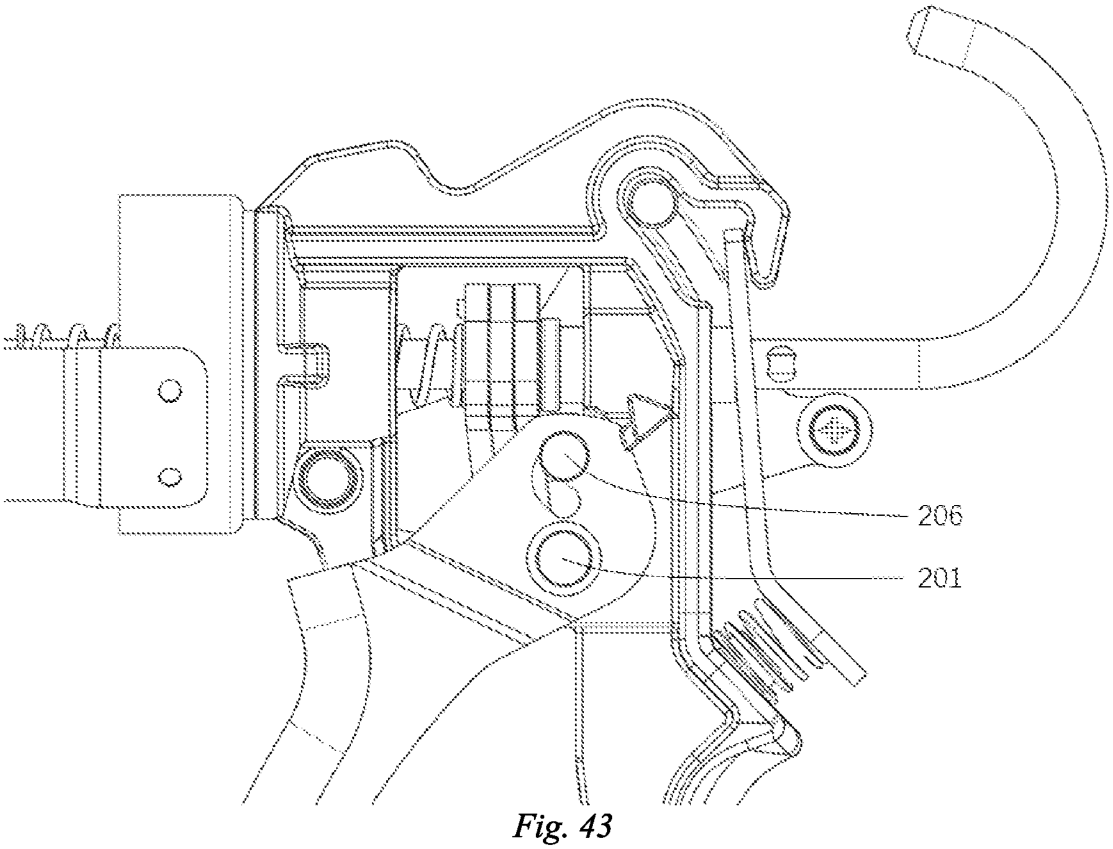
FIG. 43 schematically illustrates an actuating member in the eighth embodiment at a first gear position.
Figure 44:
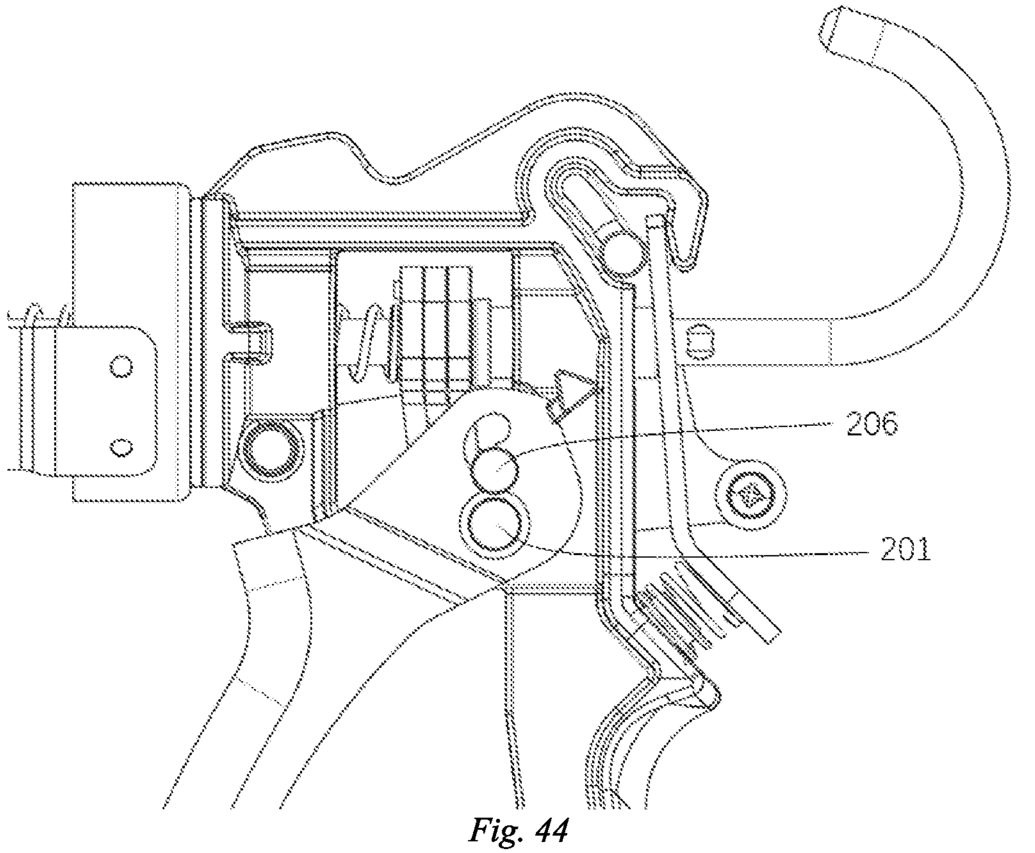
FIG. 44 schematically illustrates the actuating member in the eighth embodiment at a second gear position.

The trigger device includes a movable handle 5 and a fixed handle 16. Referring to FIGS. 40 and 41, the movable handle 5 is coupled to the fixed handle 16 by a pivot pin shaft 201. The movable handle 5 is articulated with the fixed handle 16 by the pivot pin shaft 201. The movable handle 5 is provided with a slide slot 202. The actuator includes an actuating member 206 in contact with the push member 8. The actuating member 206 is configured to be able to slide within the slide slot 202. Referring to FIGS. 42 to 44, the slide slot 202 defines a first gear position 2021 and a second gear position 2022. The first gear position 2021 and the second gear position 2022 may be defined respectively at two end portions of the slide slot 202. Through sliding the drive actuating member 206 between the two ends of the slide slot 202, the actuating member 206 can come into contact with the push member 8 at different locations, achieving switching between the gear positions 2021 and 2022. A spacing between the actuating member 206 and the pivot pin shaft 201, as well as a vertical spacing between the pivot pin shaft 201 and a point of force application on the movable handle 5, varies when the actuating member 206 shifts from one of the gear positions to the other. In this way, the actuating member 206 can apply different pushing forces to the push member 8, imparting different strokes of the push rod 2, which are suitable for fluids with different levels of fluidity. This structure is the same or similar as that in Embodiment 3.

Figure 45:
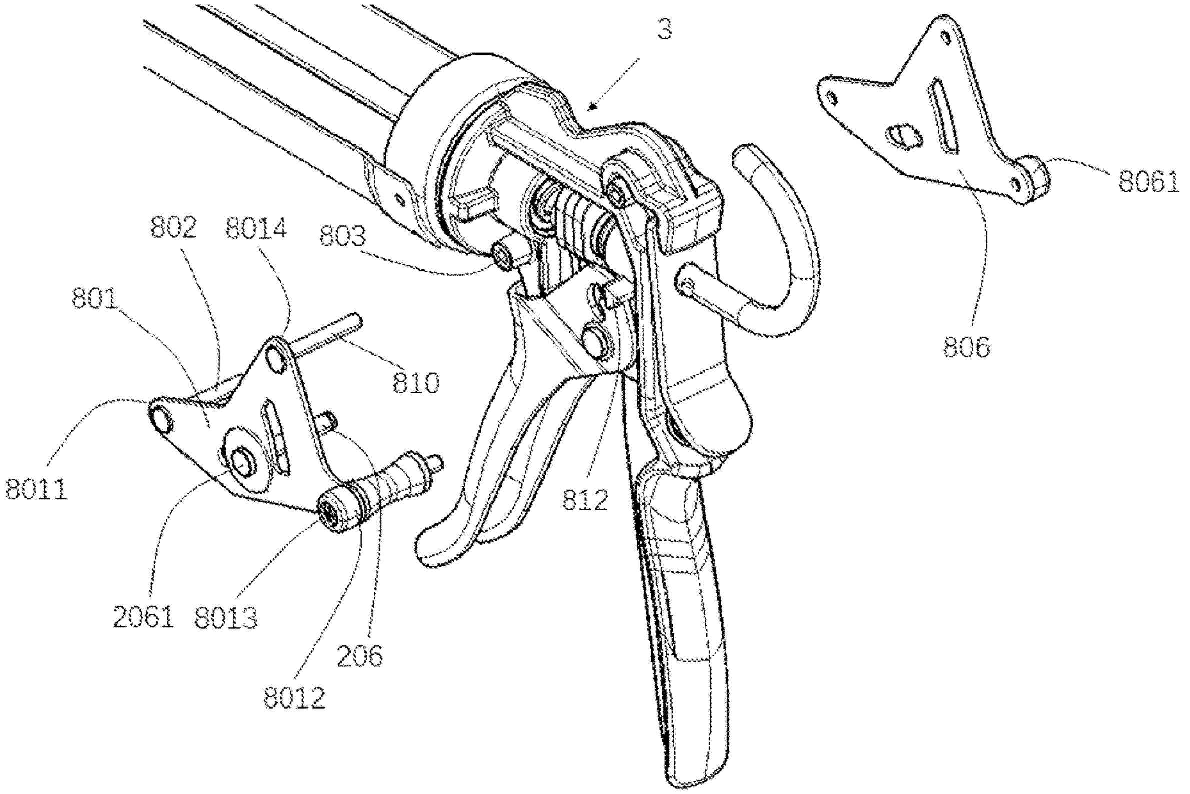
FIG. 45 is an exploded schematic view of the eighth embodiment.
Figure 46:
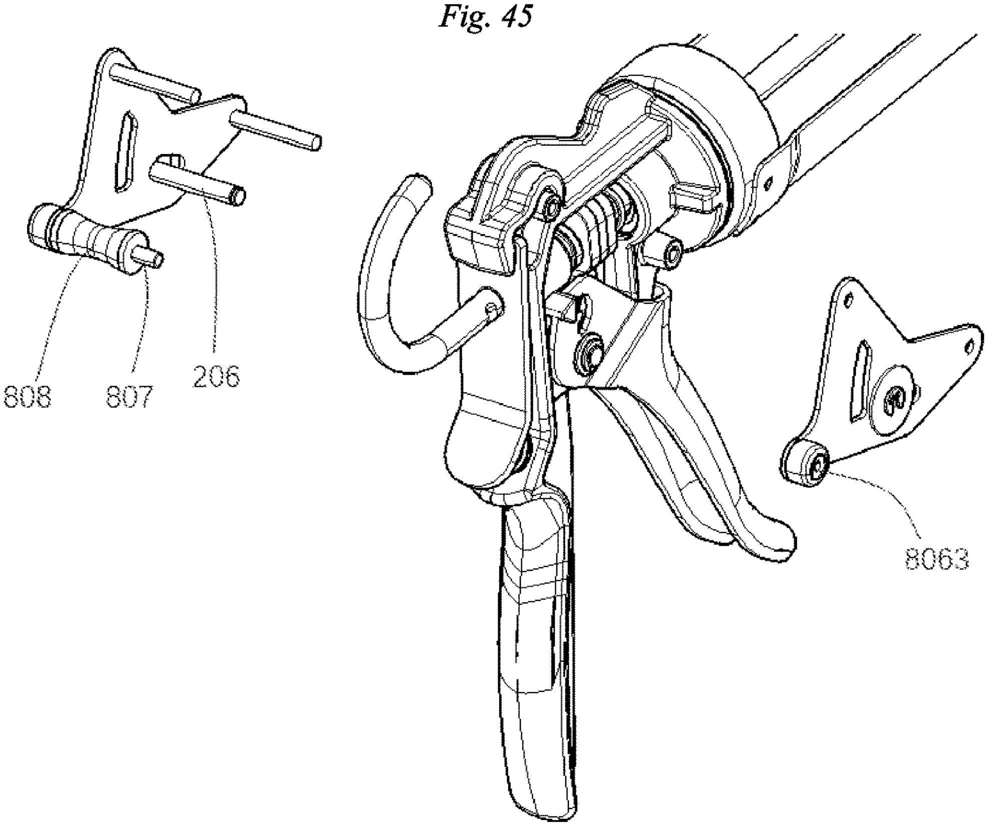
FIG. 46 is an exploded schematic view of FIG. 45 at a different perspective.

In Embodiment 3, as shown in FIGS. 10 to 12, the actuating member 206 is driven by the toggle 203 to effect switching between the gear positions. Differing from Embodiment 3, as shown in FIGS. 38 and 39, in this embodiment, a manipulation component 800 is provided, which can be manipulated by a user to cause displacement of the actuating member 206 within the slide slot 202 and thereby achieve switching between the different gear positions. Referring to FIGS. 45 to 46, the manipulation component 800 is pivotally coupled to the main body 3. One end of the actuating member 206 is coupled to the manipulation component 800 and movable with the manipulation component. The manipulation component 800 can be manipulated by a user to cause displacement of the actuating member 206 within the slide slot 202, thus achieving switching between the different gear positions.

Preferably, the manipulation component 800 includes a first actuating plate 801. One end portion 8011 thereof (first end portion 8011) is coupled to the main body 3 by a pivot shaft 802. To this end, a hole 803 is provided in the main body, and the pivot shaft 801 is inserted in the hole 803. One end of the pivot shaft 802 is fixedly coupled to the first actuating plate 801. An end portion 2061 of the actuating member 206 is coupled to the first actuating plate 801. Preferably, the end portion 2061 is coupled to the first actuating plate 801 in a central region thereof. The first actuating plate 801 defines in the central region of a first slot 804, and the end portion 2061 of the actuating member 206 is received in the first slot 804 and slidable therein. When the first actuating plate 801 is driven to pivot about the pivot shaft 802, the actuating member 206 slides from one gear position 2021 toward the other gear position 2022 in the slide slot 202. At the same time, the end portion 2061 of the actuating member 206 slides in the first slot 804, making the gear position shift smoother.

A manipulation element 805 is provided on a second end portion 8012 of the first actuating plate 801, which opposes the pivot shaft 802. A user may apply a force to the manipulation element 805 to drive the first actuating plate 801 to pivot. Preferably, the second end portion 8012 of the first actuating plate 801 extend to the outside of the brake 4, and a transverse lever perpendicular to the first actuating plate 801 is provided as the manipulation element 805. One end of the manipulation element 805 is coupled to the second end portion 8012, and the other end extends toward the other side of the main body 3 opposite the first actuating plate 801.

In order to define a movement path for the manipulation component 800, preferably, a guide slot 809 is provided in an upper portion of the main body 3, and a guide post 810 is received in the guide slot 809. One end of the guide post 810 is coupled to the first actuating plate 801. Preferably, the first actuating plate 801 has a third end portion 8014, and one end of the guide post 810 is coupled to the third end portion 8014. When the first actuating plate 801 is pivoting, the guide post 810 slides in the guide slot 809.

In order to provide an indication of the gear position where the actuating member 206 is, the first actuating plate 801 is provided with a second slot 811, and the main body 3 is provided with a first indication block 812 received in the second slot 811. When the first actuating plate 801 is pivoting, the second slot 811 moves relative to the first indication block 812, allowing the first indication block 812 to be located at different positions in the second slot 811. When the actuating member 206 is located at the first gear position, the first indication block 812 is located at a first position in the second slot 811. When the actuating member 206 is located at the second gear position, the first indication block 812 located at a second position in the second slot 811. In this way, the position where the first indication block 812 is provides an intuitive indication of the current gear position where the actuating member 206 is.

Preferably, a second actuating plate 806 is provided on the side of the main body 3 opposite the first actuating plate 801. The second actuating plate 806 substantially has the same shape as the first actuating plate 801. The pivot shaft 801 extends through the main body 3, and its other end is coupled to the second actuating plate 806. The guide post 810 extends through the main body 3 and its other end is coupled to the second actuating plate 806. The other end of the manipulation element 805 extends to, and is coupled to, the second actuating plate 806. Specifically, a through hole 8013 is provided in the second end portion 8012 of the first actuating plate 801, and a boss 8061 is provided on the second actuating plate 806 at a corresponding location. The boss 8061 defines a hole 8063 provided therein with a nut, and one end of a screw 807 passes through the through hole 8013, extends into the hole 8063 and engages with the nut therein. The first actuating plate 801 and the second actuating plate 806 can be coupled together by the pivot shaft 801 and the screw 807. A cylindrical member 808 is disposed over the screw 807. The cylindrical member 808 is situated between the first actuating plate 801 and the second actuating plate 806 in order to facilitate manipulation. Preferably, the second actuating plate 806 is provided with a third slot 813 corresponding to the second slot 811, and a second indication block 814 is provided on the main body 3. The second indication block 814 is received in the third slot 813 in order to provide an indication of the gear position. In this way, the gear position where the actuating member 206 is can be intuitively observed from both sides of the main body 3.

According to this embodiment, the manipulation component 800 can be manipulated to shift the actuating member 206 from one gear position to another, thus causing a change in the spacing between the actuating member 206 and the pivot pin shaft 201. When the actuating member 206 is located at the gear position 2061, the distance between the actuating member 206 and the pivot pin shaft 201 is greater, allowing the push member 8 to be advanced a greater distance, making this gear position suitable for glue with lower density. When the actuating member 206 is located at the gear position 2062, the distance between the actuating member 206 and the pivot pin shaft 201 is smaller, allowing the push member 8 to be advanced a smaller distance, making this gear position suitable for glue with higher density. It would be appreciated that the manipulation component 800 can also be used in the structure of Embodiment 1. In this case, the manipulation component 800 may be coupled to the pivot pin shaft 12 in Embodiment 1, in order to drive movement of the pivot pin shaft 12 to achieve switching between the gear positions.

In this embodiment, the pair of actuating plates is provided as the manipulation component, and a user can achieve switching between the gear positions simply by pulling the manipulation element. This operation is fast and convenient. In addition, the actuating plates on opposite sides of the main body can protect the internal structures. The indication blocks can provide a convenient indication of the currently active gear position.

Preferred specific embodiments of the present invention have been described in detail above. It is to be understood that, those of ordinary skill in the art can make various modifications and changes based on the concept of the present invention without exerting any creative effort. Accordingly, all the technical solutions that can be obtained by those skilled in the art by logical analysis, inference or limited experimentation in accordance with the concept of the present invention on the basis of the prior art are intended to fall within the protection scope as defined by the claims.

The invention claimed is:

1. A glue gun, comprising:

a main body, a first end of the main body formed as an accommodation part for accommodating a glue cylinder;

a first handle and a second handle, the first handle coupled to the second handle by a pivot pin shaft, one of the first handle and the second handle configured as a fixed handle, the other configured as a movable handle pivotable relative to the fixed handle, the fixed handle coupled to a second end of the main body, wherein the second end of the main body is opposite the first end of the main body;

wherein the movable handle is provided with an actuating member, the actuating member configured to push a push member of the glue gun;

at least one of the actuating member and the pivot pin shaft is configured to be adjustable in position to vary a distance between the actuating member and the pivot pin shaft, resulting in a switching between at least two gear positions;

wherein the glue gun further comprises a manipulation component, the manipulation component coupled to the actuating member and configured to move under a drive of an external force in order to drive one of the actuating member and the pivot pin shaft to move to switch between the at least two gear positions;

wherein one end of the manipulation component is pivotally coupled to the main body, an other end of the manipulation component, which extends beyond the second end of the main body, is provided with a manipulation element.

2. The glue gun of claim 1, wherein the movable handle is provided with a sliding groove, the sliding groove provided with the at least two gear positions; the actuating member is configured to slide within the sliding groove under a drive of the manipulation component to switch between the gear positions.

3. The glue gun of claim 1, wherein the manipulation component comprises a toggle, the toggle pivotably coupled to the main body by a pivot shaft, one end of the actuating member is coupled to the toggle.

4. The glue gun of claim 1, wherein the manipulation component comprises a first actuating plate, a first end portion of the first actuating plate pivotably coupled to the main body by a pivot shaft, a second end portion of the first actuating plate provided with the manipulation element.

5. The glue gun of claim 4, wherein the first actuating plate is provided with a first slot, one end of the actuating member is accommodated in the first slot, and the actuating member is configured to slide in the first slot during the switching of the gear positions.

6. The glue gun of claim 4, wherein the first actuating plate is provided with a second slot, the main body is provided with a first indication block, the first indication block located within the second slot, the first actuating plate configured so that, when it is pivoting, the second slot slides relative to the first indication block.

7. The glue gun of claim 4, wherein the main body is provided with a guide slot, the first actuating plate has a third end portion, the third end portion provided thereat with a guide post located in the guide slot and configured to slide in the guide slot.

8. The glue gun of claim 4, wherein the manipulation component further comprises a second actuating plate, the second actuating plate provided on a side of the main body opposite the first actuating plate, the pivot shaft, after running through the main body, is coupled to the second actuating plate.

9. The glue gun of claim 8, wherein the second actuating plate has the same shape as the first actuating plate.

10. The glue gun of claim 8, wherein the second end portion of the first actuating plate extends to an outer side of the main body, one end of the manipulation element is coupled to the second end portion, the other end is coupled to the second actuating plate.

11. The glue gun of claim 10, wherein the manipulation element comprises a screw, one end of the screw coupled to the first actuating plate, the other end of the screw engaging with the second actuating plate, the screw sleeved thereover with a cylindrical member, the cylindrical member located between the first actuating plate and the second actuating plate.

12. The glue gun of claim 8, wherein the second actuating plate is provided with a third slot, the main body is provided with a second indication block, the second indication block located in the third slot, the second actuating plate is configured so that, when it is pivoting, the third slot slides relative to the second indication block.

13. The glue gun of claim 1, wherein the movable handle is provided with a sliding groove, the sliding groove provided with the at least two gear positions, the pivot pin shaft is configured to slide in the sliding groove under a drive of the manipulation component to switch between the gear positions.

14. The glue gun of claim 1, wherein the glue gun further comprises: a brake sleeved over a push rod of the glue gun, the brake and the main body of the glue gun provided therebetween with a compression spring, the brake configured to be urged by the compression spring to retain the push rod so that the push rod can move only in a direction in which glue flows out.

15. The glue gun of claim 14, wherein the main body is provided with a limiting groove, the limiting groove having a first limiting end and a second limiting end, one end of the brake is located in the limiting groove, the brake is configured to move between the first limiting end and the second limiting end so that the push rod has an idle stroke during its pushed movement, which has a distance from the first limiting end to the second limiting end.

16. The glue gun of claim 15, wherein the idle stroke is 3-5 mm.

17. A glue gun, comprising:

a trigger device, the trigger device comprising a movable handle and a fixed handle, which are coupled together by a pivot pin shaft;

a main body, a first end of the main body formed as an accommodation part for accommodating glue, a second end of the main body, which is opposite the first end of the main body, coupled to the fixed handle;

a push rod, one end of the push rod provided with a push body located in the accommodation part, the push body configured to reciprocate with the push rod, an other end of the push rod provided with a push member;

an actuating member, the actuating member provided on the movable handle and configured to push the push member;

a brake sleeved over the push rod, the brake and the main body disposed therebetween with a compression spring, the brake configured to be urged by the compression spring to retain the push rod so that the push rod can move only in a direction in which the glue flows out, wherein at least one of the actuating member and the pivot pin shaft is configured to be adjustable in position to vary a distance between the actuating member and the pivot pin shaft, resulting in a switching between at least two gear positions;

wherein the glue gun further comprises a manipulation component, the manipulation component coupled to the actuating member and configured to move under a drive of an external force in order to drive one of the actuating member and the pivot pin shaft to move to switch between the at least two gear positions;

wherein one end of the manipulation component is pivotally coupled to the main body, an other end of the manipulation component, which extends beyond the second end of the main body, is provided with a manipulation element.

18. The glue gun of claim 17, wherein the movable handle has a sliding groove, the sliding groove defining a first gear position and a second gear position; the actuating member is configured to slide in the sliding groove to switch between the first gear position and the second gear position; or the pivot pin shaft is configured to slide in the sliding groove to switch between the first gear position and the second gear position.

* * * * *